US011806302B2

(12) United States Patent
Yagi

(10) Patent No.: US 11,806,302 B2
(45) Date of Patent: Nov. 7, 2023

(54) WEARABLE ASSIST ROBOT APPARATUS

(71) Applicant: Power Assist International Corporation, Wakayama (JP)

(72) Inventor: Eiichi Yagi, Wakayama (JP)

(73) Assignee: POWER ASSIST INTERNATIONAL CORPORATION, Wakayama (JP)

(*) Notice: Subject to any disclaimer, the term of this patent is extended or adjusted under 35 U.S.C. 154(b) by 56 days.

(21) Appl. No.: 17/382,734

(22) Filed: Jul. 22, 2021

(65) Prior Publication Data

US 2021/0346229 A1     Nov. 11, 2021

Related U.S. Application Data

(62) Division of application No. 15/738,322, filed as application No. PCT/JP2017/027346 on Jul. 27, 2017, now Pat. No. 11,110,024.

(30) Foreign Application Priority Data

Aug. 17, 2016   (JP) .................................. 2016-160262

(51) Int. Cl.
*A61H 3/00* (2006.01)
*A61H 1/02* (2006.01)
(Continued)

(52) U.S. Cl.
CPC ............. *A61H 3/00* (2013.01); *A61H 1/0244* (2013.01); *B25J 9/0006* (2013.01); *B25J 11/00* (2013.01);
(Continued)

(58) Field of Classification Search
CPC ... B25J 11/00; B25J 1/00; B25J 9/0006; B25J 11/009; A61H 3/00; A61H 1/0244;
(Continued)

(56) References Cited

U.S. PATENT DOCUMENTS 8,075,633 B2 * 12/2011 Herr ..................... A61F 5/0113
623/47
2008/0234608 A1   9/2008 Sankai
(Continued)

FOREIGN PATENT DOCUMENTS

CN     101589983 A    12/2009
EP      1442703 A1     8/2004
(Continued)

OTHER PUBLICATIONS

English translation for JP 2013138848, translated by espacenet.com, translated on Nov. 21, 2020.*
(Continued)

*Primary Examiner* — Tu A Vo
(74) *Attorney, Agent, or Firm* — Harness, Dickey & Pierce, P.L.C.

(57) ABSTRACT

Upper arms are fixed to drive shafts of a pair of drive sources at or near respective left and right hip joints. The upper arms are coupled to an upper body trunk harness by first passive rotary shafts via third passive rotary shafts, and are mounted to a lower body trunk harness by a mounting device. Lower arms are fixed to drive source bodies, and are coupled to thigh harnesses by second passive rotary shafts via fourth passive rotary shafts. The first and second passive rotary shafts and third and fourth passive rotary shafts are angularly displaceable about axial lines in a lateral direction of the wearer and axial lines in an anteroposterior direction of the wearer, respectively. An acceleration/angular speed sensor fixed to the lower body trunk harness detects an acceleration of the body trunk in a vertical direction by landing of a foot.

15 Claims, 88 Drawing Sheets

US 11,806,302 B2

Page 2

(51) Int. Cl.
*B25J 9/00* (2006.01)
*B25J 11/00* (2006.01)

(52) U.S. Cl.
CPC ..... *B25J 11/009* (2013.01); *A61H 2001/0248* (2013.01); *A61H 2003/007* (2013.01); *A61H 2201/1215* (2013.01); *A61H 2201/149* (2013.01); *A61H 2201/163* (2013.01); *A61H 2201/1621* (2013.01); *A61H 2201/1642* (2013.01); *A61H 2201/1652* (2013.01); *A61H 2201/1659* (2013.01); *A61H 2201/5007* (2013.01); *A61H 2201/5069* (2013.01); *A61H 2201/5084* (2013.01); *A61H 2230/625* (2013.01)

(58) Field of Classification Search
CPC .............. A61H 1/00; A61H 2001/0248; A61H 2003/007; A61H 2201/1215; A61H 2201/149; A61H 2201/1621; A61H 2201/163; A61H 2201/1642; A61H 2201/1652; A61H 2201/1659; A61H 2201/5007; A61H 2201/5069; A61H 2201/5084; A61H 2230/625
See application file for complete search history.

(56) References Cited

U.S. PATENT DOCUMENTS

| | | | |
|---|---|---|---|
| 2009/0025126 A1 | 1/2009 | Crossman et al. | |
| 2010/0036302 A1* | 2/2010 | Shimada | A61H 3/00 602/23 |
| 2010/0049102 A1* | 2/2010 | Yasuhara | A63B 21/4011 601/5 |
| 2011/0033835 A1 | 2/2011 | Endo et al. | |
| 2014/0005577 A1* | 1/2014 | Goffer | A61H 1/0262 601/34 |
| 2014/0024978 A1* | 1/2014 | Killian | A61H 3/00 601/33 |
| 2014/0121575 A1 | 5/2014 | Yasuhara et al. | |
| 2014/0212243 A1* | 7/2014 | Yagi | B25J 9/0006 414/2 |
| 2015/0127018 A1* | 5/2015 | Lim | A61H 1/0266 606/130 |
| 2015/0134079 A1* | 5/2015 | Yoon | A61H 3/00 901/1 |
| 2015/0158175 A1 | 6/2015 | Kim et al. | |
| 2015/0164732 A1* | 6/2015 | Ha | A61H 3/00 700/275 |
| 2015/0182408 A1* | 7/2015 | Roh | B25J 9/0006 482/51 |
| 2015/0190923 A1* | 7/2015 | Seo | A61H 1/0244 602/16 |
| 2015/0196449 A1* | 7/2015 | Ahn | A61H 3/00 623/27 |
| 2015/0231018 A1* | 8/2015 | Shim | A61H 1/024 623/24 |
| 2015/0272810 A1* | 10/2015 | Teng | A61H 1/0244 601/34 |
| 2015/0366694 A1 | 12/2015 | Bujold et al. | |
| 2015/0366738 A1* | 12/2015 | Endo | G05B 15/02 482/4 |
| 2015/0366740 A1 | 12/2015 | Endo | |
| 2016/0029928 A1* | 2/2016 | Jang | G07C 1/22 600/595 |
| 2016/0045386 A1* | 2/2016 | Sandler | A61F 5/0102 623/24 |
| 2016/0074272 A1 | 3/2016 | Ahn et al. | |
| 2016/0206499 A1* | 7/2016 | Shim | G09B 19/003 |
| 2017/0027802 A1* | 2/2017 | Jang | A61H 1/0244 |

FOREIGN PATENT DOCUMENTS

| | | | | |
|---|---|---|---|---|
| EP | 2754538 A1 | 7/2014 | | |
| JP | 2000-070312 A | 3/2000 | | |
| JP | 2006075456 A | 3/2006 | | |
| JP | 2007282991 A | 11/2007 | | |
| JP | 4178185 B2 | 11/2008 | | |
| JP | 4200492 B2 | 12/2008 | | |
| JP | 2010082159 A | 4/2010 | | |
| JP | 2010273748 A | 12/2010 | | |
| JP | 2011-036376 A | 2/2011 | | |
| JP | 2011025053 A | 2/2011 | | |
| JP | 2011-156171 A | 8/2011 | | |
| JP | 2013-501 A | 1/2013 | | |
| JP | 2013138848 A | * 7/2013 | ............. A61H 1/024 |
| JP | 2013173190 A | 9/2013 | | |
| JP | 2014090799 A | * 5/2014 | ........... A61H 1/0244 |
| JP | 2015-77354 A | 4/2015 | | |
| JP | 2015-177925 A | 10/2015 | | |
| JP | 2015-208795 A | 11/2015 | | |
| JP | 2016-002404 A | 1/2016 | | |
| JP | 2016-59795 A | 4/2016 | | |
| WO | WO-2013/035814 A1 | 3/2013 | | |

OTHER PUBLICATIONS

English translation for JP 2014090799, translated by SEARCH clarivate analytics, translated on Nov. 10, 2022.*
Jinno, Emi, "Effective for reducing burden on farm work!" "Topic" of Agricultural assist suit, aff, Ministry of Agriculture, Forestry and Fisheries, Nov. 2, 2015, vol. 46, No. 11, vol. 542, p. 18-19.
International Search Report PCT/ISA/210 for International Application No. PCT/JP2017/027346 dated Oct. 24, 2017.
Japanese Office Action and English explanation thereof dated Oct. 16, 2018.
International Preliminary Report on Patentability and English translation dated Feb. 28, 2019.
Bokman, L. et al., "An event-driven control to achieve adaptive walking assist with gait primitives," 2015 IEEE/RSJ International Conference on Intelligent Robots and Systems, pp. 5870-5875, Sep. 28, 2015.
Supplementary Partial European Search Report dated Mar. 6, 2019.
Extended European Search Report dated Jun. 18, 2019.
Japanese Office Action and concise English explanation thereof dated Jan. 21, 2020.
Office Action for Chinese Patent Application No. 201780002108.6 dated Jul. 24, 2020 and concise English explanation thereof.
Extended European Search Report dated Jan. 11, 2021 for European Patent Application No. 20194888.2.
Extended European Search Report dated Jan. 11, 2021 for European Patent Application No. 20195001.1.
Japanese Office Action and English translation thereof dated Jul. 10, 2018.
Bokman Lim, "An Event-Driven Control to Achieve Adaptive Walking Assist with Gait Primitives", 2015.

* cited by examiner

WEARABLE ASSIST ROBOT APPARATUS

CROSS-REFERENCE TO RELATED APPLICATIONS

The present application is a divisional of and claims priority under 35 U.S.C. §§ 120/121 to U.S. patent application Ser. No. 15/738,322, filed on Dec. 20, 2017, which is the national phase under 35 U.S.C. § 371 of PCT International Application No. PCT/JP2017/027346, which has an International filing date of Jul. 27, 2017, which claims priority to Japanese application 2016-160262, filed on Aug. 17, 2016, the entire contents of each of which are hereby incorporated by reference.

TECHNICAL FIELD

The present invention relates to a wearable assist robot apparatus referred to as a power assist suit, a power assist robot apparatus, or the like configured to support a wearer to perform heavy physical works.

As used herein, the terms used in this specification of this application, "lateral direction", "anteroposterior direction", and "vertical direction", as well as "front", "side", "plan", and "back" are intended to indicate directions with respect to a wearer to be assisted standing upright with both lower limbs aligned together with a body trunk, which is also referred to as upper body.

Drawings may include hatching and oblique lines also in non-cross-sectional portions for the sake of clarity of configuration.

BACKGROUND ART

Aging population in agriculture workers is increasing, and thus wearable assist robot apparatus is used as agricultural work assisting equipment suitable for narrow farms and being effective for invigoration of agriculture in mountain areas and for regional development instead of large-scale agricultural mechanization. The wearable assist robot apparatus is used for assisting light-weight works in agriculture including up-facing works for pollination, flower thinning, fruit thinning, and bagging and harvesting of fruits such as peaches, persimmons, oranges, grapes, and kiwi, works in a semi-crouching position for harvesting strawberries or the like, and works for lifting, lowering, and carrying light objects not heavier than 10 kg, and assists for walking or running on flat lands, sloping lands, and stairs. The wearable assist robot apparatus is used for assisting heavy-weight works in agriculture including works for harvesting heavy vegetables such as radishes, cabbages or the like in a semi-crouching position as well as works for lifting, loading, unloading, and carrying heavy objects of about 30 kg such as rice bags, harvest containers and the like.

The wearable assist robot apparatus may also be used for works other than those in agriculture such as carrying works for light or heavy objects and works in a certain posture for a long time in plants, logistics, construction, and may also be used in care giving for transferring person from a bed to a wheel chair and in an assist for walking rehabilitation for recovering physical functionality. The wearable assist robot apparatus may further be used for snow shoveling in the snowy areas. The wearable assist robot apparatus may be used also for emergency rescue and works for carrying out disaster refuse such as debris in times of disaster. In this manner, the wearable assist robot apparatus may be used for transferring and handling or the like of substances such as objects and human bodies.

A wearable assist robot apparatus of the related art respectively includes electric motors on the left and right of a lower body trunk for walking assistance or the like, and also respectively includes electric motors at or near knee joints of left and right lower limbs to generate assisting force moments for walking assistance or the like (Patent Literatures 1 to 3). Therefore, a significant number of many electric motors are provided, thus causing problems of increase in weight and power consumption.

The wearable assist robot apparatus of the related art is also provided with a floor reaction force sensor configured to detect foot landing based on a pressure for walking assistance or the like. The floor reaction force sensor sends an output signal via a flexible electric wire or wirelessly by battery drive to an electric motor control apparatus disposed on a lower body trunk. Therefore, the floor reaction force sensor configured to detect foot landing and configurations in association therewith are complex.

CITATION LIST

Patent Literature

Patent Literature 1: Japanese Patent JP-B24200492
Patent Literature 2: Japanese Patent JP-B24178185
Patent Literature 3: Japanese Unexamined Patent Publication JP-A 2006-75456

SUMMARY OF INVENTION

Technical Problem

An object of the invention is to provide a wearable assist robot apparatus including a small number of drive sources and having a simplified configuration.

Solution to Problem

The invention provides a wearable assist robot apparatus including:
 a harness device to be worn and retained by a wearer;
 an assist drive mechanism provided on the harness device, including a pair of drive sources disposed respectively on both left and right sides of a lower body trunk of the wearer configured to generate drive torque about an axial line in a lateral direction of the wearer, the assist drive mechanism being configured to apply assisting force moments respectively to portions of the wearer between a body trunk and respective left and right thighs by drive torque from the respective drive sources;
 a pair of angle sensors configured to detect relative angles between the body trunk and the respective left and right thighs of the wearer about the axial line in the lateral direction;
 an acceleration sensor provided on the harness device, the acceleration sensor being configured to detect an acceleration of the body trunk;
 landing determination means configured to determine a foot landing state in response to an output from the acceleration sensor; and
 drive control means configured to, in response to outputs from the respective angle sensors and the landing determination means, apply a supporting force moment to a supporting leg in a landed state in a direction of support by a supporting-leg side drive source of the pair of drive sources, and apply a swing-up force moment to a free leg not in contact with the land in a swing-up direction by a free-leg side drive source of the pair of drive sources.

Advantageous Effects of Invention

According to the invention, the assist drive mechanism is provided on the harness device to be worn by the wearer and the pair of drive sources of the assist drive mechanism are disposed respectively on both of the left and right sides of the lower body trunk of the wearer to generate drive torque about the axial line in the lateral direction. The drive sources apply the assisting force moments to the portions of the wearer between the body trunk and the respective left and right thighs about the axial line in the lateral direction. The assisting force moment of the invention includes, for example, a supporting force moment of the supporting leg and a swing-up force moment of the free leg, described later, for walking assistance, and the moment provided on both of the left an right legs include, for example, a lifting force moment for lifting assistance and a lowering brake force moment for lowering brake assistance, and a semi-crouching position assisting force moment for semi-crouching position assistance.

In an embodiment of the invention, the drive torque of the respective drive sources, for example, causes an angular displacement about an axial line which is on a straight line in the lateral direction passing through centers of cotyloid joints of bone heads of thighbones fitted into cotyloid cavities at both left and right hip joints of a pelvis of a wearer. Such configuration of the drive shafts of the drive sources having the axial line on the straight line includes not only a configuration of the axial line exactly on the straight line, but also a configuration which may apply an assisting force moment to a wearer 10 smoothly according to the concept of the invention.

The pair of left and right respective angle sensors may be referred to as encoders, and the encoders detect relative angles between the body trunk and the respective left and right thighs, and for example, start-of-walking determination means determines that the wearer has started to walk when the detected left and right detection angles alternately change in opposite directions. The landing determination means determines the foot landing state from an acceleration of the body trunk of the wearer detected by the acceleration sensor.

The inventors of the application have found that the acceleration of the body trunk in the vertical direction reaches the maximum value at a time point when one of the feet lands in each period of a single step from a time point when one of the left and right feet lands on a floor to a time point when the other one of the feet lands on the floor. Therefore, the landing determination means may determine the foot landing state by detecting the maximum value of the acceleration value in the period. According to another embodiment of the invention, the acceleration sensor may have a configuration to detect an acceleration of the body trunk in an anteroposterior direction or in the lateral direction, or may have a configuration to detect an acceleration having one or more components in the vertical direction, the anteroposterior direction, and the lateral direction thereof. The landing determination means may determine the foot landing state not only from the maximum value of a waveform of an output from the acceleration sensor in the period, but also from other characteristics such as physical quantities including an local maximum value, time rate of change, and computed values and counted values of such characteristics. The invention includes a concept of determining the fool landing state by such and other acceleration of the body trunk.

The drive control means drives the left and right drive sources individually and apply a supporting force moment in a supporting direction to the supporting leg determined to be in the landed state by the landing determination means until, for example, the landed state is terminated, and apply a swing-up force moment in the swing-up direction to the free leg until, for example, the swing-up is terminated. The supporting force moment may be configured to be provided over the entire period from the start of the landed state to the end or for a period shorter than the entire period, and the swing-up force moment may be configured to be provided over the entire period from the start of swing-up to the end or for a period shorter than the entire period.

The angle sensors may directly detect the relative angles between the body trunk and the respective left and right thighs, or may detect the same by computing or the like, that is, indirectly. The invention includes these configurations.

The invention provides a wearable assist robot apparatus including:
  a harness device to be worn and retained by a wearer;
  an assist drive mechanism provided on the harness device, including a pair of drive sources disposed respectively on both left and right sides of a lower body trunk of the wearer configured to generate drive torque about an axial line in a lateral direction of the wearer, the assist drive mechanism being configured to apply assisting force moments respectively to portions of the wearer between a body trunk and respective left and right thighs by drive torque from the respective drive sources;
  a pair of angle sensors configured to detect relative angles between the body trunk and the respective left and right thighs of the wearer about the axial line in the lateral direction;
  landing determination means configured to determine a foot landing state in response to an output from the angle sensors; and
  drive control means configured to, in response to outputs from the respective angle sensors and the landing determination means, apply a supporting force moment to a supporting leg in a landed state in a direction of support by a supporting-leg side drive source of the pair of drive sources, and apply a swing-up force moment to a free leg not in contact with the land in a swing-up direction by a free-leg side drive source of the pair of drive sources.

The wearable assist robot apparatus further includes a start-of-walking determination means configured to determine that the wearer has started to walk, and the landing determination means determines the start of walking in response to an output from the start-of-walking determination means, and then determines the landing states of the respective feet in response to the outputs from the respective angle sensors, respectively.

The apparatus of the invention is similar to the aforementioned wearable assist robot apparatus provided with the acceleration sensor, and it is noted that the landing determination means determines the foot landing state by an output from the angle sensors after the start of walking is determined. Therefore, a simple configuration without the acceleration sensor for determining the foot landing state is achieved.

The landing determination means detects, for example, that a swing angle detected by one of the left and right angle sensors indicates a value of a direction substantially right under the thigh of the lower limb, and determines that the foot of the lower limb on the side where the one of the angle sensors which has detected is disposed is in the landed state. In another embodiment of the invention, the landing determination means may determine the foot landing state by other characteristic such as physical quantities including a time point when a predetermined time has elapsed from the minimum value or the maximum value, the time rate of change, and computed values and counted values of such characteristics other than the value of the direction substantially right under in each period of the single step from the time point when one of the left and right feet lands on the floor to the time point when the other one of the feet lands on the floor. The invention may include a concept of determining the foot landing state from outputs from such and other angle sensors.

In the invention, it is preferable that the drive control means increases the supporting force moment and the swing-up force moment in sequence at every detection of left and right detection angles changing alternately in opposite directions when the start of walking is determined, in response to outputs from the start-of-walking determination means.

According to the invention, the supporting force moment including the assisting force moment and the swing-up force moment applied to portions of the wearer between the body trunk and the left and right thighs of the wearer by the drive sources increases from the start of walking gradually with progression of walking, and thus not applied suddenly at a large value. Accordingly, the wearer is allowed to confirm the state of assistance and thus achieve safety walking.

In the invention, it is preferable that the wearable assist robot apparatus further includes detecting means mounted on the body trunk of the wearer to detect an acceleration, an angular speed, or an angle of the body trunk, and
   the drive control means applies a lifting force moment in a lifting direction in which the relative angles between the body trunk and the respective thighs increase or applies a lowering brake force moment to limit the moment acting in a lowering direction, by the left and right drive sources when the detected acceleration, angular speed, or angle has values corresponding to a start of an object lifting assistance or lowering brake assistance, in response to the outputs from the detecting means.

According to the invention, the detecting means configured to detect the acceleration, the angular speed, or the angle of a body trunk 11 of the wearer is provided without using a glove device 190 and object sensors 191 to 194 described later, thereby detecting, for example, an acceleration $\alpha 1$ of the body trunk 11 of the wearer 10 in the vertical direction, detecting, for example, an angular speed $\omega 3$ of the body trunk 11 about an axial line in the lateral direction, or detecting, for example, the angle of the body trunk 11 about the axial line in the lateral direction. The value range of an acceleration $\alpha 1$, the angular speed $\omega 3$, or the angle allows determination of, for example, the start of movement in the vertical direction at the time of lifting or, for example, the start of movement in the vertical direction at the time of lowering, and further determination of ends of these movements.

In the invention, it is preferable that the wearable assist robot apparatus further includes object sensors mounted on the hands of the wearer, the object sensors being configured to detect an action of the object on the hands, and
   the drive control means applies the lifting force moment in the lifting direction in which the relative angles between the body trunk and the respective thighs increase by the left and right drive sources when an object is detected, in response to outputs from the left and right angle sensors and the object sensors.

According to the invention, when an object acting on the hands is detected by the object sensors in order that the wearer lifts the object with his or her both hands or one hand, the drive control means applies the lifting force moment in the lifting direction in which the relative angles between the body trunk and the respective thighs increase, by the respective left and right drive sources. Therefore, this facilitates the wearer to lift the object.

In the invention, it is preferable that the wearable assist robot apparatus further includes angular speed computing means configured to compute angular speeds respectively in response to outputs from the left and right angle sensors; and
   object sensors mounted on the hands of the wearer, the object sensors being configured to detect an action of the object on the hands, and
   the drive control means applies a lowering brake force moment to limit a moment acting in the lowering direction in which the relative angle between the body trunk and the respective thighs decreases, by the left and right drive sources when the detected angular speed is in the lowering direction and the object is detected, in response to the outputs from the left and right angle sensors, the angular speed computing means, and the object sensor.

According to the invention, when the wearer inclines the body trunk forward and takes a bent-forward posture in order to lower the object with both hands or by one hand, the relative angles between the body trunk and the respective left and right thighs detected respectively by the left and right angle sensors decrease, and the left and right angular speeds computed by the angular speed computing means are in the lowering direction, that is, the relative angles decrease, and when an object acting on the hand is detected by the object sensor, the drive control means applies the lowering brake force moment by the respective left and right drive sources to limit the moment acting in the lowering direction in which the relative angles between the body trunk and the respective thighs decrease, that is, applies the lowering brake force moment in the lifting direction, the lowering brake force moment being smaller than the moment acting in the lowering direction. Therefore, this facilitates the wearer to lower the object.

In the aforementioned wearable assist robot apparatus configured to output the lifting force moment and the aforementioned wearable assist robot apparatus configured to output the lowering brake force moment, the object sensor configured to detect that the object acts on the hand is provided on at least one of the left and right hands of the wearer. The object sensor is, for example, a force sensor configured to detect a downward force applied by the object and acting on the hand when the wearer lifts the object with his or her both hands or one hand, and may be realized by, for example, an ON/OFF switch or a strain gauge configured to be changed in electric characteristics such as a resistance corresponding to the force, or the like. The object sensor may also have a configuration to detect contact or proximity of the object by a change in capacitance, for example.

The drive control means may be configured to output a predetermined lifting force moment or a predetermined lowering brake force moment by the respective left and right drive sources.

In another embodiment of the invention, the object sensor is realized by a configuration to output an electric signal which represents a mass of the object to be lifted or lowered by the wearer, and the drive control means may be configured to output the lifting force moment or the lowering brake force moment set to be increased with an increase in mass of the object, by the respective left and right drive sources, in response to the output from the object sensor. This allows the wearer to lift or lower the object easily irrespective of the mass of the object. In addition, for example, a configuration is also applicable in which a burden imposed on the wearer is only a predetermined certain mass in the lifting direction. In this configuration, the object sensor detects the mass of the object to be lifted and the assisting force moment for lifting is adjusted to be increased with an increase in mass of the object. Accordingly, a burden imposed on the wearer is only a predetermined certain mass in the lifting direction irrespective of the mass of the object.

In the invention, it is preferable that the drive control means includes time counting means configured to, in response to outputs from the left and right angle sensors, when the detected left and right angles are in a predetermined range of a semi-crouching position, count a duration of a semi-crouching position and, when the counted duration exceeds a predetermined duration, apply the assisting force moment for semi-crouching position to maintain detected left and right angles, by the left and right drive sources.

According to the invention, when the semi-crouching position in a predetermined range of the semi-crouching position is continued for more than the predetermined duration, the left and right drive sources apply the semi-crouching position assisting force moment for semi-crouching position to maintain the detection angles. Therefore, the wearer may easily continue the semi-crouching position and thus may perform a work easily in the semi-crouching position.

In the invention, it is preferable that (j) the harness device includes:
an upper body trunk harness to be worn and retained by the wearer on the upper body trunk;
a lower body trunk harness to be worn and retained by the wearer on the lower body trunk; and
thigh harnesses to be worn and retained by the wearer on the thigh, and
(k) the assist drive mechanism includes:
(k1) a drive source including
a drive shaft configured to rotate about an axial line in the lateral direction at or near a hip joint, and
a drive source body configured to generate torque on the drive shaft about the axial line in the lateral direction;
(k2) a pair of upper arms extending in a vertical direction of the wearer, the pair of upper arms being disposed respectively on both left and right sides of the upper body trunk and attached at lower ends of the respective upper arms to one of the drive shaft or the drive source body so as to prohibit relative rotation about the axial line in the lateral direction;
(k3) first passive rotary shafts configured to couple respective upper ends of the upper arms and the upper body trunk harness so as to be angularly displaceable about the axial line in the lateral direction;
(k4) a pair of lower arms extending in the vertical direction, the pair of lower arms being disposed on both left and right sides from the lower body trunk to the thighs respectively and attached at upper ends of the respective lower arms to the other one of the drive shaft or the drive source body so as to prohibit relative rotation about the axial line in the lateral direction;
(k5) second passive rotary shafts configured to couple lower ends of the respective lower arms and the thigh harnesses so as to be angularly displaceable about the axial line in the lateral direction; and
(k6) mounting means configured to mount one of midsections in a longitudinal direction of the upper arms, the drive shaft, the drive source body, or midsections in a longitudinal direction of the lower arms to the lower body trunk harness.

The upper arms may be thin and elongated members. However, in another embodiment, the upper arms may be planar frames, which are members formed into curved surfaces for covering at least partly the upper body trunk. The lower arms may also be thin and elongated members. However, in another embodiment, the lower arms may be planar frames which are members formed into curved surfaces for covering at least partly from the lower body trunk to the thigh.

According to the invention, the harness device including the upper body trunk harness, the lower body trunk harness and the thigh harnesses is worn by the wearer, assisting force moments are respectively applied, by the drive sources disposed respectively in the assist drive mechanism on both left and right sides of the lower body trunk, between the lower ends of the upper arms having the upper end coupled to the upper body trunk harness via the first passive rotary shafts so as to be angularly displaceable about the axial lines in the lateral direction and the upper ends of the lower arms having the lower ends coupled to the thigh harnesses via the second passive rotary shafts so as to be angularly displaceable about the axial lines in the lateral direction, and one of the midsections in the longitudinal direction of the upper arms, the drive shafts, the drive source body, and the midsections in the longitudinal direction of the lower arms is mounted on the lower body trunk harness so as not to be displaced relatively at least in the anteroposterior direction by mounting means. Therefore, the assisting force moments about the axial lines in the lateral direction output by the respective drive sources may be imparted between the body trunk and the respective left and right thighs.

In the assist drive mechanism, as the upper arms are attached to the body trunk which is liable to be curved in the anteroposterior direction by the intervertebral joints composed of the vertebral bones or the like including the vertebrae lumbales of the spine in association with the upper body trunk harness and the lower body trunk harness at respective positions on the upper parts and the lower parts, the assisting force moments output by the drive sources by relatively driving the upper arms and the lower arms so as to be angularly displaced are reliably applied to the body trunk with respect to the thighs. Therefore, with such assist, the wearer is allowed to work easily. The upper and lower arms have rigidity about the axial lines in the lateral direction respectively, have no flexibility and resiliency, and configured to transfer the assisting force moment.

The invention provides a wearable assist robot apparatus including:
(a) an upper body trunk harness to be worn and retained on an upper body trunk of a wearer;
(b) a lower body trunk harness to be worn and retained on a lower body trunk of the wearer; and (c) thigh harnesses to be worn and retained on thighs of the wearer,
(d) drive sources disposed on the lower body trunk on both sides in a lateral direction of the wearer, the drive sources each including a drive shaft configured to rotate about an axial line in the lateral direction at or near the hip joint, and
a drive source body provided on the drive shaft, the drive source body being configured to generate torque about the axial line in the lateral direction,
(e) a pair of upper arms extending in a vertical direction of the wearer, the pair of upper arms being disposed respectively on both left and right sides of the upper body trunk, and attached at lower ends of the respective upper arms to one of the drive shaft or the drive source body so as to prohibit relative rotation about the axial line in the lateral direction;
(f) first passive rotary shafts configured to couple upper ends of the upper arms and the upper body trunk harness respectively so as to be angularly displaceable about the axial line in the lateral direction;
(g) a pair of lower arms extending in the vertical direction and disposed on both left and right sides from the lower body trunk and attached at upper ends of the respective lower arms to the other one of the drive shaft or the drive source body so as to prohibit relative rotation about the axial line in the lateral direction;
(h) second passive rotary shafts configured to couple lower ends of the respective lower arms and the thigh harnesses respectively so as to be angularly displaceable about the axial line in the lateral direction; and
(i) mounting means configured to mount one of midsections in a longitudinal direction of the upper arms, the drive shaft, the drive source body, or midsections in a longitudinal direction of the lower arms to the lower body trunk harness.

According to the invention, the upper body trunk harness, the lower body trunk harness, and the thigh harnesses are worn by the wearer, the assisting force moments are respectively applied, by the drive sources disposed respectively on both left and right sides of the lower body trunk, between the lower ends of the upper arms having the upper end coupled to the upper body trunk harness via the first passive rotary shafts so as to be angularly displaceable about the axial lines in the lateral direction and the upper ends of lower arms having the lower ends coupled to the thigh harnesses via second passive rotary shafts so as to be angularly displaceable about the axial lines in the lateral direction, and one of a midsections in the longitudinal direction of the upper arms, the drive shaft, the drive source body, and the midsections in the longitudinal direction of the lower arms is mounted by the mounting means to the lower body trunk harness. Therefore, the assisting force moments about the axial lines in the lateral direction output by the respective drive sources may be imparted between the body trunk and the respective left and right thighs.

As the upper arms are attached to the body trunk which is liable to be curved in the anteroposterior direction by the intervertebral joints composed of the vertebral bones or the like including the vertebrae lumbales of the spine in association with the upper body trunk harness and the lower body trunk harness at respective positions on the upper part and the lower part of the body trunk as described above, the assisting force moments output by the drive sources by relatively driving the upper arms and the lower arms so as to be angularly displaced is reliably applied to the body trunk with respect to the thighs. Therefore, with such assist, the wearer is allowed to work easily.

In the invention, it is preferable that
the lower body trunk harness is disposed at or near the pelvis of the wearer,
the midsections in the longitudinal direction of the upper arms are attached to the lower body trunk harness via the mounting means, and
the axial lines of the drive shafts are provided at or near the straight line in the lateral direction passing through centers of cotyloid joints of the left and right hip joints of the wearer.

According to the invention, the lower body trunk harness is disposed at or near the pelvis, and thus is disposed at or near the top of the iliac crests projecting sideward in the lateral direction from wings of ilium, thereby being reliably caught by portions at or near the pelvis without falling off the lower body trunk portion downward and being worn reliably on the lower body trunk portion. The midsections in the longitudinal direction of the upper arms are attached to the lower body trunk harness, so that the drive shafts or the drive source bodies to which lower ends of the upper arms are attached may be disposed reliably at or near the hip joints of the wearer. This makes it reliably possible to stably maintain a state in which the axial lines of the drive shafts of the drive sources are aligned on or near the straight line in the lateral direction passing through the centers of the cotyloid joints of the left and right hip joints, and hence, centers of the hemispherical femoral heads to be fitted into the cotyloid cavities. In this manner, by imparting the assisting force moment about the straight line to apart between the upper arms and the lower arms, and hence, between the body trunk and the respective left and right thighs to achieve the walking assistance, the lifting assistance, the lowering brake assistance, and the semi-crouching position assistance smoothly.

In the invention, it is preferable that the upper arms are angularly displaceable about axial lines in an anteroposterior direction of the wearer between the first passive rotary shafts and the axial lines of the drive shafts.

According to the invention, as the upper arms are angularly displaceable about the axial lines in the anteroposterior direction between the first passive rotary shafts at the upper ends in the longitudinal direction thereof and the axial lines of the drive shafts at the lower ends thereof in the longitudinal direction, for example, by the passive rotary shafts 73 and 83, the body trunk is allowed to bent obliquely in the lateral direction by the movement of the intervertebral joints composed of the vertebral bones including the vertebrae lumbales. Therefore, the assisting force moment may be caused to act smoothly in accordance with the posture of the wearer. The passive rotary shafts 73 of the upper arms 70 may be omitted.

The upper arms 70 illustrated in FIG. 61, FIG. 62, and so forth may be elongated, for example, rod shaped or plate shaped arms. However, according to other embodiments of the invention, the upper arms 70 may additionally be realized by planar frames 633 and 653 as illustrated in FIG. 65 to FIG. 67, FIG. 68, FIG. 69 and FIG. 70. Instead of the upper arms 70, the planar frames 633 and 653 may be realized by a material having a strength and light weight and used.

The upper arms may further have a configuration in which the planar frames are disposed outward on the opposite side from the rod-shaped or plate-shaped arms with respect to the wearer. The upper arms may be formed of a material such as a synthetic resin or a metal having flexibility or resiliency which allows the body trunk to bend in the lateral direction. Furthermore, the planer frames are provided with many small holes for air ventilation and a meshed material adhered inside (that is, the wearer side) to achieve proper air ventilation.

In this manner, in the joint type using the planar frames 633 and 653 together with the upper arms 70 in a joint manner, a low-strength material may be employed for the planar frames 633 and 653 by employing a high-strength metal such as aluminum for the upper arms 70, and the wearable assist robot apparatus of the application may easily be realized.

The holes for air ventilation to be provided in the planer frames preferably are circular punched holes having a diameter as large as possible, for example, a diameter of about 3 to 20 mm within a range which does not impair the strength.

The meshed material to be adhered inside is a material woven into a mesh. The material woven into a mesh to be used includes fabrics, resins, and metals. As to the mesh, for example, a 100 mesh indicates that the number of meshes per inch is 100. The same 100 meshes may vary depending on the aperture and the thread diameter. Wire meshes are standardized in JIS (Japanese Industrial Standards) standards. However, fabrics or the like may have variable apertures and thread diameters even though both have the same 100 meshes. Selection of the thread diameter and the aperture is required. For example, polyester with the intersection-fixed material, a material of 100 mesh having a thread diameter of 35 microns is suitable for this application because of an aperture as high as approximately 74% and proper air ventilation irrespective of its density of 100 mesh as the thread is thin, and in addition, because of enough strength due to a small aperture area of the mesh.

In the invention, it is preferable that the lower arms are angularly displaceable about axial lines in an anteroposterior direction of the wearer between the axial lines of the drive shafts and the second passive rotary shafts.

According to the invention, since the lower arms are angularly displaceable about the axial lines in the anteroposterior direction between the axial lines of the drive shafts at the upper ends in the longitudinal directions thereof and the second passive rotary shafts at the lower ends of the lower arms, the lower limbs may be turned outward to smoothly spread apart by the movement of the hip joints. Therefore, the assisting force moment may be applied smoothly in accordance with the posture of the wearer with the legs spread apart. The lower arms may be formed of a material such as a synthetic resin or a metal having flexibility or resiliency which allows the body trunk to bend in the lateral direction.

In the invention, it is preferable that third and fourth passive rotary shafts angularly displaceable about axial lines in an anteroposterior direction of the wearer are interposed respectively on the upper arms and the lower arms at midsections in the longitudinal direction.

According to the invention, a plurality of rigid arm pieces may be coupled via passive rotary shafts angularly displaceable about the axial lines in the anteroposterior direction to constitute the upper arms and the lower arms, so that realization of the invention is facilitated.

It is preferable that the upper arms are formed of planar frames configured to cover at least both right and left sides in a circumferential direction of the upper body trunk.

Hereinafter, out of many embodiments of the invention described with reference to drawings, a configuration realized by adding or replacing part of a certain embodiment to another embodiment is also included in the spirit of the invention.

BRIEF DESCRIPTION OF DRAWINGS

FIG. 9 is a schematic horizontal cross-sectional view of a waist belt 33a and a protector 36a;

DESCRIPTION OF EMBODIMENTS

Figure 1:
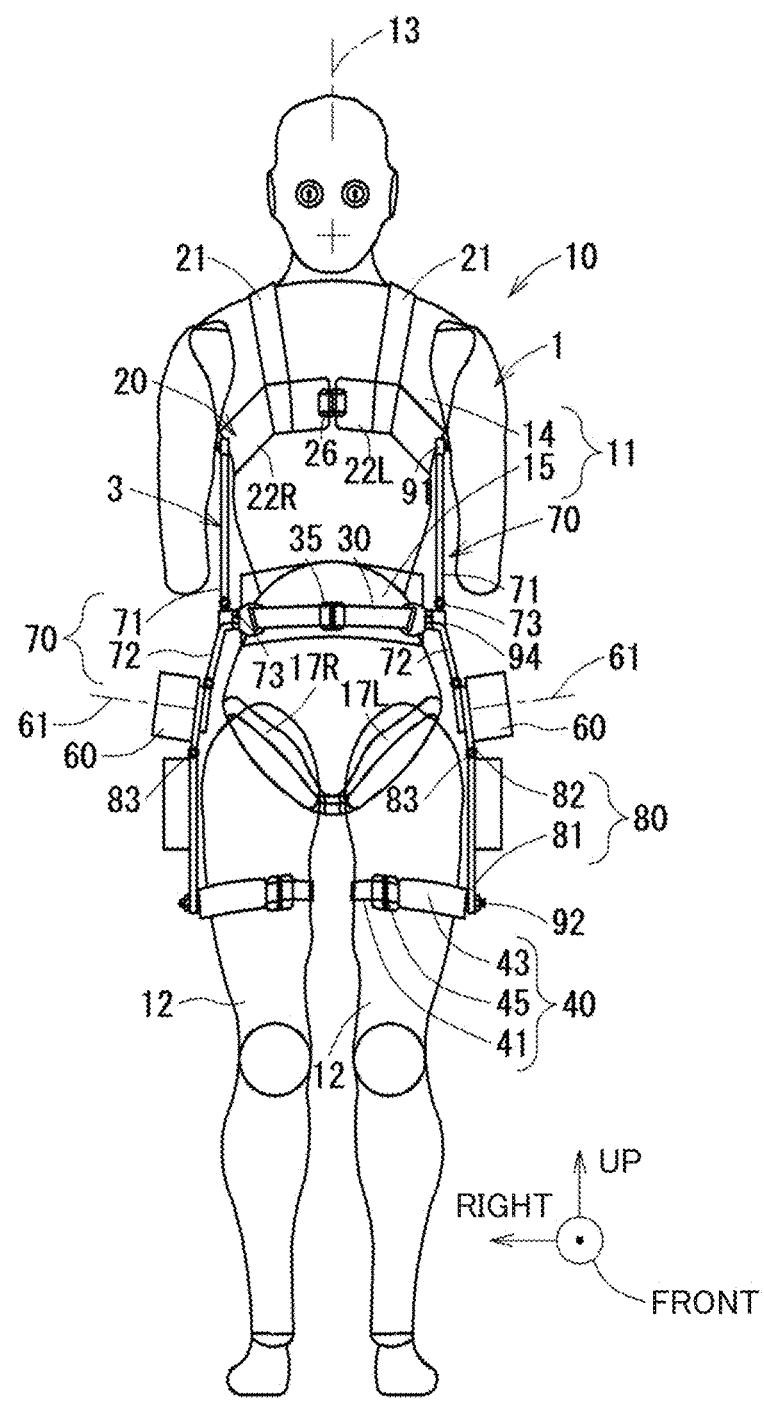
FIG. 1 is a front view illustrating a state in which a wearer 10 wears a wearable assist robot apparatus 1 according to an embodiment of the invention.
Figure 2:
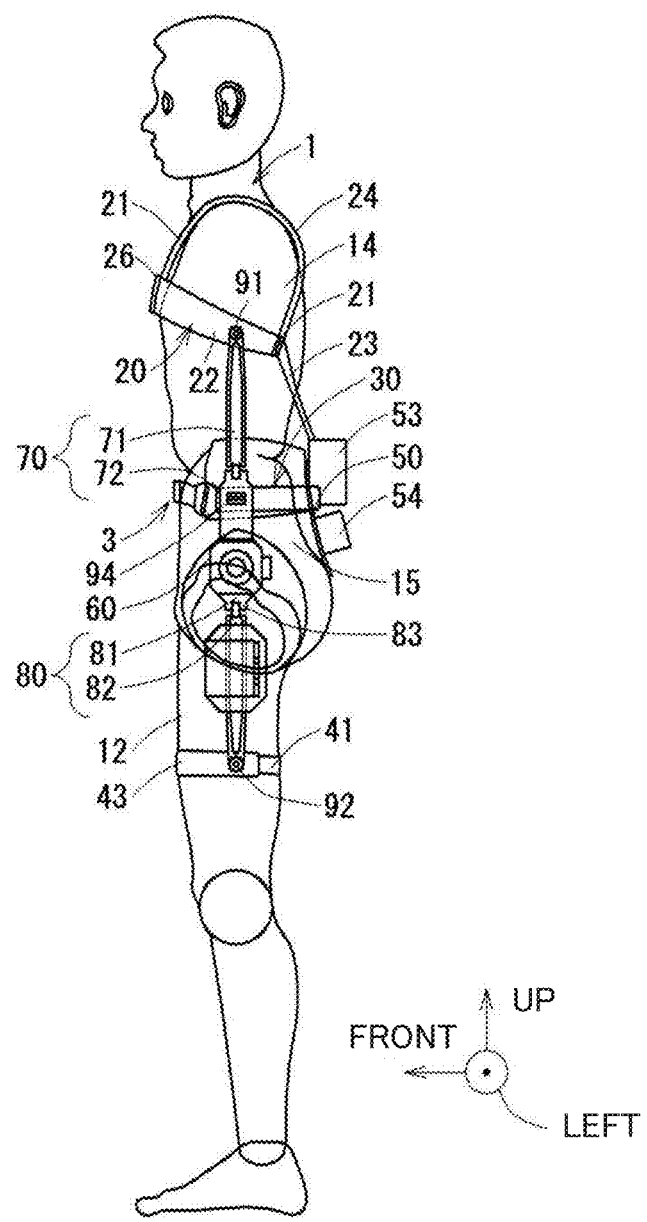
FIG. 2 is a side view illustrating a worn state of the wearable assist robot apparatus 1.
Figure 3:
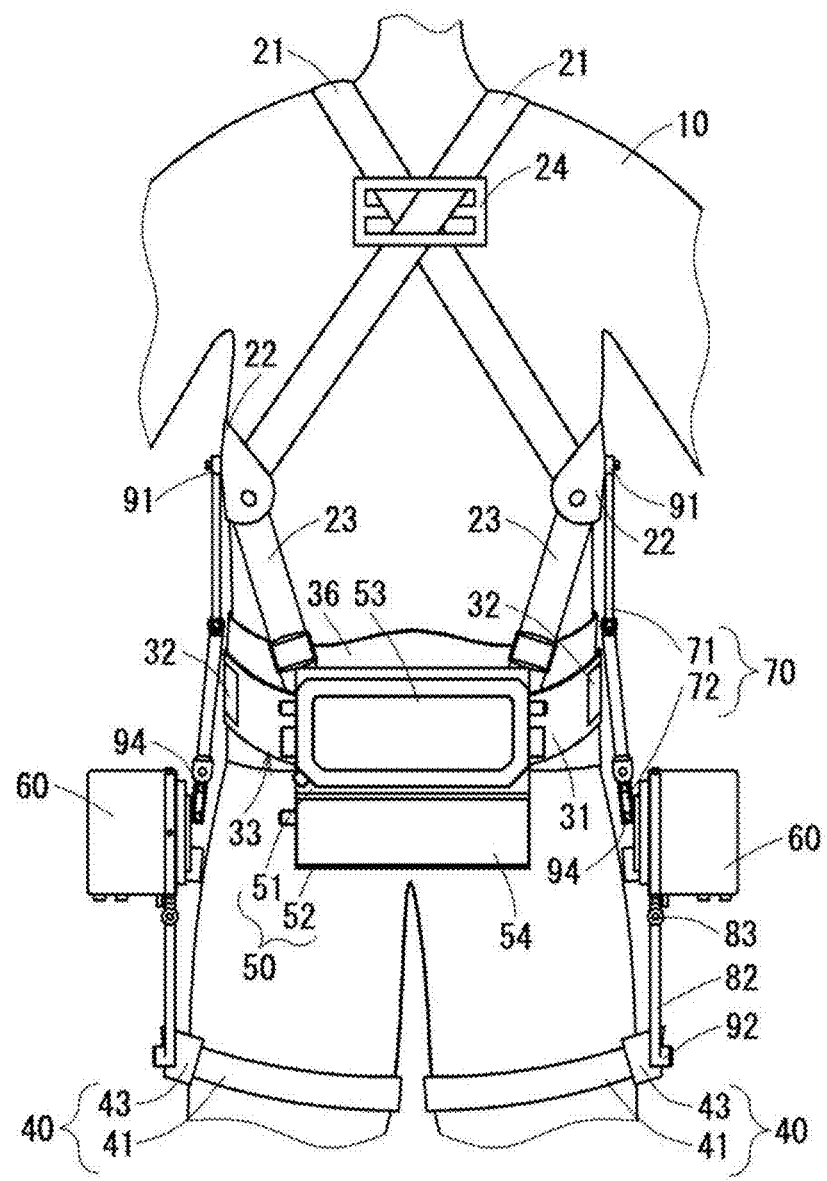
FIG. 3 is a back view illustrating the worn state of the wearable assist robot apparatus 1.
Figure 4:
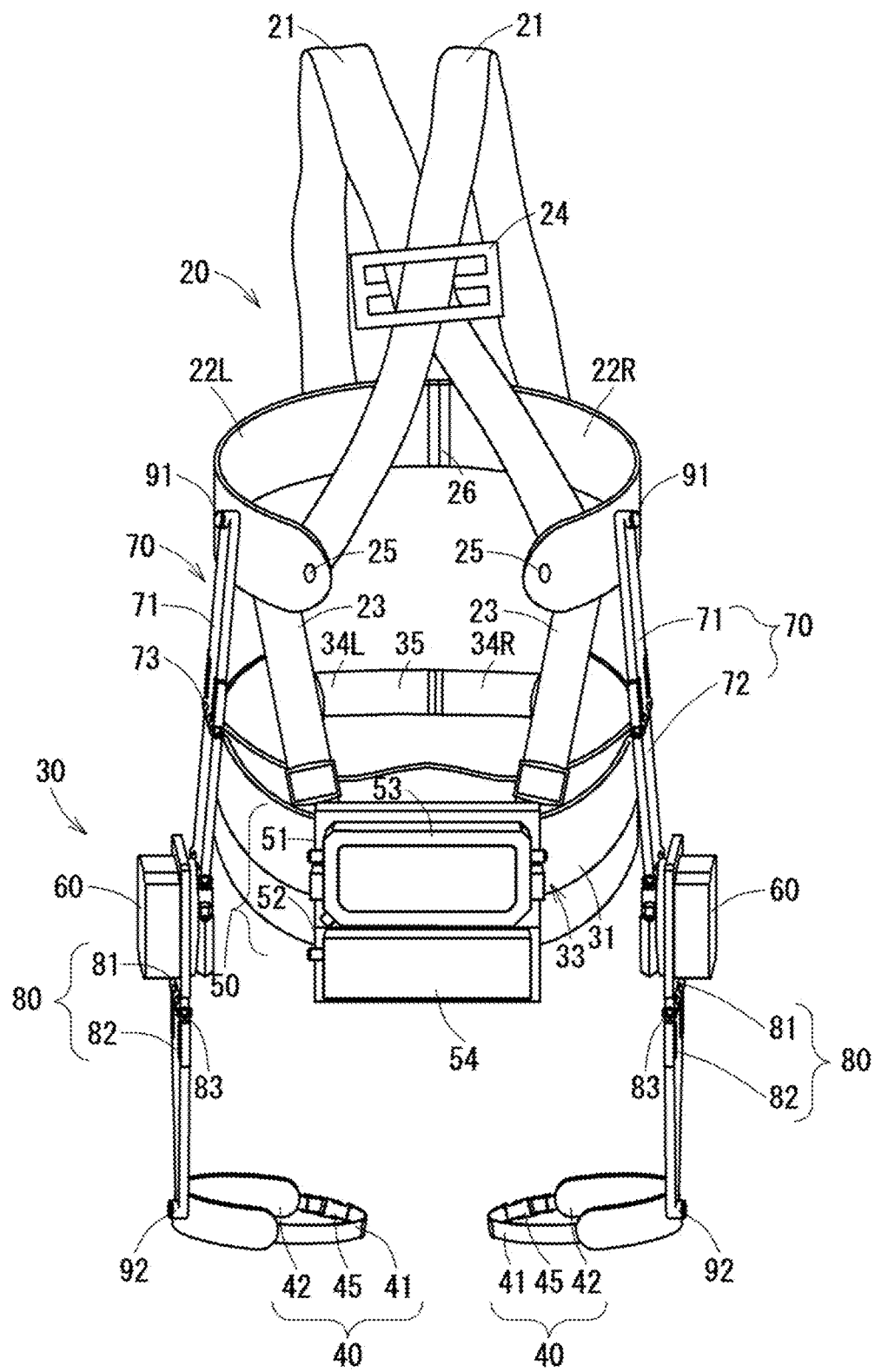
FIG. 4 is a perspective view of part of the wearable assist robot apparatus 1.

FIG. 1 is a front view illustrating a state in which a wearer 10 wears a wearable assist robot apparatus 1 according to an embodiment of the invention; FIG. 2 is a side view illustrating a worn state of the wearable assist robot apparatus 1; FIG. 3 is a back view illustrating the worn state of the wearable assist robot apparatus 1; and FIG. 4 is a perspective view of part of the wearable assist robot apparatus 1. With reference to these drawings, the wearable assist robot apparatus 1 includes a harness device 2 worn and retained by the wearer 10, and an assist drive mechanism 3 provided on the harness device and configured to apply an assisting force moment to portions of the wearer between a body trunk 11 and respective left and right thighs 12 of the wearer 10 respectively. FIGS. 1 to 3 illustrate the wearer 10 standing in upright position with both lower limbs including the left and right thighs 12 aligned together with the body trunk 11. As used herein, the term "left and right" indicates directions viewed from the wearer 10 as described above, that is, corresponds to the right and left in FIG. 1. The wearable assist robot apparatus 1 is configured to be substantially plane symmetry to the left and right with respect to a median sagittal plane 13 of the wearer 10 who wears the wearable assist robot apparatus 1. In this specification and the drawings, reference signs for left and right components are attached with suffixes "L" and "R" to numerals for indicating the left and right components individually, and are denoted only by numeral for indicating generally or indicating a coupled mode, and by describing left or right.

The harness device 2 includes an upper body trunk harness 20 to be worn and retained on an upper body trunk portion 14 of the wearer 10 at or near the thoracis, the clavicle, and the shoulder blades of the wearer 10; a lower body trunk harness 30 to be worn and retained on the lower body trunk portion 15 at or near the belly, the pelvis around the waist and the hip joints, and also referred to as waist cuff; and thigh harnesses 40 to be worn and retained on the thighs 12.

The assist drive mechanism 3 includes: a pair of drive sources 60 disposed respectively on both left and right sides of the lower body trunk portion 15 and configured to generate drive torque around axial lines 61 in a lateral direction; a pair of upper arms 70 extending vertically and disposed respectively on both left and right sides of the upper body trunk portion 14; first passive rotary shafts 91 configured to respectively couple upper ends of the upper arms 70 and the upper body trunk harness 20 so as to be angularly displaceable about the axial line in the lateral direction; a pair of lower arms 80 extending vertically and disposed respectively on both left and right sides from the lower body trunk portion 15 to the thighs 12; second passive rotary shafts 92 configured to respectively couple lower ends of the respective lower arms 80 and the thigh harnesses 40 so as to be angularly displaceable e about the axial line in the lateral direction; and mounting means 94 configured to mount a midsection in the longitudinal direction of the upper arms 70 to the lower body trunk harness 30.

The upper body trunk harness 20 includes a pair of left and right shoulder belts 21 disposed on the wearer 10 at or near the clavicle and the shoulder blades of the wearer 10 in an inverted U-shape; a breast belt 22 surrounding the thoracis and extending obliquely downward from the axillary cavities to the back and may be referred to as breast cuff; and a pair of left and right back belts 23 extending substantially vertically. Ends of the shoulder belts 21 on the breast are fixed to the breast belt 22 at a distance from each other in the lateral direction. The shoulder belts 21 are retained by a cross retaining member 24 so as to be crisscrossed in an X-shape for contact with the wearer 10 on the back, and other ends of the shoulder belts 21 are fixed to ends of the breast belt 22 on the back and upper ends of the back belts 23 at fixing positions 25. The shoulder belts 21 may be provided in parallel without being crisscrossed on the back so as to allow the wearer 10 to easily wear and put off.

The breast belt 22 surrounds an upper portion of the thoracis, and may be separated and coupled near or at the body of sternum and the pit of the stomach as denoted by reference signs 22L and 22R for left and right by a coupler 26 so as to be freely worn and removed. The breast belt 22 may be mechanically a flat plate. To prevent the wearer 10 from having a sense of discomfort and to enhance the compatibility, the breast belt 22 comes into contact with the wearer 10 with a certain degree of snapping force and softly transfer an assisting force moment thereto. However, the breast belt 22, having a too small spring constant, may be deformed too much and thus may not transmit, or may need a long time to transfer the assisting force moment. To enhance the compatibility means to prevent the wearer 10 from having a sense of discomfort when wearing the breast belt 22, and from having a feeling of hardness due to excessive rigidity of the breast belt 22.

The pressure applied by the assisting force moment to the wearer 10 per unit area may be reduced by increasing a contact area between the breast belt 22 and the wearer 10. This, however, increases the covered area of the front surface of the wearer 10, thereby increasing the probability of perspiration. The breast belt 22 is configured to achieve both functionality and comfort.

The upper body trunk harness 20 is configured to be divided into breast belt pieces 22L and 22R in a symmetrical manner by the coupler 26 so as to facilitate wearing. One breast belt piece 22L covers from a mounting position of the first passive rotary shaft 91 on the side portion of the thoracis to ¼ to ½ of the front portion and from the mounting portion of the first passive rotary shaft 91 to approximately ¼ of the rear portion to form part of a cylinder within a range of covering around the upper portion of the thoracis by approximately ¼ to ⅜. The same applies to the other breast belt piece 22R. The respective breast belt pieces 22L and 22R covering approximately ¼ to ⅜ the front portion of the thoracis may reduce a surface pressure per unit area specifically at the time of assist for lifting of a heavy load which requires a large assisting force moment, and thus prevents the upper body trunk harness 20 from becoming hard to wear due to an excessive covering area while preventing a feeling of being pressed from becoming too strong. As used herein, the term "assist" may also be referred to as "assistance". The breast belt 22 is formed, for example, of a synthetic resin having a vertical width of 30 to 60 mm, and a thickness of 5 mm. The breast belt 22 is provided with a resilient cushion member covered with a meshed cover for damping so as to face the breast. The meshed cover secures air-ventilation at the time of perspiration.

The breast belt 22 is formed of a synthetic resin having a certain degree of rigidity and flexibility for transferring the assisting force moment softly, and with a material including the meshed cushion member and the resin material to improve wearability and ability for transferring the assisting force moment added thereto, a low price is achieved. As the breast is softer than the thighs 12, the breast belt 22 as a breast cuff having the same hardness as a retaining piece 43 (FIG. 10) as a cuff for the thighs 12 is too hard. Therefore, the aforementioned certain degree of rigidity and flexibility corresponds to substantially the same rigidity and flexibility as an aluminum plate having a width, for example, of about 30 to 60 mm and a thickness of about 0.5 to 2 mm. The breast belt 22 may be formed of a composite material including aluminum and a synthetic resin or a composite material including carbon fibers and a synthetic resin as the composite resin material having rigidity and flexibility, being lighter than and having substantially the same strength as the aluminum plate alone.

The tanned leather has poor elasticity and robust, but is easily deformed because of too much flexibility in terms of assisting force moment transferring property. Consequently, wearability is lowered, and the assisting force moment transferring property may delayed. In order to solve the problem described above, the aforementioned synthetic resin material having a slightly higher rigidity than the value measured by an existing leather softness is employed as the breast belt 22 of the invention.

The left and right shoulder belts 21 are preferably fastened with gaps enough to allow a finger to be inserted with respect to the shoulders of the wearer 10 to keep the shoulders free from the weight of the assist robot apparatus 1 of this application, and thus the shoulder belts 21 have a function to prevent the apparatus from falling down when a waist belt 33 and a belly belt 34 falls off the pelvis. The shoulder belts 21 may be omitted.

Figure 77:
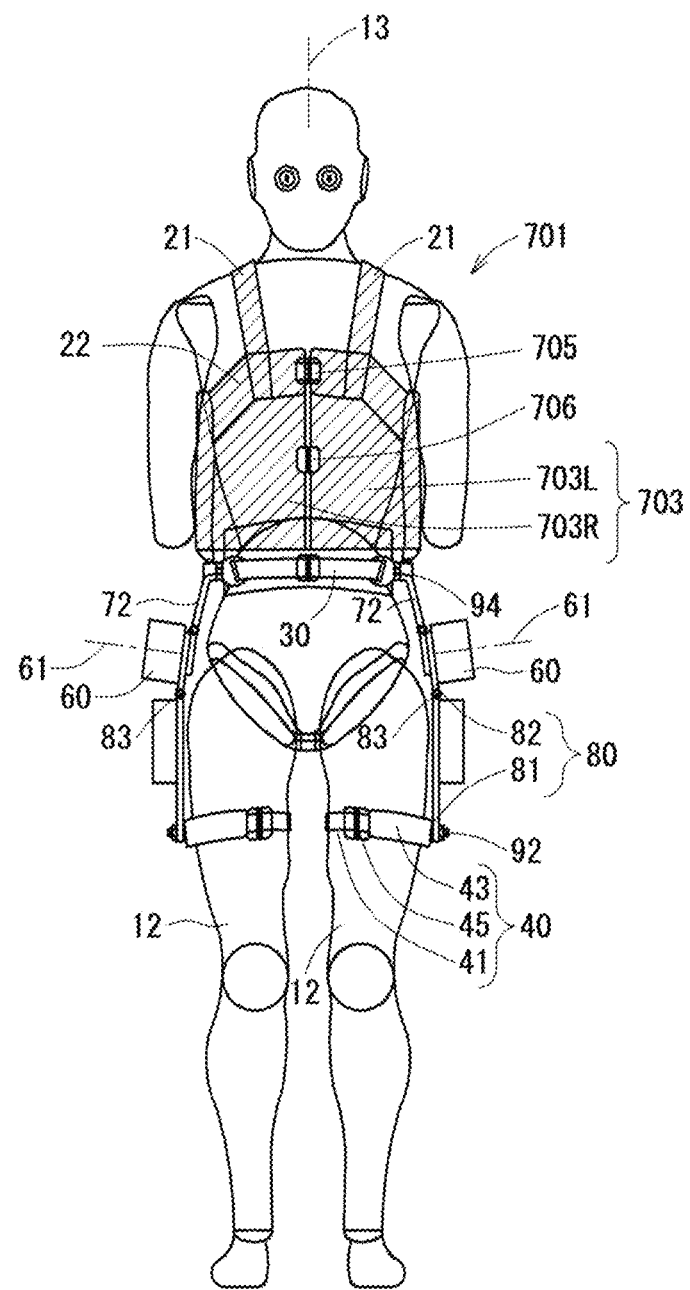
FIG. 77 is a front view illustrating a state in which the wearer 10 wears a wearable assist robot apparatus 701 according to another embodiment of the invention.
Figure 78:
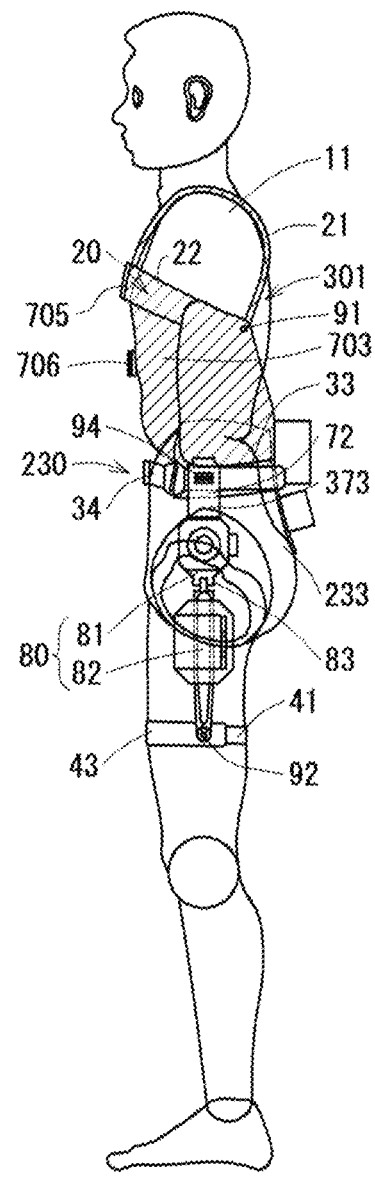
FIG. 78 is a side view illustrating a worn state of the wearable assist robot apparatus 701.
Figure 79:
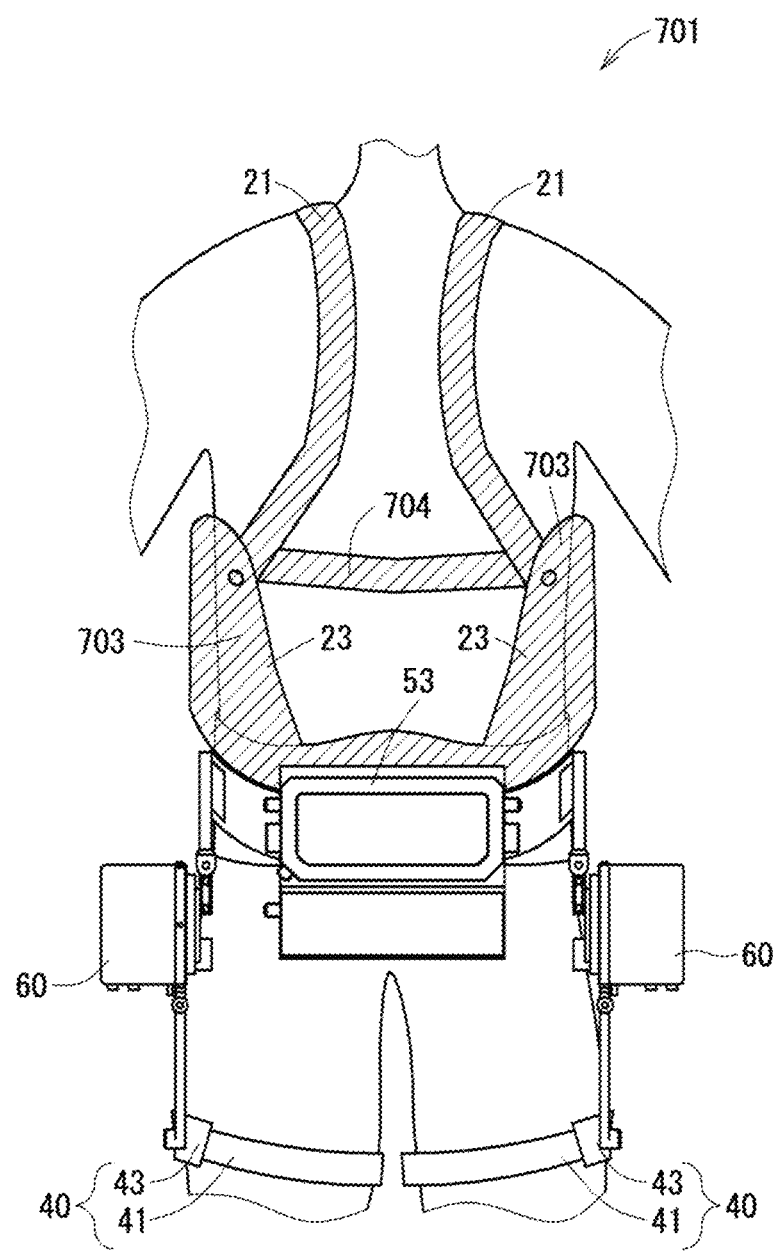
FIG. 79 is a back view illustrating a worn state of the wearable assist robot apparatus 701.

In another embodiment of the invention, a meshed no-sleeve open-front vest described later as illustrated in FIG. 77 to FIG. 79 is attached to an inner surface or an outer surface of the upper body trunk harness 20 when in use to secure proper air-ventilation and make clear where to insert the arms for the wearer 10, and to make the harness easy to wear and remove. In other words, the shoulder belts 21, the breast belt 22, and the back belts 23 are attached to the meshed vest, for example, by stitching or the like. The vest is an open-front configuration, and thus is provided with attachable and detachable couplers 705 and 706 configured to couple left and right front bodies (reference signs 703L and 703R in FIG. 77) on the left and right with respect to a front center line in the front of the wearer. Employment the meshed vest together with the upper frames 70 make the usage during the hot summer season comfortable.

The vest is also referred to as waistcoat or gilet having no sleeve and, in this embodiment of the invention, may be a short vest (1) covering the breast, the belly, and the back, (2) covering the breast, and at least part of the belly or at least part of the back, or (3) covering the breast, and at least part of the belly such as a central belly portion and at least part of the back such as part close to the waist.

Figure 5:
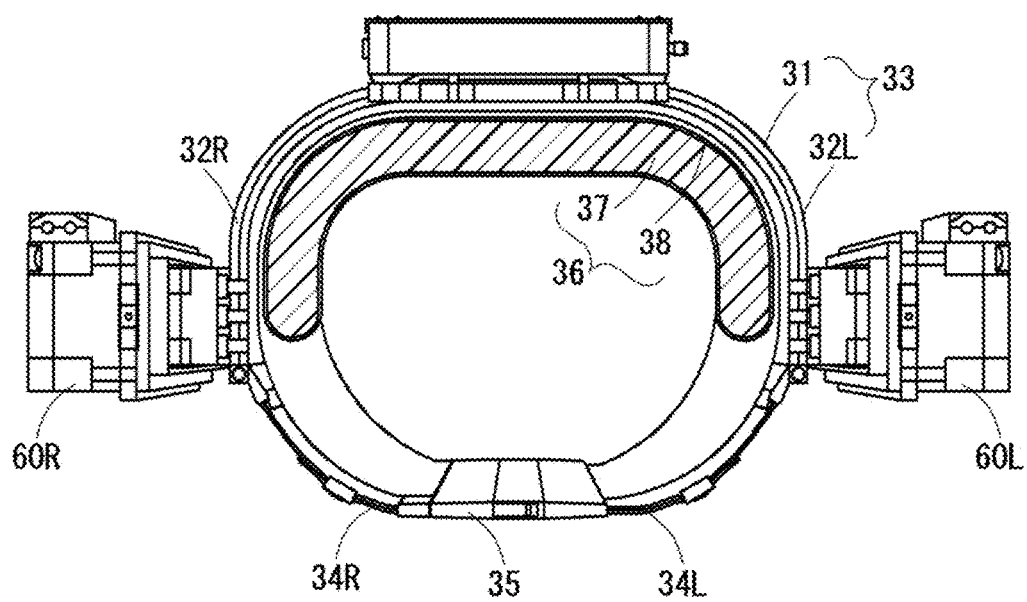
FIG. 5 is a horizontal cross sectional view of a lower body trunk harness 30.
Figure 6:
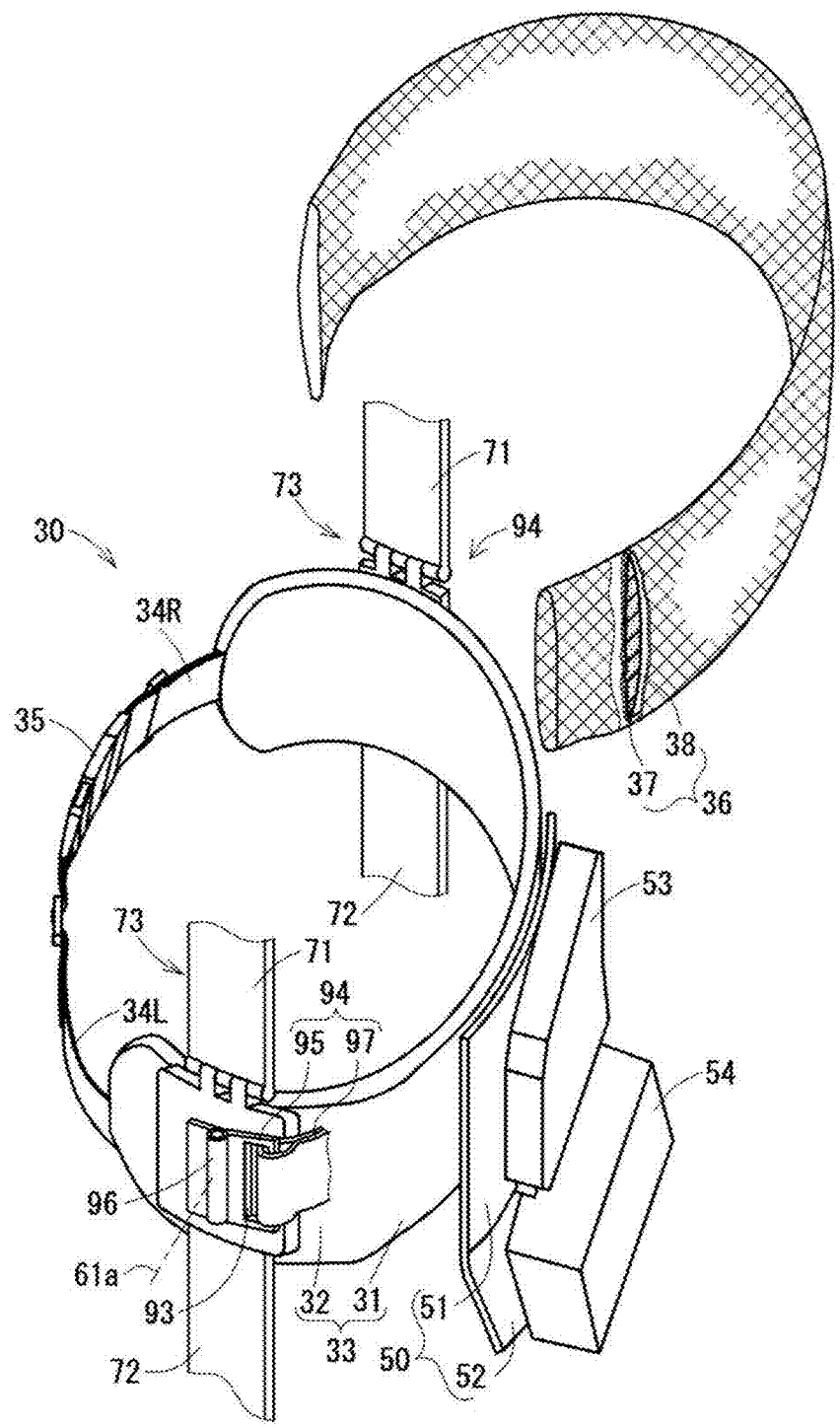
FIG. 6 is an exploded perspective view of the lower body trunk harness 30.

FIG. 5 is a horizontal cross sectional view of the lower body trunk harness 30, and FIG. 6 is an exploded perspective view of the lower body trunk harness 30. The lower body trunk harness 30 includes the waist belt 33 surrounding, for example, approximately ½ around the lower body trunk portion 15 from a rear portion 31 of the back to side portions 32 at or near left and right side belly portion over, and the belly belt 34 fixed to both ends of the waist belt 33 so as to continue therefrom, and is formed into an annular shape as a whole. The belly belt 34 is wearable and removable by the couplers 35 being separated and coupled by the coupler 35 laterally at or near an umbilical region as indicated by reference signs 34L and 34R.

The lower body trunk harness 30 is provided with a protector 36 removably attached so as to face the lower body trunk portion 15 of the waist belt 33. The protector 36 is a resilient cushion member 37 for damping covered with a meshed cover 38, extends along the waist belt 33 in a circumferential direction of the lower body trunk portion 15, and has a size and a shape wider than the waist belt 33 in a vertical direction. The cushion member 37 may be reinforced by covering a core material. The protector 36 achieves a comfortable wearing feeling around the waist in a state in which the waist belt 33 and the belly belt 34 are fastened around and held by the lower body trunk portion 15 so as not to be misaligned from each other. The existence of the protector 36 between the waist belt 33 and the waist of the wearer 10 prevents the waist belt 33 and the waist from coming into direct contact with each other and alleviate the sense of discomfort when being worn. Both of the waist belt 33 and the belly belt 34 do not transfer the assisting force moment itself and thus do not require high rigidity. However, the waist belt 33 is provided with a control box 53 and a battery box 54 described later attached thereto, and thus is provided with rigidity for supporting these boxes.

The protector 36 is in tight contact with the waist of the wearer 10 over a wide range, and is capable of reliably fixing the waist belt 33 to the waist. Since the cover 38 is a meshed type having a large aperture, the air-ventilation is improved to cope with a hot weather and ensure a feeling of comfort even during perspiration. The lower body trunk harness 30 is disposed at or near the pelvis, and thus is disposed so as to be placed at or near the top of iliac crests projecting sideward in the lateral direction from wings of ilium of the pelvis, thereby being reliably caught by portions at or near the pelvis without falling off the lower body trunk portion 15 downward and being worn reliably on the lower body trunk portion 15. Therefore, the shoulder belts 21 do not press portions at or near the clavicle and the shoulder blades of the wearer 10. Therefore, the wearer 10 is allowed to work with comfort in a state of wearing the apparatus.

Figure 7:
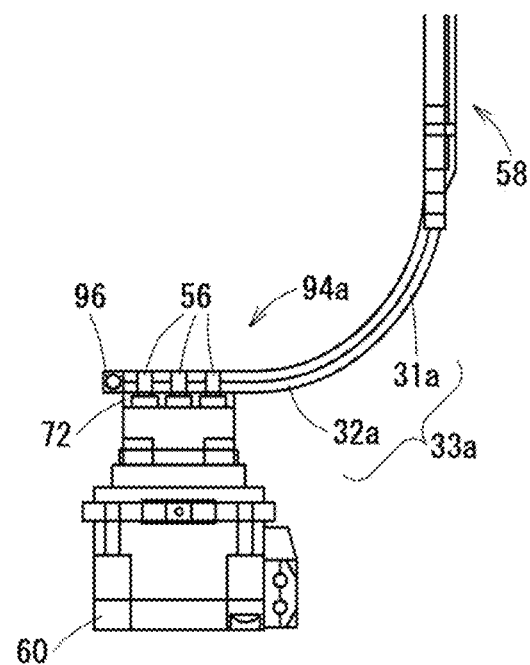
FIG. 7 is a horizontal cross-sectional view illustrating part of mounting means 94a and periphery thereof in another embodiment of the invention.
Figure 8:
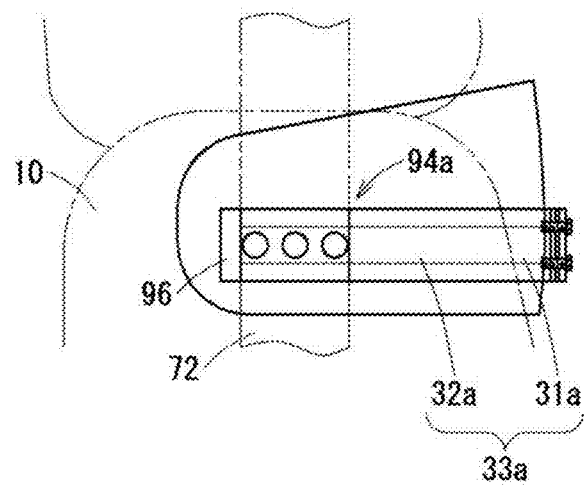
FIG. 8 is a schematic side view of the mounting means 94a and the periphery thereof.
Figure 9:
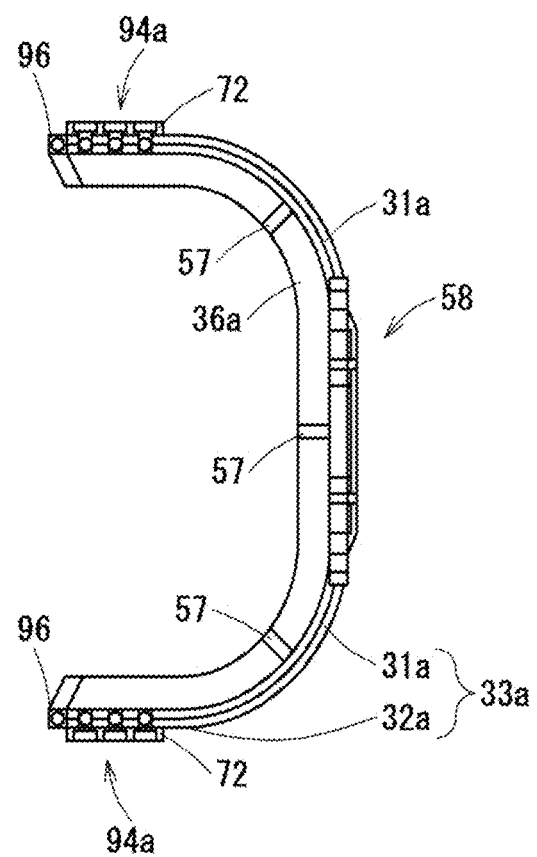

FIG. 7 is a horizontal cross-sectional view illustrating part of mounting means 94a and periphery thereof in another embodiment of the invention, FIG. 8 is a schematic side view of the mounting means 94a and the periphery thereof, and FIG. 9 is a schematic horizontal cross-sectional view of a waist belt 33a and a protector 36a. This embodiment is similar to the aforementioned embodiment and the corresponding parts are denoted by the same numerals with a suffix "a". It is to be noted that the mounting means 94a is secured with bolts 56 inserted through second upper arm pieces 72 to side portions 32a of the waist belt 33a in a so-called lateral arrangement. The mounting means 94a is formed of a rigid material such as a metal in the same manner as the upper and lower arms 70 and 80, and the like. The protector 36a is a plate formed into a U-shape within a horizontal plane facing the wearer 10 of the waist belt 33a, is fixed by a supporting piece 57, is formed of a resilient material such as a synthetic resin, and has a desirable compatibility with the wearer 10 when being worn. A rear portion 31a of the waist belt 33a separates into left and right parts, and may be adjusted in the lateral direction by an elongated hole of a length adjusting mechanism 58.

Figure 10:
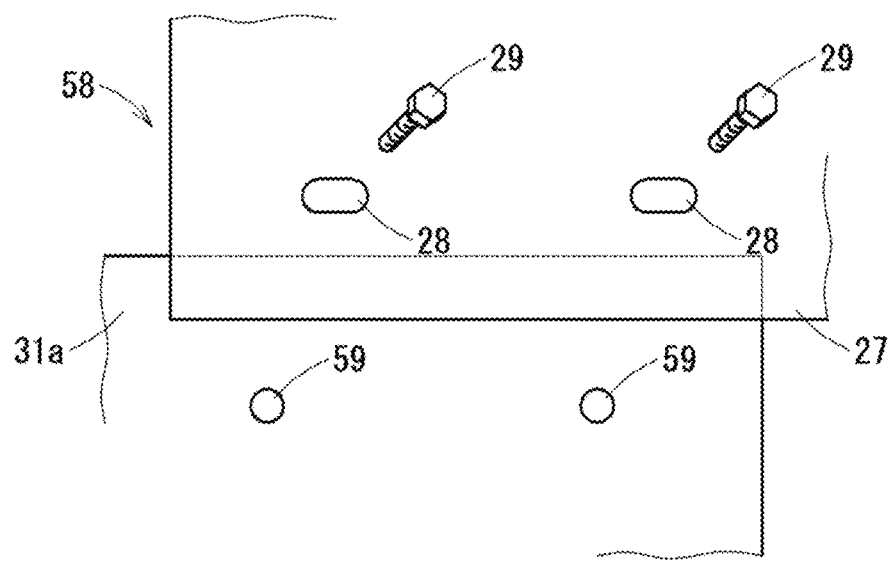
FIG. 10 is an exploded perspective view of part of a length adjusting mechanism 58 viewed from the rear of the wearer 10.

FIG. 10 is an exploded perspective view of part of the length adjusting mechanism 58 viewed from the rear of the wearer 10. One rear portion 31a separated into the left and right parts of the waist belt 33a is provided with a pair of screw holes 59 at a distance in the lateral direction. A coupling auxiliary member 27 is provided with elongated holes 28 extending in the lateral direction corresponding to the screw holes 59. Fixing bolts 29 are screwed into the screw holes 59 through the elongated holes 28, and fix one rear portion 31a and the coupling auxiliary member 27 so as to be adjustable in the lateral direction. The other rear portion 31a separated into the left and right parts of the waist belt 33a is formed in lateral symmetry with the one rear portion 31a, and is fixed to the coupling auxiliary member 27 by fixing bolts so as to be adjustable in the lateral direction.

Figure 11:
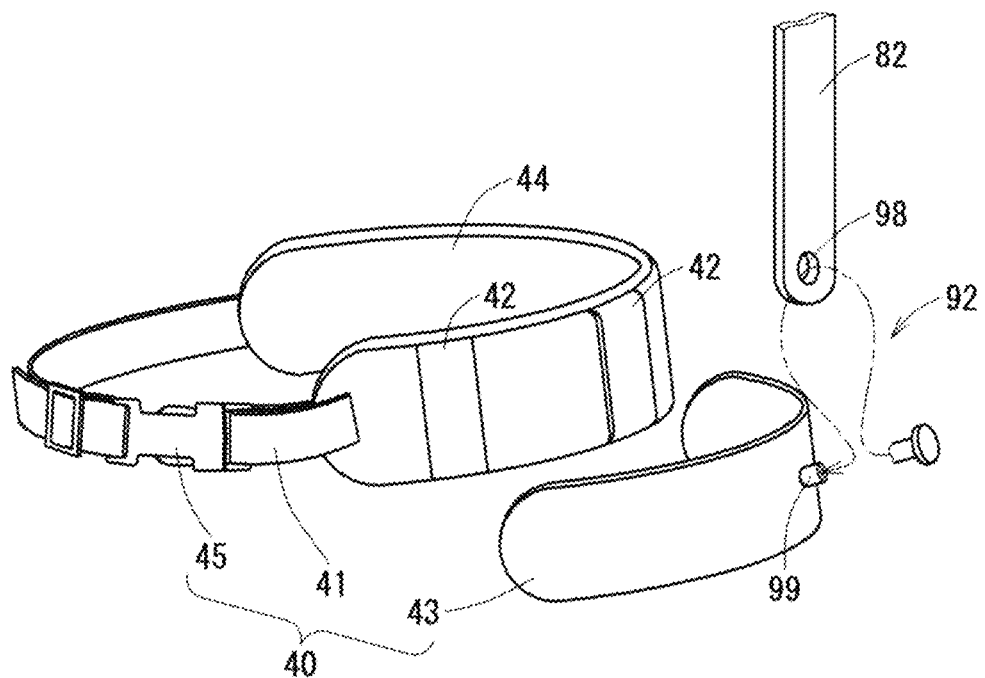
FIG. 11 is an exploded perspective view illustrating a thigh harness 40.

FIG. 11 is an exploded perspective view illustrating a thigh harness 40. The left and right thigh harnesses 40 each include a belt body 41 which may also be referred to as thigh cuff surrounding the entire circumference of the thigh 12, and a retaining piece 43 extending on the outer peripheral portion of the belt body 41 from a fibular side, which is the outside of the thigh 12, to the front partly in the circumferential direction and being fixed to the belt body 41 by a fixing pieces 42.

The belt body 41 is provided with a resilient cushion member 44 so as to face the thigh 12 covered with a meshed cover for damping. The meshed cover secures air-ventilation at the time of perspiration. The belt body 41 is wearable and removable by being separated and coupled by the coupler 45 laterally at or near a tibial side inside the front thigh region. A second passive rotary shaft 92 of the thigh 12 is disposed outside at or near the center of the thigh 12 in a anteroposterior direction. The thigh harnesses 40 are placed on the thighs 12 at selected positions as low as possible so as not to come into contact with the bent knees.

The belt body 41 and the retaining piece 43 may have improved wearability and compatibility and lower prices by employing a synthetic resin material having lower flexibility and higher rigidity than the breast belt 22 but enough rigidity to transfer the assisting force moment instantaneously and flexibility to some extent, or by using the aforesaid resin material including a meshed cushion member added thereto or the above-described aluminum plate including the meshed cushion member added thereto on the front portion of the thigh 12 over approximately ¼ to ½. The rigidity and the flexibility of the belt body 41 and the retaining piece 43 are substantially the same as the rigidity and the flexibility of the aluminum plate having sizes of about 30 to 60 mm in width and a thickness of about 2 to 5 mm. In this configuration, the rigidity of the belt body 41 and the retaining piece 43 may be improved to reliably transfer a strong assisting force moment to the front portion of the thigh 12 when lifting a heavy load. An assisting force moment for swinging the free leg at the time of walking upward is applied to the rear portion of the thigh 12, and the assisting force moment during walking is smaller than that for lifting the heavy load described above, so that rigidity is not so much required.

The belt body 41 does not have to be an annular shape, and may be composed of two front and rear plates of the thigh 12. However, in order to secure an area of contact with the wearer 10 to some extent, a plate curved to a shape approximate to the outer shape of the thigh 12 is also applicable.

The retaining piece 43 covers the periphery of the thigh 12 over a range of approximately ¼ to ½, and is, for example, a synthetic resin having a width of 30 to 60 mm in the vertical direction and a thickness of 5 mm. By covering the thigh 12 by ¼ to ½ the circumference, the assisting force moment is easily transferred from the lower arm 80 to the thigh 12.

In this embodiment, the retaining piece 43 covers over a half to the front portion of the thigh 12 from a position at or near an outside portion of the thigh 12 where the second passive rotary shaft 92 is attached and constitutes part of the cylinder. The retaining piece 43 covering the front portion of the thigh 12 over a wide range may reduce a surface pressure per unit area specifically at the time of assisting lifting of a heavy load which requires a large assisting force moment, and thus prevents the thigh harnesses 40 from becoming hard to wear due to an excessive covering area while preventing a feeling of being pressed from becoming too strong. The degree of hardness of the material for the retaining piece 43 is selected to a resin material as sufficiently hard as the material for the upper and lower arms 70 and 80 for an upper waist, a lower waist, and the thighs for transferring assisting force moment. An inner side of the retaining piece 43 as a cuff to be provided on the thighs 12 so as to come into contact with the wearer 10 is provided with a cushion member 44 including a meshed cover for compatibility and for countermeasure for perspiration so as to face the thigh 12.

Couplers 26, 35 and 45 have an easy-to-operate configuration for connection and separation, and are commercially available as, for example, plastic buckles or a one-touch connectors.

Figure 12:
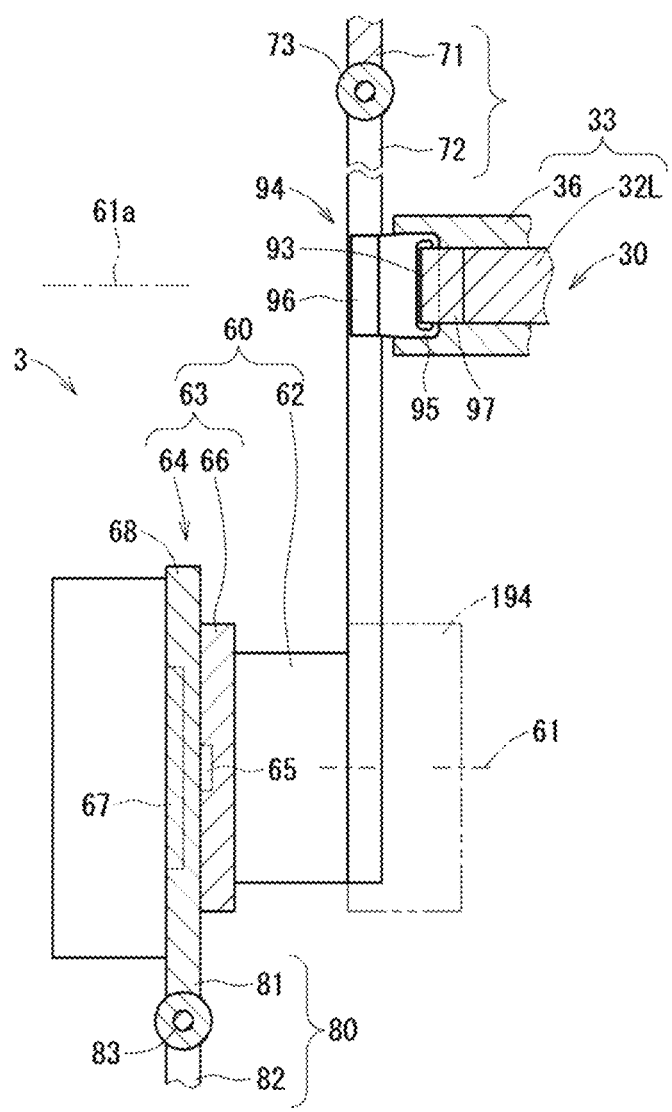
FIG. 12 is a cross-sectional view illustrating part of an assist drive mechanism 3.

FIG. 12 is a cross-sectional view illustrating part of the assist drive mechanism 3. The drive source 60 includes a drive shaft 62 configured to rotate about the axial line 61, and a drive source body 63 configured to generate torque on the drive shaft 62 about the axial line 61. The drive source body 63 includes, for example, an electric motor 64 realized by an AC servo motor or the like and speed reducers 66 configured to reduce the rotational speed from the output shaft 65 to the drive shaft 62 of the electric motor 64. The electric motor 64 includes a motor body 68 as a housing, and the motor body 68 contains a rotor or the like configured to apply torque to an output shaft 65 by an electromagnetic force, and an angle sensor 67 configured to detect an angle of the output shaft 65, and thus the drive shaft 62, about the axial line 61.

Where the rotational speeds of the output shaft 65 and the drive shaft 62 in the speed reducer 66 are N65 and N62, respectively, a reduction ratio N62/N65 is selected to be about 1 to 1/100, preferably 1/50 to 1/100. Accordingly, high transfer efficiency with low friction is achieved, so that the drive sources 60 may be rotated lightly without necessity of a large force from the wearer 10 side. As such, a so-called back-drivable drive system may be realized in which the speed reducer 66 and the electric motor 64 may be rotated from the drive shaft 62 side in contrast to a drive system in which the electric motor 64 rotates to output torque from the drive shaft 62 via the speed reducer 66. The drive sources 60 may be moved from the wearer 10 side, and thus a safety apparatus such that the wearer 10 is allowed to move the wearable assist robot apparatus 1 by one's own force even the drive power becomes unavailable is realized. The speed reducers 66 may be, for example, a wave motion gear reducer, a planetary gear reducer, or a cyclo-speed reducer.

Speed reducers generating a large friction in the related art may be configured to be back drivable by using a clutch at an output end or by controlling, but has a drawback in that the back drivability may not be maintained in the absence of the driving source. A speed reducer in another related art is configured to achieve a back drivable configuration by adding a flexible rotational spring at an output end, but has a drawback in that the flexibility is constantly maintained, and thus a force generated by an assisting force moment cannot be transferred immediately when the assisting force moment and thus an assisting force is required. The invention solves these drawbacks in the related art.

The upper arms 70 each include upper and lower first and second upper arm pieces 71 and 72 coupled via a third passive rotary shaft 73 angularly displaceable about an axial line in the anteroposterior direction. Upper end portions of the first upper arm pieces 71 are coupled to the upper body trunk harness 20 via the first passive rotary shafts 91. Lower end portions of the second upper arm pieces 72 are fixed to the drive shafts 62.

The second upper arm pieces 72 at midsections in the longitudinal direction of the upper arms 70 are coupled and fixed to the side portions 32 of the waist belt 33 of the lower body trunk harness 30 by the mounting means 94 so as not to be displaced relatively at least in the anteroposterior direction. The mounting means 94 each include a belt attachment 95 provided with a vertically elongated mounting hole 93, a passive rotary shaft 96 having a vertical axial line and being interposed between the second upper arm piece 72 and the belt attachment 95, and a mounting piece 97 configured to be inserted into the mounting hole 93 and formed of a U-shaped belt in a horizontal plane. Both free ends of the mounting piece 97 are fixed to the side portion 32 of the waist belt 33 in the vicinity of the belt attachment 95 by adhesion, stitching, or the like. Therefore, the second upper arm pieces 72 and the side portions 32 of the waist belt 33 are attached in an arrangement in which respective longitudinal directions of the second upper arm pieces 72 extending vertically and the side portions 32 of the waist belt 33 extending in the anteroposterior direction are shifted by 90 degrees about a virtual axial line 61a parallel to the axial lines 61 of the drive shafts 62.

The upper arms 70 have a function to transfer the drive torque generated by the rotation of the drive sources 60 efficiently to the upper body trunk harness 20. The lower arms 80 have a function to transmit the drive torque generated by the rotation of the drive sources 60 efficiently to the thigh harnesses 40. The waist belt 33 and the belly belt 34 function secondarily to transmit the drive torque generated by the rotation of the drive sources 60 efficiently to the upper body trunk harness 20 and the thigh harnesses 40, prevent the drive sources 60 from being displaced, and prevent the axial lines 61 of the drive shafts 62 from inclining in the lateral direction or inclining in the anteroposterior direction. The waist belt 33 and the belly belt 34 also function to align the axial lines 61 of the drive shafts 62 as close as possible to the straight line passing through the centers of the hip joints of the wearer 10 and prevent the same from being displaced. In this configuration, the respective positions of the upper body trunk harness 20 and the thigh harnesses 40 may be prevented from being displaced upward and downward. The wearer performs respective actions of walking, lifting, lowering, and semi-crouching position with the body trunk 11 kept upright without bending down at the waist by intervertebral joints. The length of the lower arms 80 is selected so that the axial lines 61 of the drive shafts 62 align the straight line passing through the centers of the hip joints of the wearer 10 in a state in which the waist belt 33 is placed on and fixed to hipbones, that is, in a state in which the waist belt 33 is reliably caught by the pelvis at or near the top of iliac crests projecting sideward in the lateral direction from wings of ilium. Therefore, the lower body trunk harness 30 is reliably worn by the lower body trunk without falling off the lower body trunk.

The relative position between the upper body trunk harness 20 and the body trunk 11 with the body trunk 11 in an upright posture is deviated when the wearer 10 bends down at the waist, and the positions of the centers of the bending by the intervertebral joints of the body trunk 11 and the position of the straight line at the centers of the hip joints are deviated from each other. Regarding the deviation, when the drive sources 60 rotate, the positions of the axial lines 61 of the drive shafts 62 move upward and downward with respect to the body trunk 11, the lower body trunk harness 30 including the waist belt 33 restores the relative positions of the drive sources 60 with respect to the body trunk 11. Therefore, a worn state in which the assisting force moment is efficiently applied to the body trunk 11 is automatically restored.

The length of the upper arms 70 is determined by the size of the wearer 10, and is mechanically selected to be as long as possible. The first passive rotary shafts 91 are selected to be as high positions as possible below and near the axillary cavities so as not to come into contact with the axillary cavities. The sizes and the shapes of the shoulder belts 21 and the back belts 23 are selected so that breast belt 22 is placed at the body of sternumon or in a range above the body of sternum and below the clavicle having not much fat or muscles and being capable of easily transferring the assisting force moment without compressing the thoracis.

Figure 13:
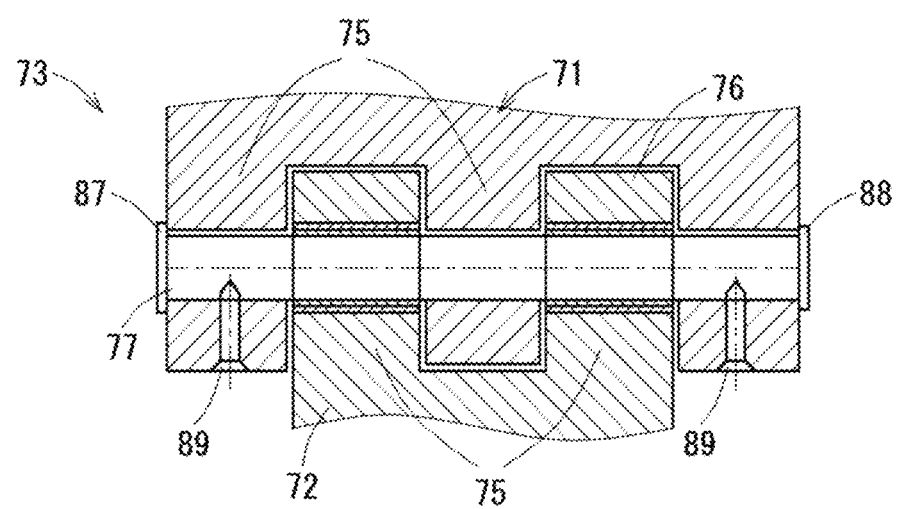
FIG. 13 is a cross-sectional view of a third passive rotary shaft 73 viewed from outside the wearer 10.

FIG. 13 is a cross-sectional view of the third passive rotary shaft 73 viewed from outside the wearer 10. A lower end of the first upper arm piece 71 and an upper end of the second upper arm piece 72 are connected with fork-shaped projecting pieces 75 and 76 fitted to each other so as to be angularly displaceable about a hinge pin 77 via an oilless bush 76. The hinge pin 77 has an axial line in the anteroposterior direction of the wearer 10, and is retained in an axial direction by a retention head 87 and a retaining ring 88, and further by retaining screws 89 which engage with a side portion of the hinge pin 77. Therefore, the upper arms 70 are angularly displaceable about the axial line in the anteroposterior direction by the third passive rotary shafts 73, and allow the body trunk 11 to be bent obliquely in the lateral direction by operations of the intervertebral joints via the vertebral bones including the vertebrae lumbales, whereby causing the assisting force moment to act smoothly in accordance with the posture of the wearer 10. A fourth passive rotary shaft 83 has a configuration similar to the third passive rotary shaft 73.

The lower arms 80 each include upper and lower first and second lower arm pieces 81 and 82 coupled via the fourth passive rotary shafts 83 angularly displaceable about an axial line in the anteroposterior direction. Lower end portions of the first lower arm pieces 81 are coupled to the thigh harnesses 40 via the second passive rotary shafts 92. Upper end portions of the first lower arm pieces 81 are fixed to the motor bodies 68 of the drive source bodies 63. The fourth passive rotary shaft 83 has a configuration similar to the third passive rotary shaft 73 in FIG. 9. Therefore, the lower arms 80 are angularly displaceable about the axial lines in the anteroposterior direction by the fourth passive rotary shaft 83, and thus allows the wearer to turn the lower limbs outward and the legs spread apart smoothly by the operation of the hip joints, whereby causing the assisting force moment to act smoothly in accordance with the posture of the wearer having the legs spread apart.

Referring to FIG. 11 again, the second passive rotary shaft 92 has a configuration in which a pin 99 having an axial line in the lateral direction extending upright and outward from the retaining piece 43 is inserted through a bearing hole 98 formed at a lower end of the second lower arm piece 82. The pin 99 has a retaining head for the second lower arm piece 82. The first passive rotary shaft 91 has a configuration similar to the second passive rotary shaft 92.

When the body trunk 11 is inclined forward, backward, leftward and rightward by the first to fourth passive rotary shafts 91 and 92; 73 and 83, the thigh harnesses 40 do not deviate from the original position even though the legs are spread apart and do not separate from the body without constraining the movement of the wearer 10. Therefore, a length adjusting mechanism is not necessary between the drive sources 60 and the thigh harnesses 40, and thus light weight and low cost are achieved. In other words, the movement of the body trunk 11 is not hindered by the upper body trunk harness 20 owing to the first passive rotary shafts 91 disposed at the mounting positions of the breast belt 22 when the body trunk 11 is inclined forward and backward, and owing to the third passive rotary shafts 73 disposed above the drive sources 60 when the body trunk 11 is inclined leftward and rightward. The movement of the body trunk 11 is not hindered owing to the fourth passive rotary shafts 83 disposed below the drive sources 60 when the legs are spread apart, and owing to the second passive rotary shafts 92 disposed at the mounting positions of the thigh harnesses 40 when swinging the thighs 12 in the anteroposterior direction.

Referring to FIG. 6, the rear portion 31 of the waist belt 33 is provided with a mounting member 50 having a substantially L-shape in vertical cross-section. The mounting member 50 includes a vertical mounting piece 51 to be fixed to the rear portion 31 and another angled mounting piece 52 continuing from the vertical mounting piece 51 and inclined downward as it goes rearward. A control box 53 for containing drive control means 100 for the drive sources 60 is fixed to the vertical mounting piece 51. A battery box 54 for supplying power with the drive sources 60, the drive control means 100, and the like is fixed to the angled mounting piece 52. The angled mounting piece 52 is inclined as described above and does not project significantly downward, and thus does not hinder seating of the wearer 10 on a chair or the like.

Figure 14:
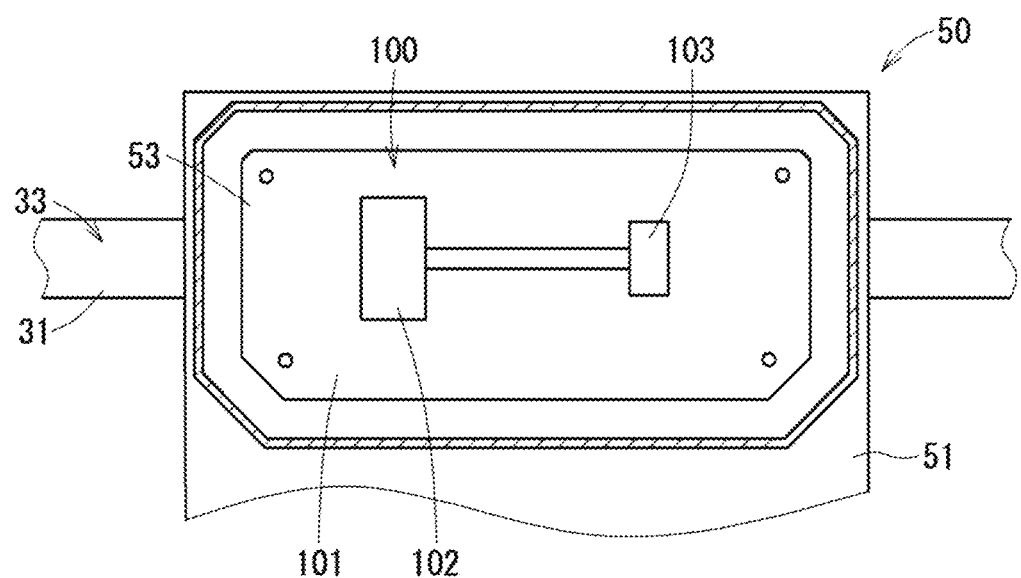
FIG. 14 is a schematic vertical cross-section of a control box 53 when viewed from the rear of the wearer 10.
Figure 14:
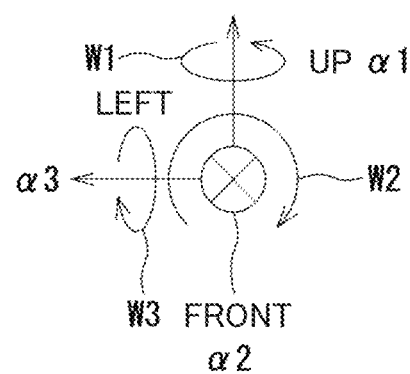

FIG. 14 is a schematic vertical cross-section of the control box 53 when viewed from the rear of the wearer 10. A wiring substrate 101, which is a so-called microcomputer board of the drive control means 100, is fixed to the control box 53, and a processing circuit 113 for drive-control realized by a microcomputer, an acceleration/angular speed sensor 103 connected to the processing circuit 113 is mounted and fixed to the wiring substrate 101. The acceleration/angular speed sensor 103 detects a three-dimensional acceleration of the waist of the body trunk 11 of the wearer 10, that is, an acceleration $\alpha 1$ in the vertical direction and an acceleration $\alpha 2$ in the anteroposterior direction, and furthermore, an acceleration $\alpha 3$ in the lateral direction, respectively. The acceleration/angular speed sensor 103 may be configured to detect a distance of movement of a moving body supported by a spring based on changes in electrical signal such as capacitance or piezoelectric effect, and also includes a gyro sensor in order to detect the acceleration. The acceleration/angular speed sensor 103 also detects an angular speed $\omega 1$ of the thigh and waist of the body trunk 11 of the wearer 10 about the axial line in the vertical direction, an angular speed $\omega 2$ about the axial line in the anteroposterior direction, and an angular speed $\omega 3$ about the axial line in the lateral direction.

The acceleration/angular speed sensor 103 may be a sensor configured to detect a change in capacitance between a movable portion, which is one of electrodes of a sensor element and a fixed portion, which is the other electrode, and may be a sensor configured to detect a change of distortion of a spring portion by a piezoresistive element attached to the spring portion configured to connect the movable portion and the fixed portion and having a mass of the sensor element, and the like.

In another embodiment of the invention, the mounting means 94 may be configured to mount one of the drive shafts 62, the drive source body 63 such as the motor body 68, or the first or second lower arm pieces 81 or 82, which are midsections in the longitudinal direction of the lower arms 80 to the lower body trunk harness 30 so as not to be relatively displaced at least in the anteroposterior direction instead of mounting the midsections in the longitudinal direction of the upper arms 70.

Another embodiment of the invention may employ a configuration in which the upper arms 70 and the lower arms 80 are provided with inflexible rigidity, one of the lower ends of the upper arms 70 or the upper ends of the lower arms 80 are coupled to one of the drive shafts 62 or the drive source bodies 63 via passive rotary shafts including hinge pins perpendicular to the axial lines of the drive shafts 62, the other one of the lower ends of the upper arms 70 or the upper ends of the lower arms 80 are connected to the other one of the drive shafts 62 and the drive source body 63 via passive rotary shafts including other hinge pins perpendicular to the axial lines of the drive shafts 62. These hinge pins have axial lines in the anteroposterior direction. Accordingly, the passive rotary shafts 73, 83 rotating about the axial lines in the anteroposterior direction may be omitted from the midsection in the longitudinal direction of the upper arms 70 and the lower arms 80. Still another embodiment may employ a configuration in which the upper arms 70 and the lower arms 80 are flat plates extending along the body trunk 11 and the thighs 12 to have inflexible rigidity about the axial line in the lateral direction for applying the assisting force moment and to have flexibility about the axial line in the anteroposterior direction, and the passive rotary shafts 73 and 83 about the axial lines in the anteroposterior direction are omitted.

In still another embodiment of the invention, the first and second passive rotary shafts 91 and 92 may be realized by spherical bearings. In this embodiment, the third and fourth passive rotary shafts 73 and 83 are provided at the midsections in the longitudinal direction of the upper arms 70 and the lower arms 80.

Figure 15:
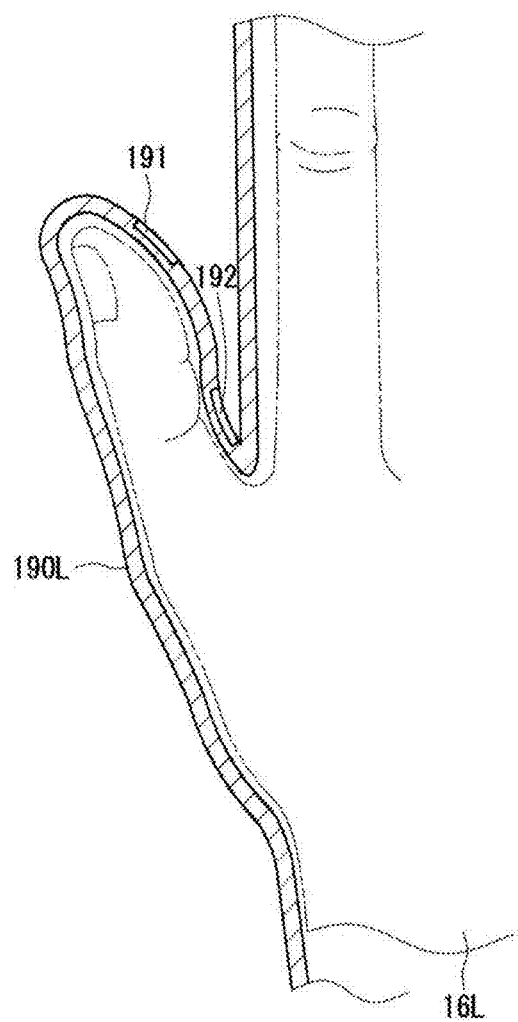
FIG. 15 is a cross-sectional view illustrating part of a glove device 190L to be worn by a left hand 16L of the wearer 10.

FIG. 15 is a cross-sectional view illustrating part of a glove device 190L to be worn by a left hand 16L of the wearer 10. The glove device 190 is provided with object sensors 191 and 192 on an outer surface of the glove. The object sensors 191 and 192 may be configured to detect contact with an object, which is for example an object to be lifted and lowered and referred to as touch switch, and may also be configured, for example, to detect a change in capacitance by the contact with the object, detect a displacement against a spring force of a magnetic force piece caused by a pressed pressure, or perform an detection action by causing a contact point to be turned on/off with a certain degree of load and stroke. In another embodiment of the invention, the object sensors 191 and 192 may be realized by a configuration such as a strain sensor configured to output an electric signal indicating a weight of an object to be lifted or lowered or the like by the wearer 10.

Figure 16:
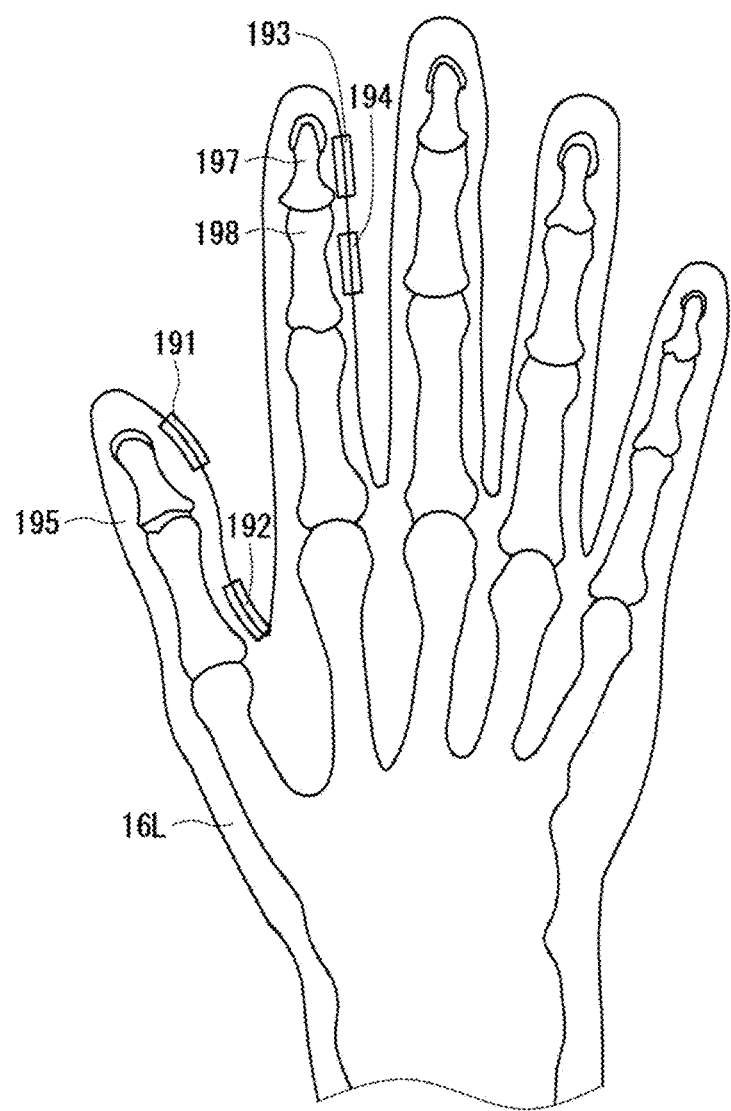
FIG. 16 is a plan view illustrating skeleton of the left hand 16L provided with object sensors 191 and 192 when viewed from a dorsal surface of the hand.

FIG. 16 is a plan view illustrating skeleton of the left hand 16L provided with the object sensors 191 and 192 when viewed from the dorsal surface of the hand. The object sensor 191 is disposed on a palm, which is inside, at or near a distal phalanx 195 of a thumb. Another object sensor 192 is disposed on the palm at or near a metacarpophalangeal joint 196 at a base of the thumb. In another embodiment of the invention, the object sensor 193 is provided on the glove device 190 on the palm at or near a distal phalanx 197 of a second finger. Instill another embodiment of the invention, an object sensor 194 is disposed on the glove device 190 on the palm at or near a proximal phalanx 198 of the second finger. These object sensors 191 to 194 may be provided on the glove device 190 on one hand depending on handling of the object, and may be provided respective gloves for both of the left and right hands.

These object sensors 191 to 194 may be attached inside the glove device 190, or may be adhered to the hand of the wearer 10 with an adhesive tape or the like instead of being provided on the glove device 190, or may be provided in a form of a cap shape such as a fingerstall.

A drive torque output by the drive shafts 62 of the drive sources 60 and an angle θ detected by the angle sensors 67 will be described later in connection with FIG. 32. In FIG. 1 and FIG. 2, in a state in which the wearer 10 is standing upright, the longitudinal direction of the upper arms 70 passing through the axial lines 61 of the drive shafts 62 and the first passive rotary shafts 91 and the longitudinal direction of the lower arms 80 passing through the axial lines 61 of the drive shafts 62 and the second passive rotary shafts 92 are both vertical. The longitudinal direction of the lower arms 80 forms an angle θ with a vertical line. As the wearer 10 walks forward, it is assumed that a direction in which the wearer 10 swings up and bends the thigh 12 of the free leg is positive and a direction in which the wearer 10 extends the thigh 12 of the supporting leg the foot of which is landed is negative. By placing the axial lines 61 of the drive shafts 62 at a position substantially aligned with the straight line in the lateral direction passing through the centers 17 (FIG. 1) of the cotyloid joints of the bone heads of the thighbones fitted into the cotyloid cavities at both left and right hip joints of the pelvis of the wearer 10, the drive torque of the drive sources 60 output about the straight line, that is, the assisting force moment for the wearer 10 is applied to the wearer 10 at high drive transfer efficiency to achieve respective assisting actions such as walking assistance, lifting assistance, lowering brake assistance, and semi-crouching position assistance smoothly.

The pair of left and right drive sources 60 include the drive shafts 62 having the axial lines on the straight line relating to the hip joints, and thus the axial lines of the drive shafts 62 are deviated from the positions of the waist joints that is, the positions of the intervertebral joints during works for lifting, lowering brake, and in the semi-crouching position. However, the axial lines of the drive shafts 62 are apart from the breast belt 22 and the thigh harnesses 40 of the wearer 10, which are working points (force applied points) at a sufficient distance, and thus the drive torque from the drive shafts 62 may be sufficiently transferred to the body trunk 11 as the assisting force moment without problem.

As described later, a plurality of (for example, two) pairs of lower trunk protectors 30a and 30b each pair constituting a pair of the waist belt and the belly belt may be provided at a distance from each other in the vertical direction to reliably prevent the positional displacement between the body trunk 11 and the drive sources 60.

Figure 17:
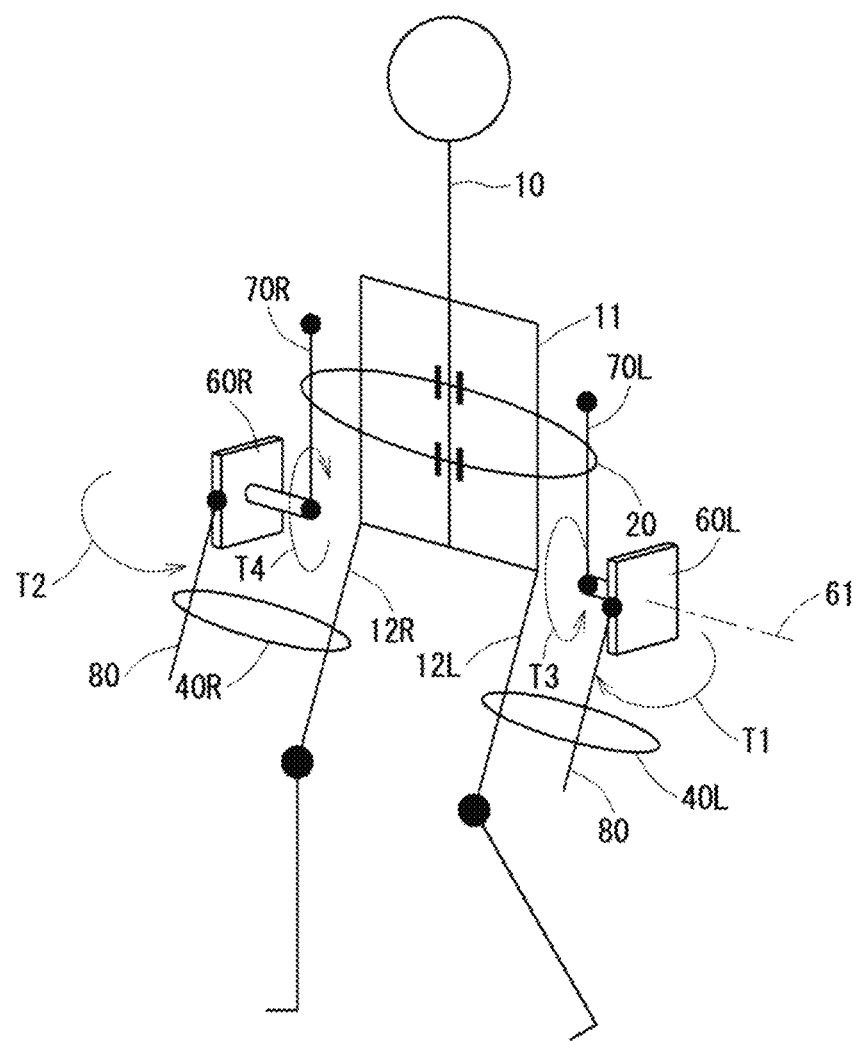
FIG. 17 is a skeleton diagram for explaining a walking assistance action for the wearer 10.

FIG. 17 is a skeleton diagram for explaining a walking assistance action for the wearer 10. The drive sources 60 output drive torque T between the upper arms 70 and the lower arms 80. Accordingly, for walking assistance, the drive torque T from a drive source 60L on the free leg side is transferred to a thigh harness 40L for a thigh 12L about the axial lines 61 of the drive sources 60 disposed left and right outside the centers 17 of the hip joints of the wearer 10, and swing-up force moment T1 acts in a direction of swinging up the thigh 12L. The drive source 60L on the free leg side transfers a reaction force moment T3 for supporting the thigh 12L of the free leg swung up while maintaining the posture of the body trunk from the upper body trunk harness 20.

Figure 18:
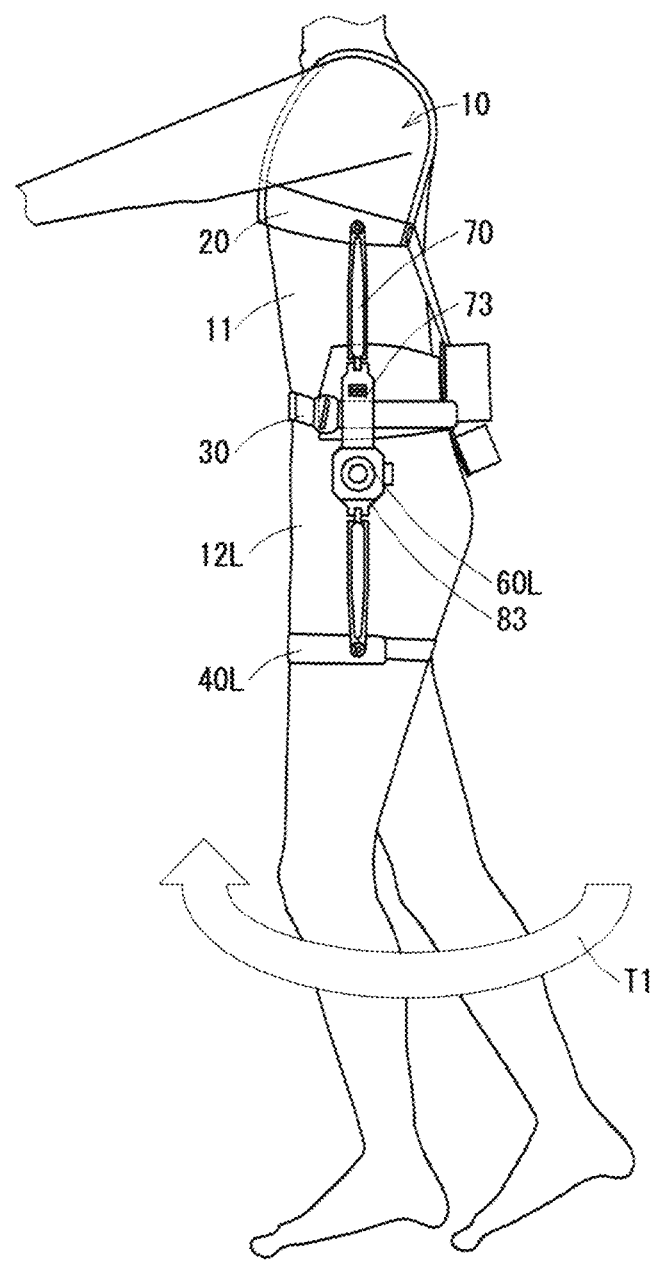
FIG. 18 is a side view illustrating a state in which the wearer 10 is assisted in walking when viewed from the free leg side.

FIG. 18 is a side view illustrating a state in which the wearer 10 is assisted in walking when viewed from the free leg side. The drive source 60L applies the swing-up force moment T1 to the thigh 12L.

For walking assistance, the drive torque T from a drive source 60R on the supporting leg side is transferred to a thigh harness 40R for a thigh 12R, and supporting force moment T2 acts in a direction of supporting the thigh 12R as illustrated in FIG. 15. The drive source 60R on the supporting leg side transfers a reaction force moment T4 for supporting the thigh 12R on the supporting leg side the foot of which is landed while maintaining the posture of the body trunk from the upper body trunk harness 20.

Figure 19:
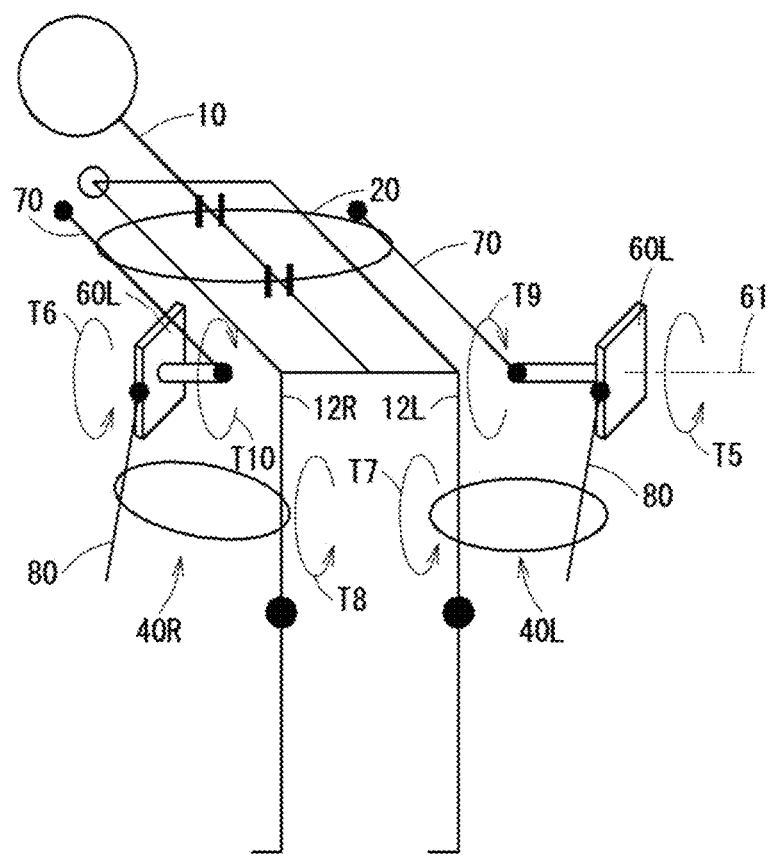
FIG. 19 is a skeleton diagram for explaining a lifting assistance action for the wearer 10.

FIG. 19 is a skeleton diagram for explaining a lifting assistance action for the wearer 10. When the wearer 10 makes an attempt to grip an object with the hands 16 and lift the same, drive torque T5 and T6 from the drive sources 60L and 60R are transferred to the thigh harnesses 40L and 40R for the thighs 12L and 12R, and lifting force moments T7 and T8 act in the direction of supporting the thighs 12L and 12R. The drive sources 60L and 60R apply reaction force moments T9 and T10 for supporting the thighs 12L and 12R while maintaining the posture of the body trunk from the upper body trunk harness 20. Such moments applied to both left and right legs are not only the lifting force moments T7 and T8 for lifting assistance, but also the lowering brake force moment for lowering brake assistance and the like.

Figure 20:
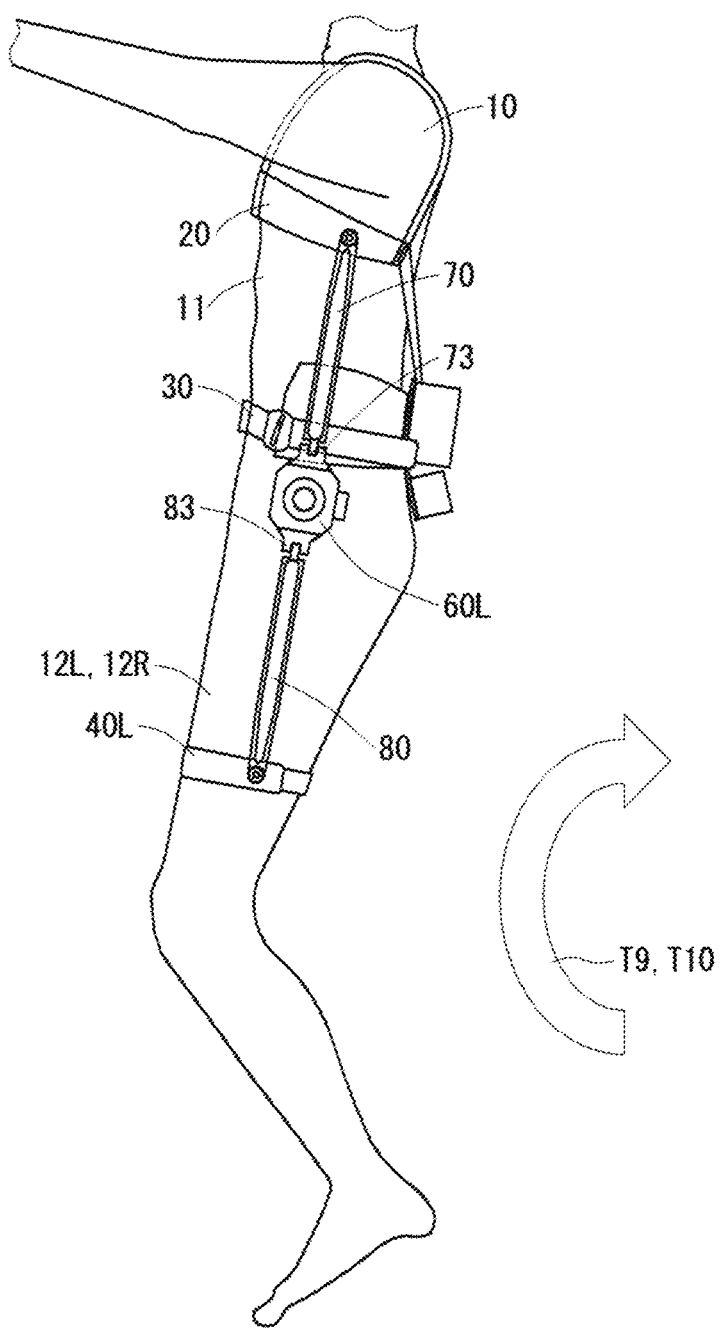
FIG. 20 is a skeleton diagram for explaining a semi-crouching position assistance action for the wearer 10.

FIG. 20 is a skeleton diagram for explaining a semi-crouching position assistance action for the wearer 10. In a state of being in the semi-crouching position, the body trunk 11 stands upright, and the thighs 12 are angularly displaced forward from vertical. The processing circuit 113 detects the semi-crouching position when a state in which the relative angle θ between the body trunk 11 and the respective left and right thighs 12 detected respectively by the left and right angle sensors 67 is decreased continues, for a predetermined period, for example, three seconds or more, by a predetermined angle, for example, 10° or more.

A semi-crouching position assisting force moment for semi-crouching position assistance and a standing-up assisting force moment for standing-up assistance are also the same as the lifting force moment T7 and T8 in FIG. 18.

Figure 21:
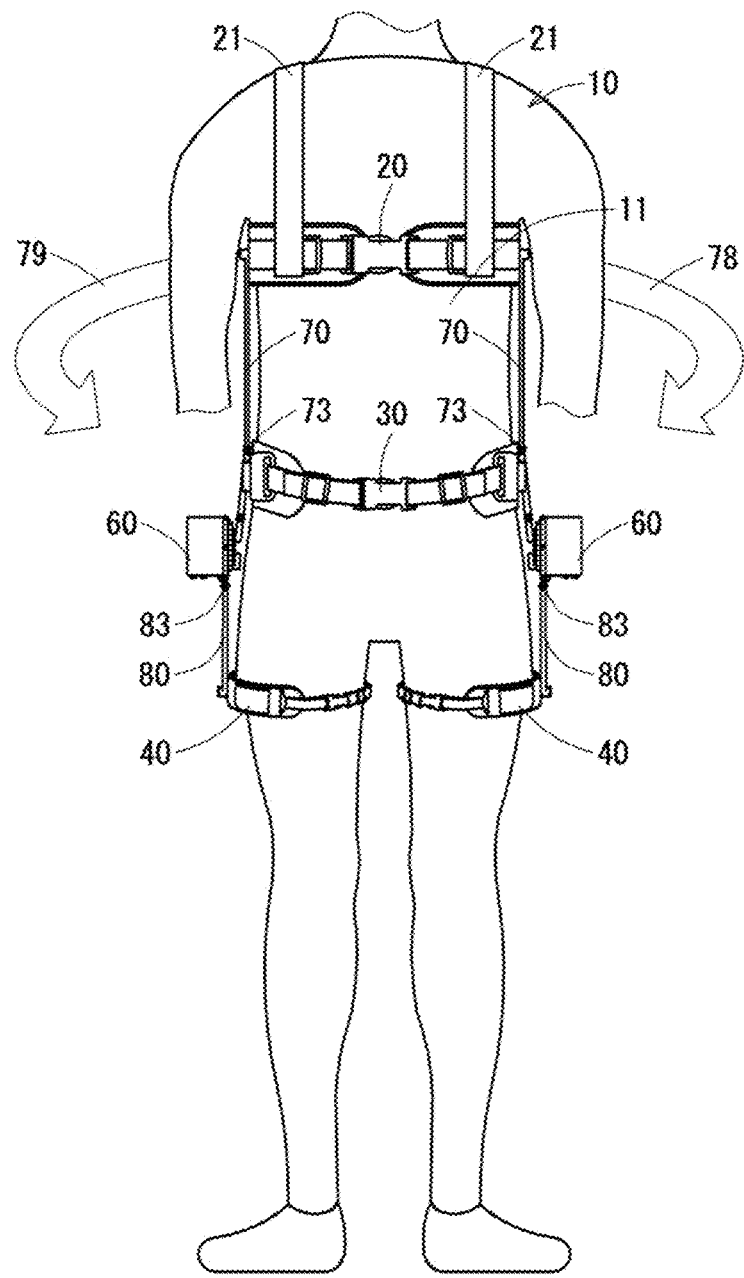
FIG. 21 is a schematic front view illustrating a state in which the body trunk 11 is inclined leftward and rightward.

FIG. 21 is a schematic front view illustrating a state in which the body trunk 11 is inclined leftward and rightward. The third passive rotary shafts 73 interposed at midsections in the longitudinal direction of the upper arms 70 are freely angularly displaceable about the axial line in the anteroposterior direction, and thus the body trunk 11 may be bent obliquely in lateral directions 78, 79 by the movement of the intervertebral joints. Therefore, the assisting force moment may be caused to act smoothly in accordance with the posture of the wearer.

Figure 22:
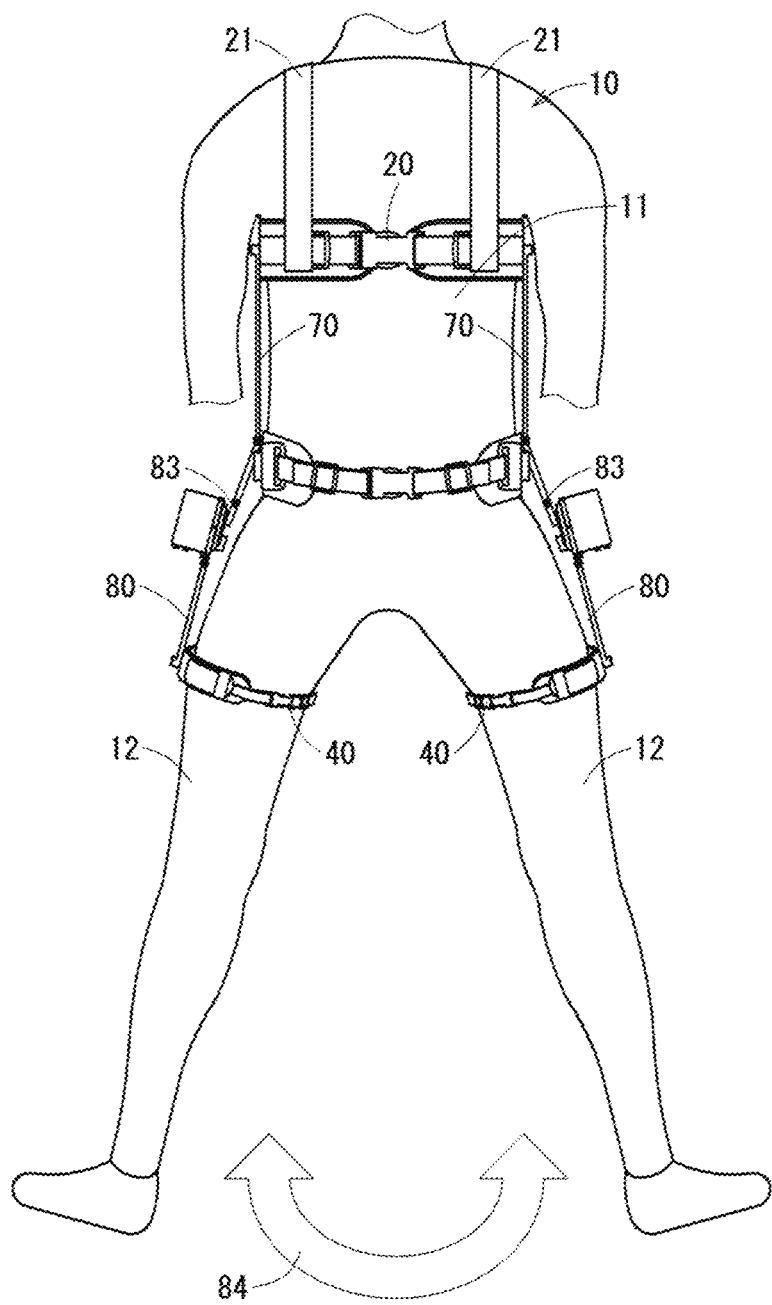
FIG. 22 is a schematic front view illustrating a state in which the lower limbs are turned outward and the legs are spread apart.

FIG. 22 is a schematic front view illustrating a state in which the lower limbs are turned outward and the legs are spread apart. The fourth passive rotary shafts 83 interposed at midsections in the longitudinal direction of the lower arms 80 are freely angularly displaceable about the axial line in the anteroposterior direction, and thus the wearer is capable of turning the lower limbs outward to allow the leg to spread apart smoothly in a direction 84 or of moving the same inward in an opposite direction by the movement of the hip joints. Therefore, the assisting force moment may be applied smoothly in accordance with the posture of the wearer 10 with the legs spread apart.

Figure 23:
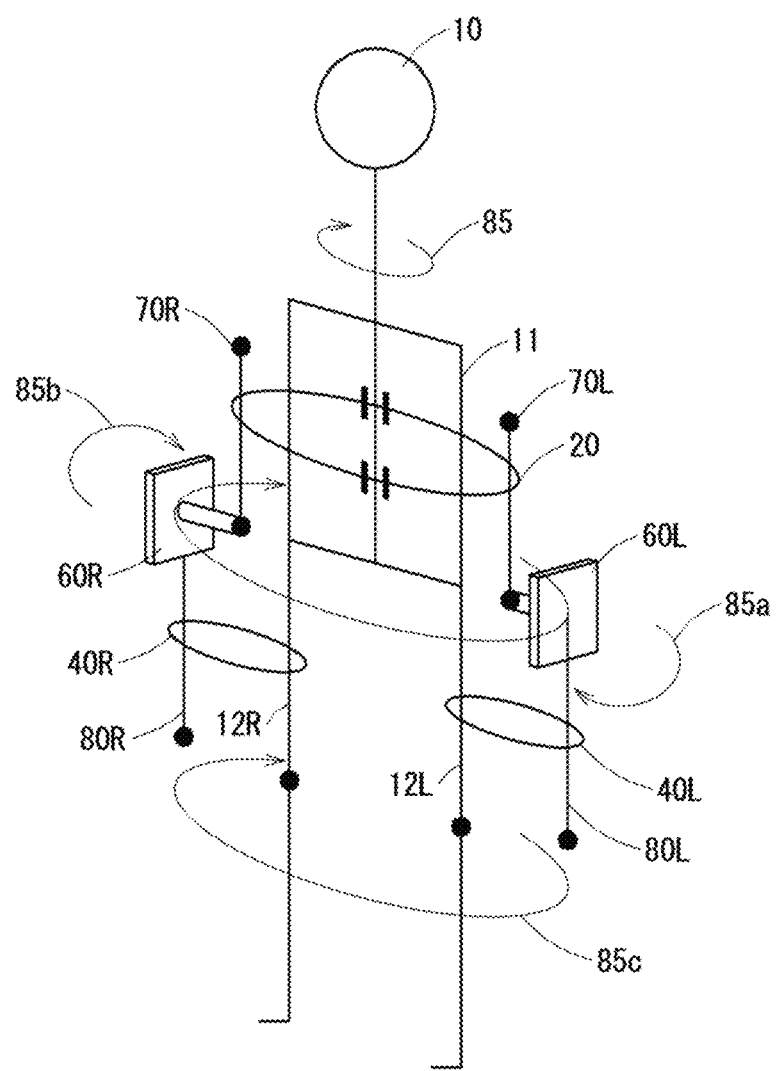
FIG. 23 is a schematic skeleton diagram illustrating a state in which the body trunk 11 is turned.

FIG. 23 is a schematic skeleton diagram illustrating a state in which the body trunk 11 is turned. When a movement to twist the body trunk 11 about an upright long axis in a turning direction 85 is made, the lower body trunk harness 30 provided with the drive sources 60 is angularly displaced in turning directions 85a and 85b together with the body trunk 11, and at this time, the thighs 12 of the lower limbs are angularly displaced in turning direction 85c. The drive sources 60 are disposed on the left and right sides of the body trunk 11, the drive sources 60 are provided with the rigid upper and lower arms 70 and 80 which are not angularly displaced about the long axis of the body trunk 11, and the upper and lower arms 70, 80 are coupled to the upper body trunk harness 20 and the thigh harnesses 40. Therefore, even when the wearer 10 turns, the body trunk 11 is not relatively displaced with respect to the upper body trunk harness 20, the lower body trunk harness 30, the thigh harness 40, and the like, and positional displacement does not occur. Therefore, the assist robot apparatus 1 does not constrain the movement of the wearer 10 and does not come apart from the body, so that an additional configuration for preventing the change in relative position between the body trunk 11 and the drive sources 60 is not necessary and the configuration may be simplified. In the upper body trunk harness 20, the component having a role to prevent the positional displacement with respect to the turning body trunk 11 is primarily the breast belt 22, and secondarily the shoulder belts 21, and the back belts 23.

Figure 24:
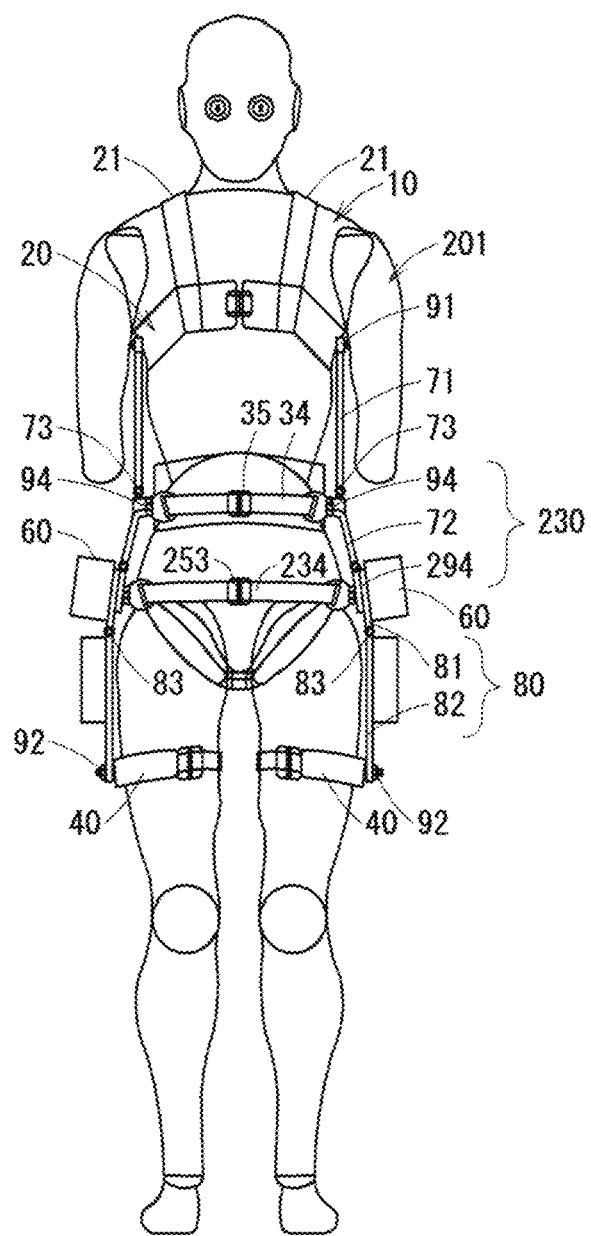
FIG. 24 is a front view illustrating a state in which a wearable assist robot apparatus 201 according to another embodiment of the invention is worn by the wearer 10.
Figure 25:
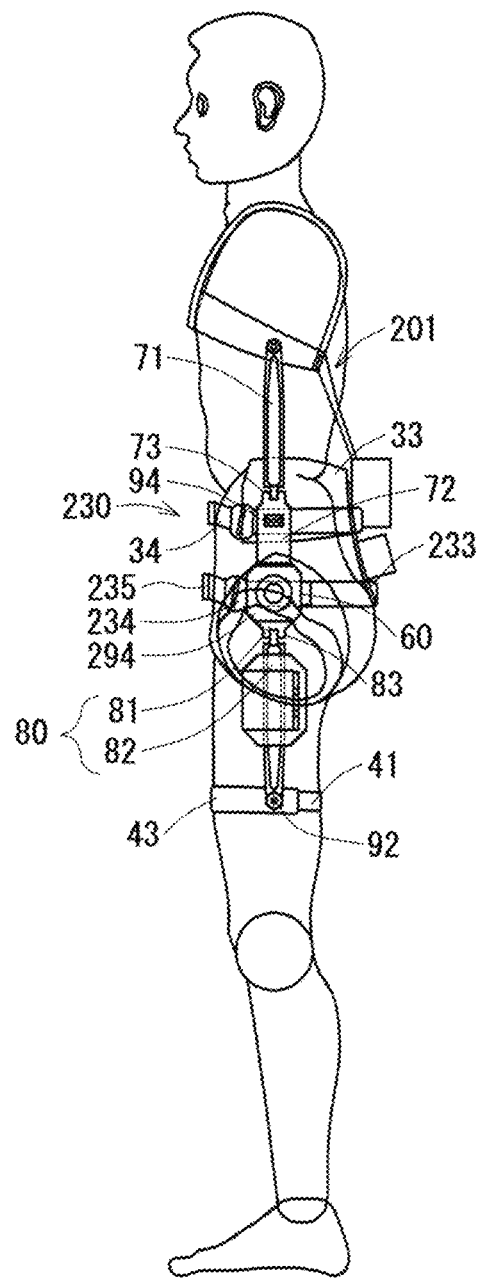
FIG. 25 is a side view illustrating a state of wearing the wearable assist robot apparatus 201.

FIG. 24 is a front view illustrating a state in which a wearable assist robot apparatus 201 according to another embodiment of the invention is worn by the wearer 10, and FIG. 25 is a side view illustrating a state of wearing the wearable assist robot apparatus 201. In this embodiment, parts similar to and corresponding to the above-described embodiments are denoted by the same numbers and the same numbers in 200s, and description thereof is omitted. It is noted that in this embodiment, a lower body trunk harness 230 includes a lower waist belt 233 configured to surround the hipbones of the pelvis of the lower body trunk portion 15 on the back at the positions of the drive sources 60, and a lower belly belt 234 continuing to both ends of the lower waist belt 233, and is formed into an annular shape as a whole. The lower belly belt 234 is wearable and removable by being separated and coupled by a coupler 235 laterally below the umbilical region. Second upper arm pieces 272 are fixedly coupled and attached to the lower waist belt 233 by mounting means 294 (FIG. 8). The lower waist belt 233 is caught by buttocks of the wearer 10 and do not fall off downward. In this manner, the drive sources 60 are further prevented from being displaced in position with respect to the body trunk 11. In the above-described configuration provided with the lower waist belt 233 and the lower belly belt 234, in another embodiment of the invention, the waist belt 33 and the belly belt 34 may be omitted. Other configurations and actions are the same as those described in the above-described embodiments.

Figure 26:
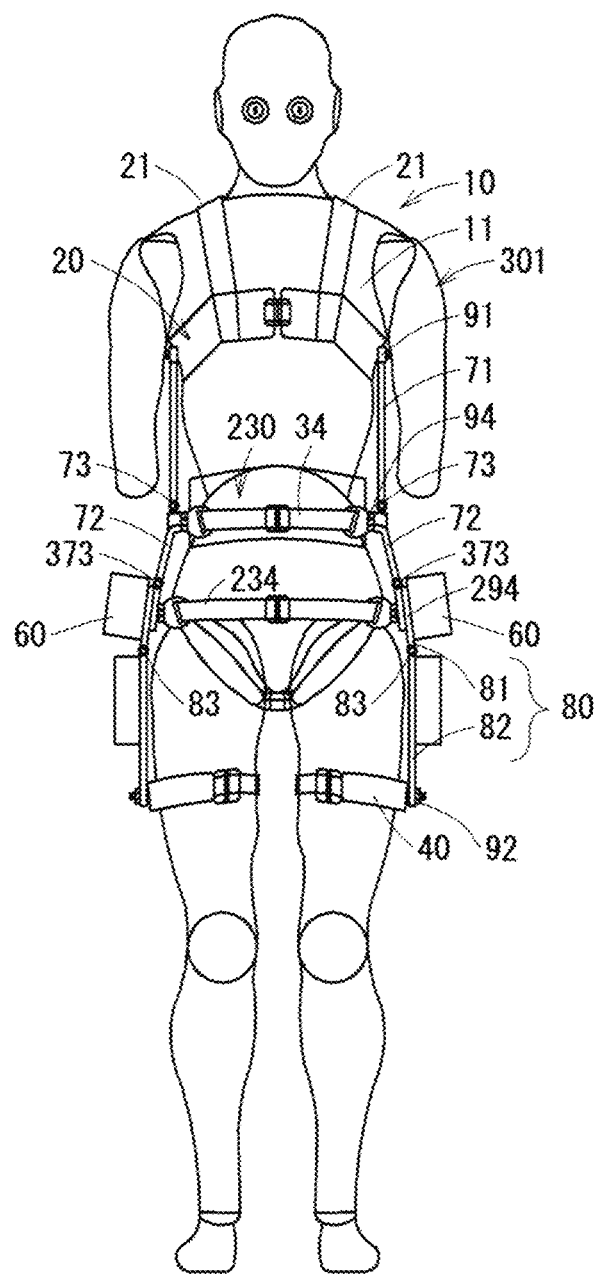
FIG. 26 is a front view illustrating a state in which a wearable assist robot apparatus 301 according to another embodiment of the invention is worn by the wearer 10.
Figure 27:
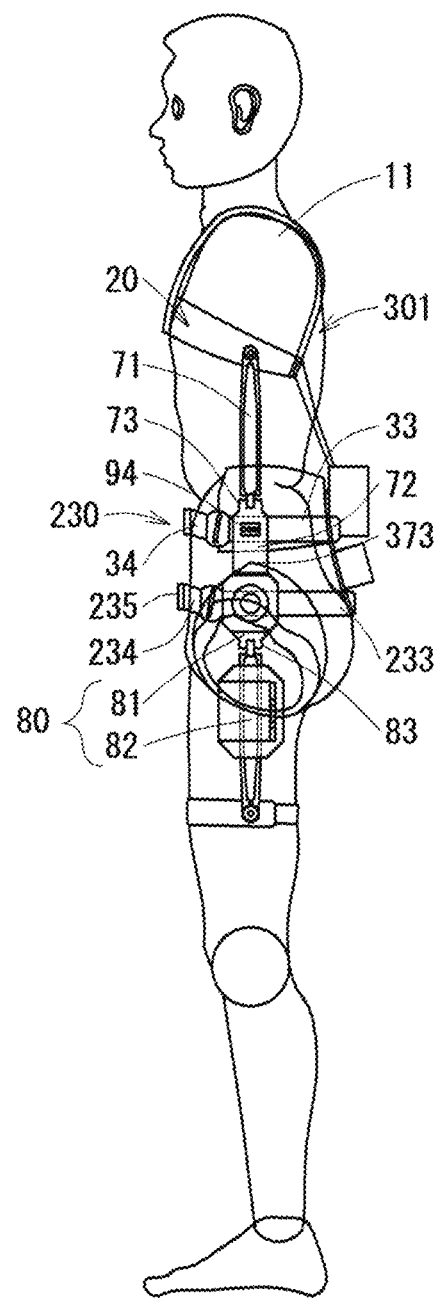
FIG. 27 is a side view illustrating a state of wearing the wearable assist robot apparatus 301.

FIG. 26 is a front view illustrating a state in which a wearable assist robot apparatus 301 according to another embodiment of the invention is worn by the wearer 10, and FIG. 27 is a side view illustrating a state of wearing the wearable assist robot apparatus 301. In this embodiment, parts similar to and corresponding to the above-described embodiments in FIG. 24 and FIG. 25 are denoted by the same or the same numbers in 300s, and description thereof is omitted. It is noted that in this embodiment, fifth passive rotary shafts 374 angularly displaceable about the axial line in the anteroposterior direction are interposed on the second upper arm pieces 72 at positions closer to the drive sources 60. Accordingly, the body trunk 11 may be bent obliquely in the lateral direction by the movement of the intervertebral joints, whereby causing the assisting force moment to act smoothly in accordance with the posture of the wearer 10.

Figure 28:
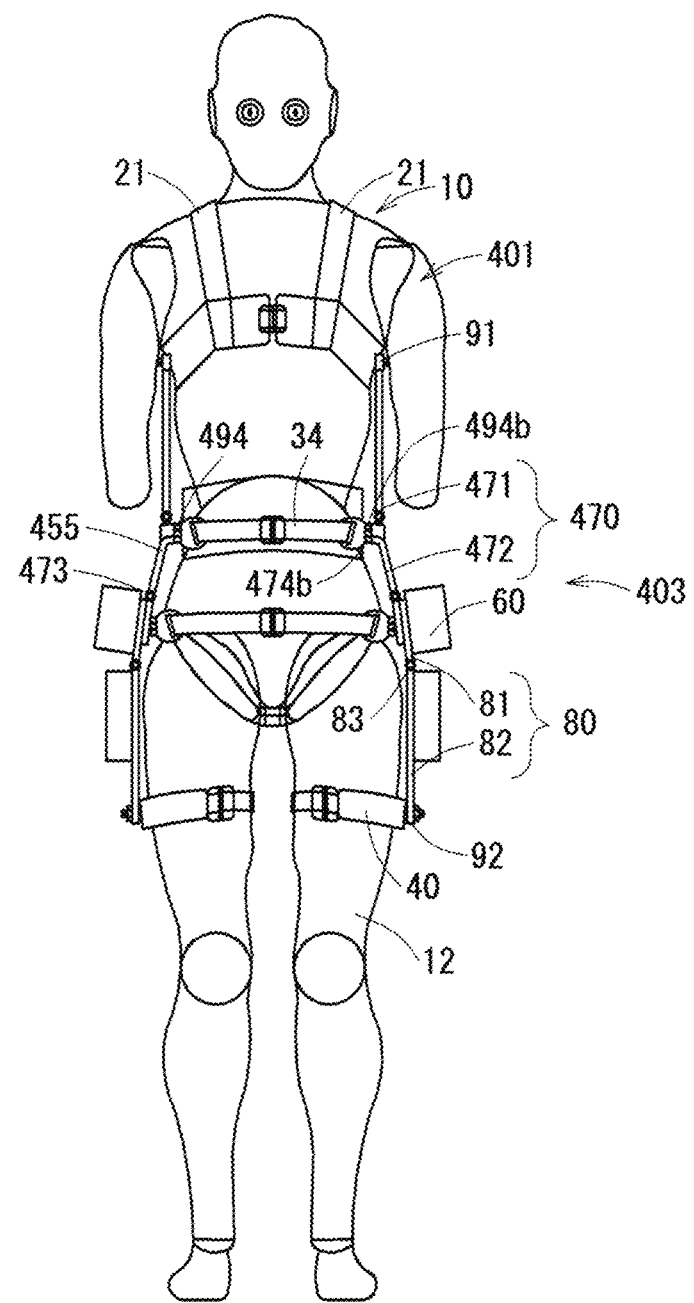
FIG. 28 is a front view illustrating a state in which a wearable assist robot apparatus 401 according to another embodiment of the invention is worn by the wearer 10.
Figure 29:
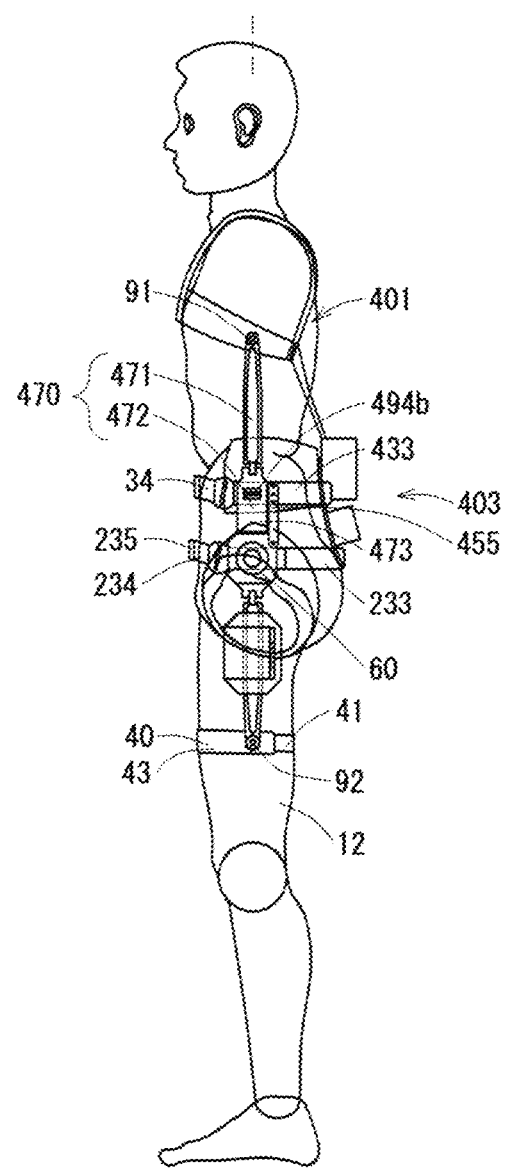
FIG. 29 is a side view illustrating a state of wearing the wearable assist robot apparatus 401.
Figure 30:
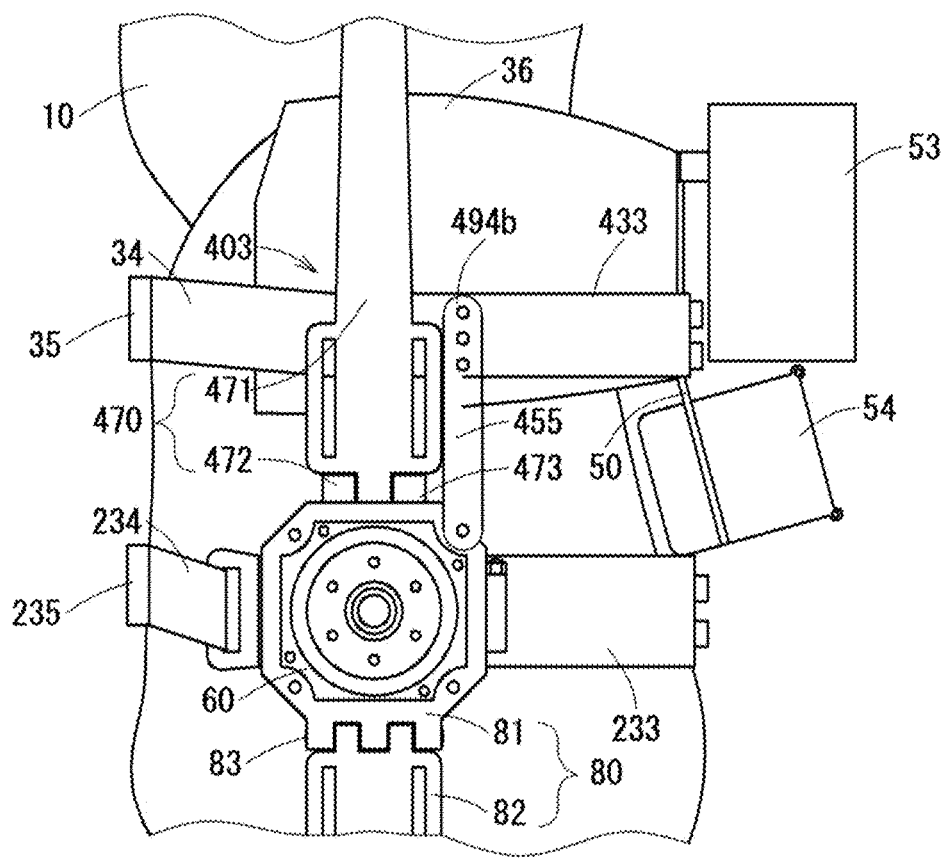
FIG. 30 is an enlarged side view illustrating a portion at or near a drive source 60.
Figure 30A:
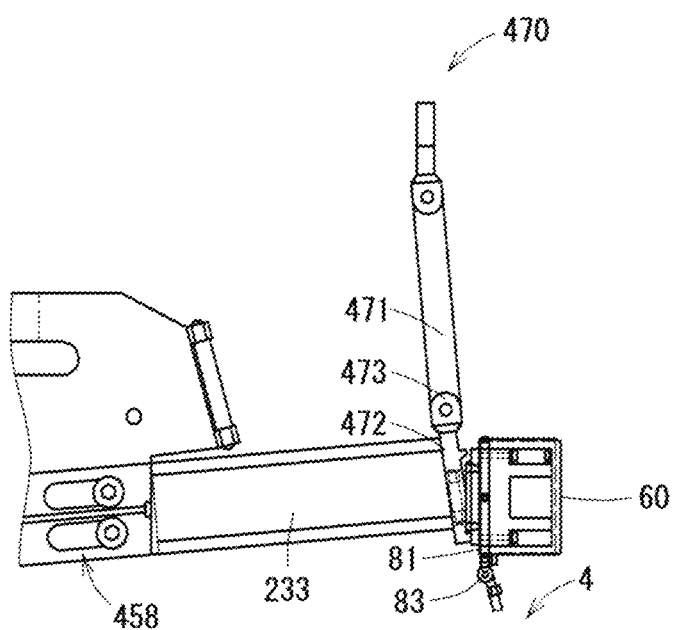
FIG. 30A is an enlarged front view of a portion at or near the drive sources 60 viewed from the front.
Figure 30B:
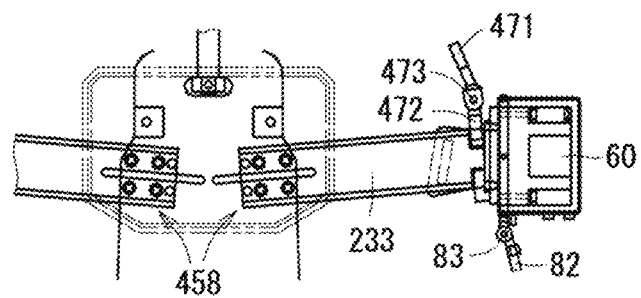
FIG. 30B is an enlarged back view of a portion at or near the drive sources 60 viewed from the rear.
Figure 30C:
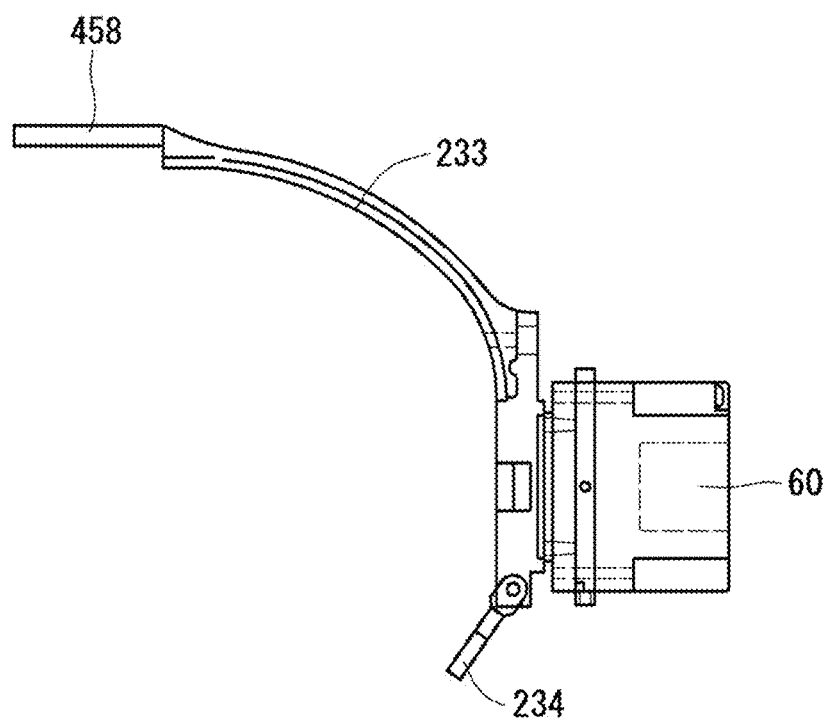
FIG. 30C is an enlarged plan view of a portion at or near the drive sources 60.

FIG. 28 is a front view illustrating a state in which a wearable assist robot apparatus 401 according to another embodiment of the invention is worn by the wearer 10, FIG. 29 is a side view illustrating a state of wearing the wearable assist robot apparatus 401, and FIG. 30 is an enlarged side view illustrating a portion at or near the drive source 60. In this embodiment, parts similar to and corresponding to the above-described embodiments in FIG. 1 to FIG. 25 are denoted by the same or the same numbers in 400s, and description thereof is omitted. FIG. 30A is an enlarged front view of a portion at or near the drive sources 60 viewed from the front, FIG. 30B is an enlarged back view of a portion at or near the drive sources 60 viewed from the rear, and FIG. 30C is an enlarged plan view of a portion at or near the drive sources 60. It is to be noted that an assist drive mechanism 403 of this embodiment, an upper arm 470 includes a first upper arm piece 471 and a second upper arm piece 472 coupled by a sixth passive rotary shaft 473 angularly displaceable about the axial line in the anteroposterior direction at a position closer to the drive source 60. A lower end of the second upper arm piece 472 and a lower end of a supporting arm 455 are fixed to the drive shaft 62 of the drive source 60. An upper end of the supporting arm 455 is fixedly coupled to a side portion 432b of a waist belt 433 by mounting means 494b, and hence the upper arm 470 is attached to the waist belt 433. The mounting means 494b has a vertical shape, and has a configuration similar to the mounting means 94a in FIG. 7 described above. The waist belt 433 is formed of a rigid material such as a metal in the same manner as the upper and lower arms 70 and 80, and is formed into a U-shape in a horizontal plane, and is provided with the belly belt 34 described above fixed thereto. The lower waist belt 233 is provided with an adjusting mechanism 458 configured to adjust the length to surround the waist in the same manner as of the above-described embodiments.

Figure 30D:
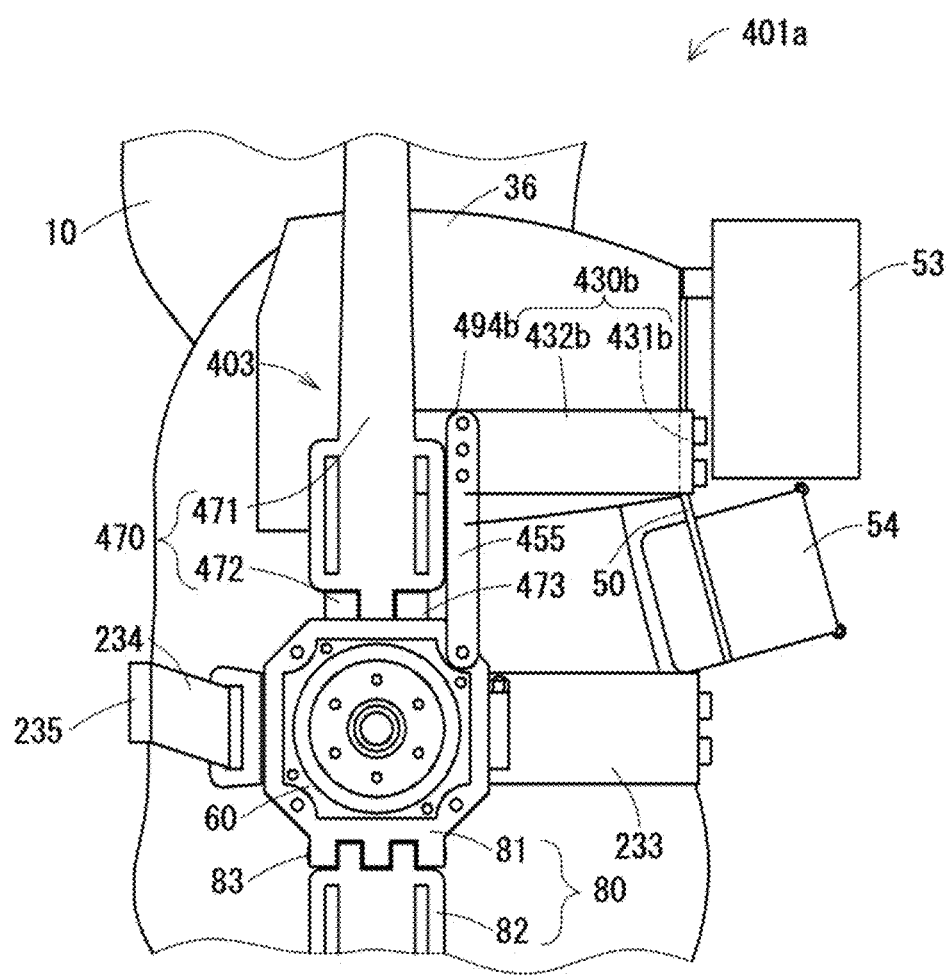
FIG. 30D is an enlarged side view of a portion at or near the drive sources 60 illustrating a state in which a wearable assist robot apparatus 401a according to another embodiment of the invention is worn by the wearer 10.

FIG. 30D is an enlarged side view of a portion at or near the drive sources 60 illustrating a state in which a wearable assist robot apparatus 401a according to another embodiment of the invention is worn by the wearer 10. FIG. 30D is similar to the embodiments in FIG. 28 to FIG. 30C. An upper end of the supporting arm 455 is fixedly coupled to the side portion 432b of a waist belt 430b by the mounting means 494b, and the control box 53 is attached to a rear portion 431b of the waist belt 430b. The waist belt 430b is not provided with the belly belt 34 in FIG. 30.

Figure 31:
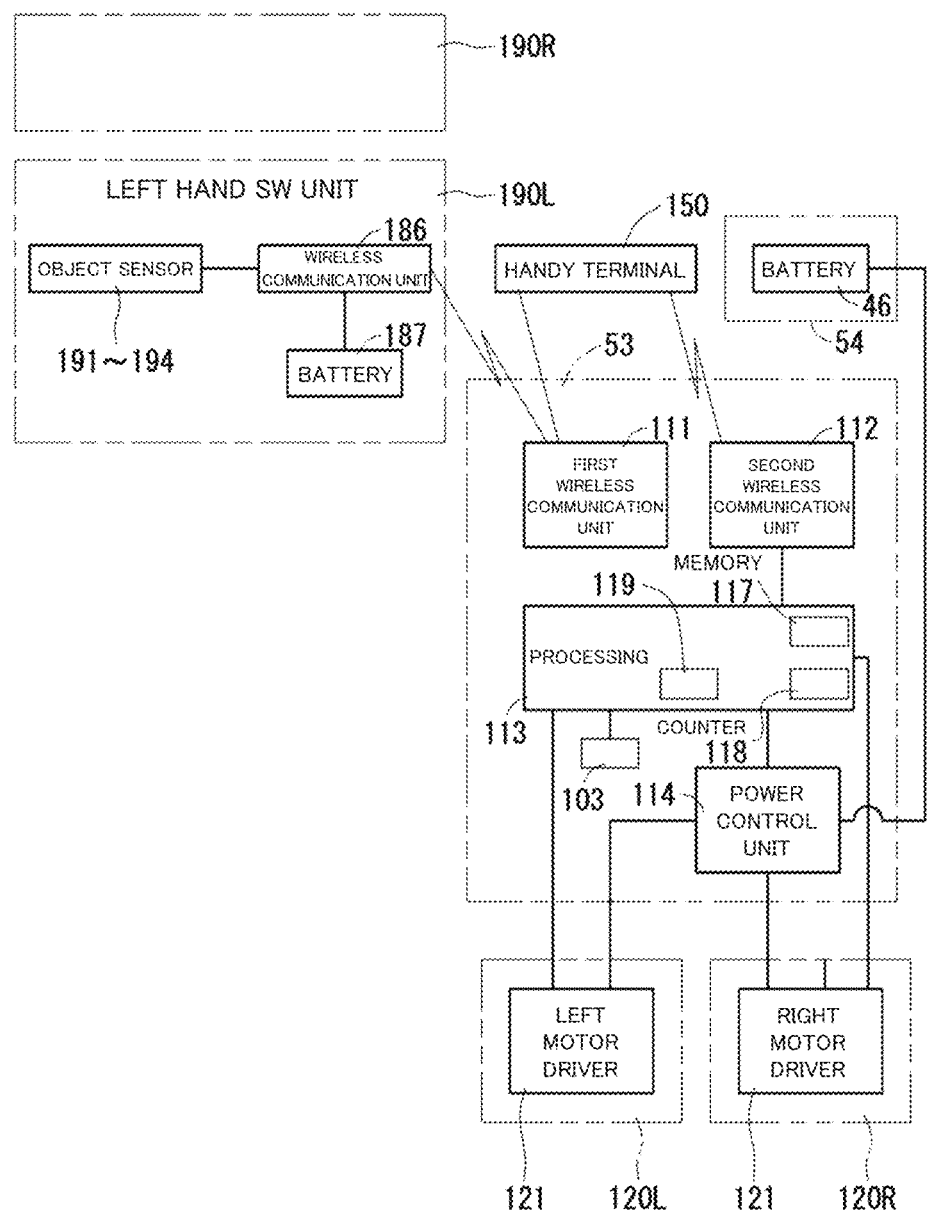
FIG. 31 is an electric circuit diagram illustrating an electric configuration in the assist robot apparatus 1 and assist robot apparatus of other embodiments.

FIG. 31 is an electric circuit diagram illustrating an electrical configuration of the assist robot apparatus 1. A control unit included in the assist robot apparatus 1 includes the control box 53, left and right motor driver unit 120L and 120R having similar configurations, a handy terminal device 150, the battery box 54, and the left and right glove devices 190L and 190R having similar configurations.

The handy terminal device 150 is of a mobile type, and is operated while being held by both left and right hands of the wearer 10. The handy terminal device 150 is a transmittable and receptable communication device realized, for example, by a smart phone. The handy terminal device 150 may be provided only on one of the left hand and the right hand of the wearer 10.

The control box 53 includes a first wireless communication unit 111, a second wireless communication unit 112, a processing circuit 113, and a power control unit 114. The first wireless communication unit 111 is configured to be capable of communicating with the glove devices 190 via wireless communication, and relays information with the handy terminal device 150, the glove devices 190 and the processing circuit 113. The second wireless communication unit 112 is configured to be capable of communicating with the handy terminal device 150 via wireless communication, and relays information via transmission and reception with the handy terminal device 150 and the processing circuit 113. The processing circuit 113 is configured to communicate with respective motor driver units 120 via wired communication. The power control unit 114 controls the battery box 54. The power control unit 114 is realized by a microcomputer.

The left and right motor driver units 120 each include a right motor driver 122 configured to control a power assist electric motors 64 to be mounted respectively on the left side and the right side of the wearer 10. The respective motor drivers 121 communicate with the processing circuit 113 via wired communication to receive commands such as an output torque command required for assist from the processing circuit 113, and send information such as positional information indicating rotational angles of the drive shafts 62 from the angle sensors 67 of the motors 64 to the processing circuit 113. Outputs from the acceleration/angular speed sensor 103 is supplied to the processing circuit 113. The processing circuit 113 is connected to a memory 117 configured to store information relating to transmission and reception, a counter 118 for counting the number and a timer 119 for counting time.

The glove devices 190 each include a wireless transmitting unit 186, a battery 187, and the object sensors 191 and 192. The battery 187 is a rechargeable battery, and supplies power to the wireless transmitting unit 186 and the object sensors 191 and 192. The wireless transmitting unit 186 sends states of the object sensors 191 and 192, that is, detection results detected by the object sensors 191 and 192 to the processing circuit 113 via the first wireless communication unit 111. In another embodiment of the invention, the glove devices 190 are provided with an object sensor 193 or 194 instead of the object sensors 191 and 192. The object sensors 191 to 194 detect the presence or absence, and furthermore, the value of a load acting on portions of fingers on the palm side of a glove worn by the wearer 10.

The handy terminal device 150 is used for setting parameters required for operation of the assist robot apparatus 1 of the application. The battery box 54 includes a battery 46. The battery box 54 supplies power from the battery 46 to the control box 53 and the respective motor driver units 120.

The processing circuit 113 calculates drive torque required for assist based on information supplied from the first wireless communication unit 111 on the respective object sensors 191 to 194, the acceleration/angular speed sensor 103, and the like and positional information of the electric motors 64 supplied from the angle sensors 67 of the respective motor drivers 121, and sends output torque commands to the respective motor drivers 121.

In this embodiment, the control box 53 includes the first wireless communication unit 111 configured to communicate with the glove devices 190 and the second wireless communication unit 112 configured to communicate with the handy terminal device 150, and thus improves a communication speed and enables parallel processing as illustrated in FIG. 30.

Figure 32:
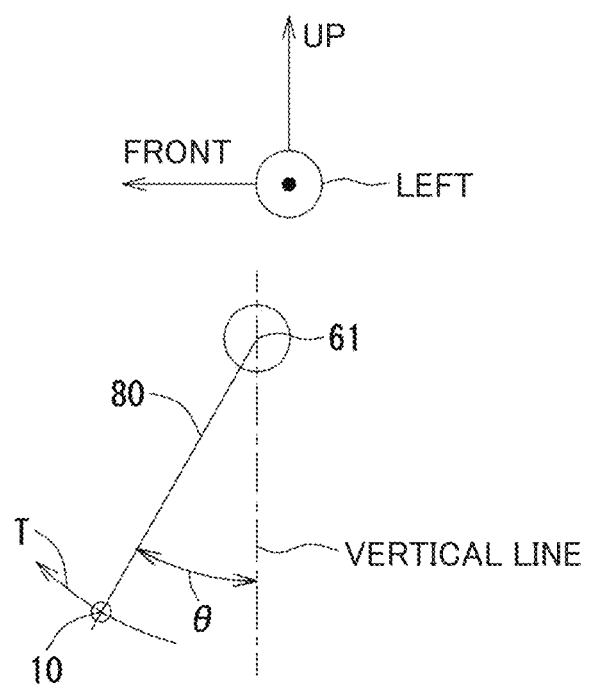
FIG. 32 is a drawing for explaining drive torque output by the drive shafts 62 of the drive sources 60.

FIG. 32 is a drawing for explaining drive torque output by the drive shafts 62 of the drive sources 60. The angle sensors 67 detect the angles θ. The angle sensors 67 detect relative angles between the body trunk 11 and the respective left and right thighs 12. The angle sensors 67 are provided in the interiors of the drive sources 60, and detects angles of the drive shafts 62 corresponding to the output shafts 65 of the electric motors 64 of the drive sources 60. The angle sensors 67 are used for measuring relative angles. The wearer 10 stands upright with the assist robot apparatus 1 worn thereon and turns a power source on in an upright standing position with the body trunk 11 and the thighs 12 as the lower limbs kept vertical to set original positions of the angle sensors 67, that is, the angles θ to zero. When the angles θ are set to zero in the upright standing position and then the body trunk 11 takes a bent-forward posture, which is a posture in which the body trunk 11 is inclined forward with the thighs 12 kept upright, the angles θ of the bent-forward posture from vertically right above the drive shafts 62 about the axial lines 61 are detected. When the thigh 12 of the free leg is swung up during walking with the body trunk 11 kept vertical, the angles θ from vertically right below the drive shafts 62 about the axial lines 61 are detected.

In one embodiment of the invention, the drive torque T of the drive sources 60, and thus the assisting force moments may be a predetermined values common to the respective assisting operations, and may be values predetermined for each of the assisting operations. These parameters to be predetermined may be set by using the handy terminal device 150.

In another embodiment of the invention, the drive torque T [N·m] required for moving the lower limb having a mass m may be calculated by the following expression (Expression 1):

$$T = L \cdot x \cdot m \cdot g \cdot \sin \theta \quad (1),$$

where m[kg] is a mass of the lower limb, L[m] is a length of the lower arm 80 from the axial line 61 of the drive shaft 62 to the second passive rotary shaft 92, and g is a gravitational acceleration.

The signs L and m are proportionality constant and fixed values determined according to the wearer 10. The processing circuit 113 calculates the drive torque T, that is, the assisting force moment by setting these values as parameters in advance. The parameters may be set by using the handy terminal device 150, and stored in the memory 118.

In this manner, the wearable assist robot apparatus 1 calculates the drive torque T required for allowing the wearer 10 to move in various operational postures by mechanical analysis from the angles θ detected by the angle sensors 67, and thus may eliminate usage of weak surface myoelectric potential signals flowing to the muscles when an attempt is made to move the muscles, whereby eliminating the troubles of mounting a surface myoelectric potential sensor.

The assist robot apparatus 1 calculates the drive torque T not in a reproduction method for reproducing predetermined action pattern, but by a mechanical manner, and thus discontinuation caused by changing of the actions of the wearer 10 may be avoided.

Here, parameters to be set by using the handy terminal device 150 will be shown in Table 1 given below. The parameter Nos. "01" to "07" are walking control parameters on the free leg side, and the parameter Nos. "11" to "13" are walking control parameters on the supporting leg side. The free leg is a leg which is not grounded, and the supporting leg is a grounded leg. The walking control parameters are parameters for assisting the walking action.

The parameter Nos. "21" to "25" are upper body control parameters. The upper body control parameters are parameters for assisting the actions of the upper body. The parameter Nos. "31" to "35" are semi-crouching position control parameters. The semi-crouching position control parameters are parameters for assisting the actions in the semi-crouching position. The parameter Nos. "41" to "45" are teaching parameters. The handy terminal device 150 includes a storage area for storing these parameters. Signs "s" and "sec" indicate "seconds". Default values in Table 1 indicate initial set values, and a user can change and reset the values by handy terminal device 150 later. A value range (unit: %) is a rate with respect to the maximum assisting force moment that is, the assisting force that the motors 64 can provide, which is considered to be 100%.

TABLE 1

| No. | Parameter Name | Default Value | Value Range |
|---|---|---|---|
| Walking (free leg) Control Parameter | | | |
| 01 | Maximum Retention [%] | 70 | 1 to 100 |
| 02 | Proportional Range [°] | 50 | 1 to 90 |
| 03 | Acceleration Time [0.1 sec] | 10 | 1 to 20 |
| 04 | Return Angle [°] | 40 | 1 to 90 |
| 05 | Return Output [%] | 30 | 1 to 100 |
| 07 | Rate of Increase [%/0.1 s] | 10 | 1 to 50 |

TABLE 1-continued

| No. | Parameter Name | Default Value | Value Range |
|---|---|---|---|
| Walking (supporting leg) Control Parameter | | | |
| 11 | Maximum Retention [%] | 50 | 1 to 100 |
| 12 | Proportional Range [°] | 30 | 1 to 90 |
| Upper Body Control Parameter | | | |
| 21 | Maximum Retention [%] | 70 | 1 to 100 |
| 22 | Proportional Range [°] | 70 | 1 to 90 |
| 23 | Acceleration time [0.1 sec] | 10 | 1 to 20 |
| 25 | Rate of Increase [%/0.1 s] | 10 | 1 to 50 |
| Semi-crouching Position Control Parameter | | | |
| 31 | Maximum Retention [%] | 50 | 1 to 100 |
| 32 | Proportional Range [°] | 60 | 1 to 90 |
| 33 | Waiting Time [0.1 sec] | 10 | 1 to 20 |
| 35 | Rate of Increase [%/0.1 s] | 10 | 1 to 50 |

As to the parameters to be set by using the handy terminal device 150, in another embodiment of the invention, the parameters to be set by using the handy terminal device 150 are shown as in Table 2 given below. The parameter No. "01" is a walking control parameter on the free leg side, and the parameter No. "02" is a walking control parameter on the supporting leg side. The free leg is a leg which is not grounded, and the supporting leg is a grounded leg. The walking control parameters are parameters for assisting the walking action.

The parameter Nos. "03" and "04" are upper body control parameters. The upper body control parameters are parameters for lifting assist control and lowering assist control for assisting the actions of the upper body. The parameter No. "05" is a semi-crouching position control parameter. The semi-crouching position control parameter is a parameter for assisting the actions in the semi-crouching position. The handy terminal device 150 includes a storage area for storing these parameters. Initial set values are set in a program, and the user can change and reset the values by handy terminal device 150 later.

TABLE 2

| No. | Parameter Name |
|---|---|
| Walking Control Parameter | |
| 01 | Walking (free leg) Control Parameter |
| 02 | Walking (supporting leg) Control Parameter |
| Upper Body Control Parameter | |
| 03 | Lifting Assist Control Parameter |
| 04 | Lowering Assist Control Parameter |
| Semi-crouching Position Assist Control Parameter | |
| 05 | Semi-crouching Position Assist Control Parameter |

Figure 33:
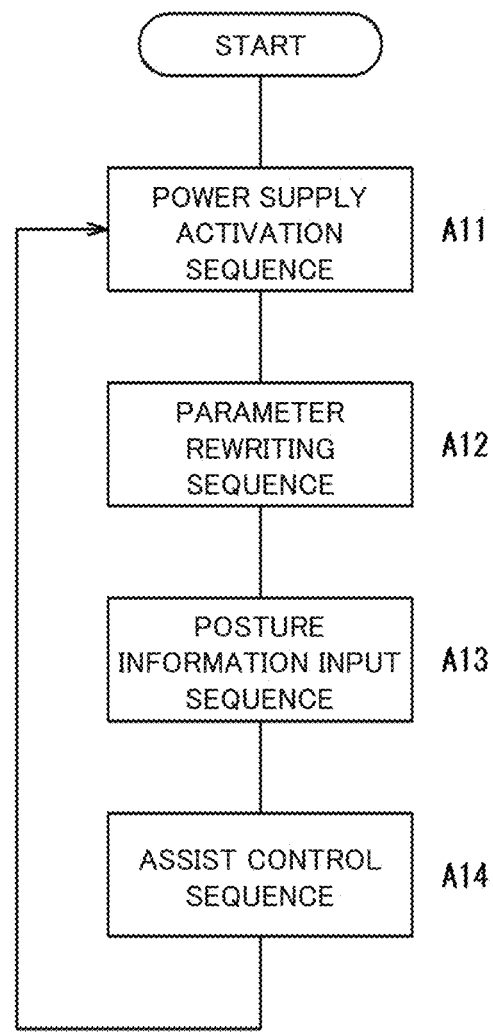
FIG. 33 is a flowchart indicating a process procedure of an assist suit control process to be executed by a processing circuit 113 of the assist robot apparatus 1.

FIG. 33 is a flowchart indicating a process procedure of an assist suit control process to be executed by the processing circuit 113 of the assist robot apparatus 1. The assist suit control process includes four processes; a power source activation sequence process, a parameter rewriting sequence process, a posture information input sequence process, and a hip joint control sequence process. When the power of the processing circuit 113 is turned on and a power supply to components other than the power assist electric motors 64 is started to assume an operable state, the procedure of the processing circuit 113 goes to Step A11.

In Step A11, the processing circuit 113 executes the power source activation sequence process. The processing circuit 113 waits for completion of reception of parameters required for assistance sent from the handy terminal device 150. After the completion of reception of the parameters required for assistance, the processing circuit 113 performs initialization of the rotational angles θ of the thighs 12 by the respective left and right angle sensors 67 in a standing upright state in which the wearer 10 is standing upright, and turns the power of the power assist electric motors 64 on.

In the embodiment in which the parameters required for assistance are already received, without waiting for the transmission from the handy terminal device 150, after a predetermined certain period (for example, 3 seconds) has elapsed, initialization of the rotational angles of the respective thighs 12 in the upright standing state in which the wearer is standing upright is performed by using the received parameters, and then the power of the power assist electric motors 64 is turned on. As such, the power source activation is possible also without the handy terminal device 150.

In Step A12, the processing circuit 113 executes the parameter rewriting sequence process. Parameters required for assistance is transmitted from the handy terminal device 150 carried by the wearer as needed. The assist suit control process performs the parameter rewriting sequence process in a main loop for enabling constant update of the parameters. The main loop is a loop of the process procedures defined by Steps A12 to A14.

In Step A13, the processing circuit 113 executes the posture information input sequence process. The posture information input sequence process is a process for acquiring data relating to the posture of the wearer 10.

In Step A14, the processing circuit 113 executes the assist control process such as a hip joint control sequence and goes back to Step A12. The assist control process is a process for calculating and outputting assist torque required for drive by the power assist electric motors 64 for respective actions such as a walking action, an upper body action, and a semi-crouching position action based on data acquired in Step A13.

The processing circuit 113 executes the main loop at every 20 ms, and the assist robot apparatus 1 realizes smooth assistance to the wearer. The processing circuit 113 determines an action of the wearer in several seconds before starting assist, and after the determination, outputs assist torque. The assist robot apparatus 1 is intended to assist healthy people and thus has no problem in practical use even though it does not provide any assist for several seconds when starting action.

Figure 34:
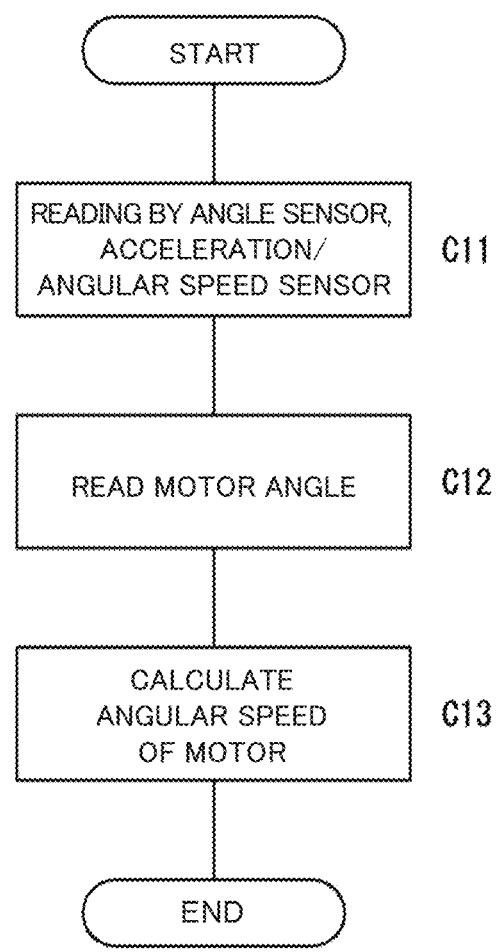
FIG. 34 is a flowchart showing a process procedure of the posture information input sequence process executed by the processing circuit 113.

FIG. 34 is a flowchart showing a process procedure of the posture information input sequence process executed by the processing circuit 113. When Step A13 shown in FIG. 32 is executed, the procedure of the processing circuit 113 goes to Step C11.

In Step C11, the processing circuit 113 receives and reads outputs from the acceleration/angular speed sensor 103.

In Step C12, the processing circuit 113 reads the detection angles θ of the respective angle sensors 67 which are motor encoders, and outputs from the acceleration/angular speed sensor 103. The processing circuit 113 reads the rotational angles of the drive shafts 62 corresponding to the output shafts 65 of the power assist electric motors 64, that is, the angles of the hip joints via the motor drivers 121 from the angle sensors 67 included in the power assist electric motors 64. In Step C13, the processing circuit 113 calculates angular speed of the hip joints, that is, angular speeds ω of the rotational angles of the drive shafts 62 by the power assist electric motors 64, and terminates the posture information input sequence process.

Figure 35:
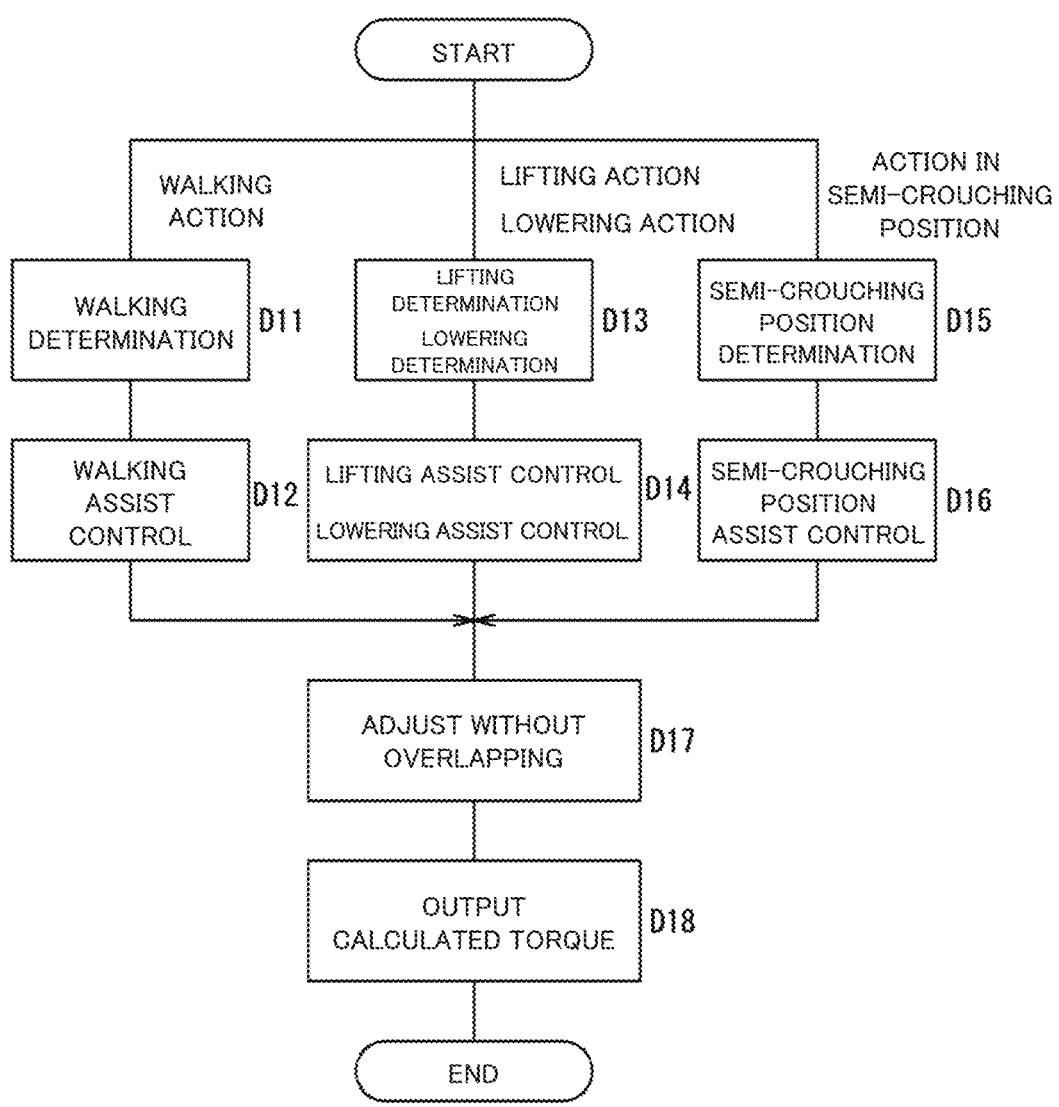
FIG. 35 is a flowchart showing a process procedure of the assist control process executed by the processing circuit 113.

FIG. 35 is a flowchart showing a process procedure of the assist control process executed by the processing circuit 113. When Step A14 for assist control shown in FIG. 33 is executed, the procedure of the processing circuit 113 goes to Steps D11, D13, D15 and D11. As illustrated in FIG. 35, the processing circuit 113 determines the respective actions of walking, lifting, lowering and semi-crouching position, and executes anyone of the respective assist controls for walking, lifting, lowering and a semi-crouching position. Steps D11 and D12 are process for walking action. Steps D13 and S14 are process for lifting and lowering in the upper body actions. Steps D15 and D16 are process for an action in semi-crouching position. The process for the walking action, the process for the upper body action, and the process for the action in the semi-crouching position are processed in parallel.

In Step D11, the processing circuit 113 performs walking determination. The processing circuit 113 determines whether the walking action is being performed or not in response to the angles θ detected by the angle sensors 67 and the outputs from the acceleration/angular speed sensor 103. In Step D12, the processing circuit 113 performs walking assist control. When the walking action is being performed, the processing circuit 113 calculates an assist torque for the free leg and assist torque for the supporting leg for assisting the walking action based on the angles θ and the acceleration/angular speed sensor 103 changing from second to second.

In Step D13, the processing circuit 113 performs upper body determination. The processing circuit 113 determines whether the wearer is doing an upper body action or not in response to the angles θ detected by the angle sensors 67 and the outputs from the acceleration/angular speed sensor 103. The upper body action includes bending the upper body and then heaving the upper body up for lifting and lowering. In Step D14, the processing circuit 113 performs the upper body control. The processing circuit 113 calculates assist torque for lifting assist control and lowering assist control which assist the upper body action while the upper body action is being performed. The processing circuit 113 calculates, for example, assist torque proportional to the angles θ required for both legs.

In Step D15, the processing circuit 113 performs semi-crouching position determination. The processing circuit 113 determines whether action in semi-crouching position is being performed or not in response to the angles θ detected by the angle sensors 67 and the outputs from the acceleration/angular speed sensor 103. The semi-crouching position assist action is an action in the semi-crouching position. In Step D16, the processing circuit 113 performs semi-crouching position assist control. The processing circuit 113 calculates assist torque for assisting the action in the semi-crouching position while the action in the semi-crouching position is being performed. The processing circuit 113 calculates, for example, assist torque proportional to the angles θ required for both legs. Step D11 to D16 are steps for calculating and computing action.

In Step D17, the processing circuit 113 adjusts respective assist control outputs in accordance with the respective determinations in Steps D11, D13 and D15 relating to the walking assist control, the upper body assist control and the semi-crouching position assist control without overlapping, and performs determination in accordance with preset priority order. In a driving step D18, the processing circuit 113 controls the respective motor drivers 121 to output the calculated assist torque according to the priority order described above, and drives the power assist electric motors 64, and then terminates the assist control sequence process.

In the processing circuit 113 of this embodiment, the priority order is predetermined so that the lifting assist control and the lowering assist control which are the upper body assist control have the highest priority, followed by the priority of the semi-crouching position assist control, and the priority of the walking assist control is the lowest. The priority order is determined especially for assisting agricultural works, and setting of the priority order of the walking assist control, the upper body assist control and the semi-crouching posture assist control may be changed as needed.

As such, in this embodiment, by setting the priority order of the walking assist control, the upper body assist control and the semi-crouching position assist control in advance, the processing circuit 113 may estimate actions of the wearer 10 and clearly separate the walking assist control, the upper body assist control and the semi-crouching position assist control so as not to be mixed.

The process procedure of the walking determination process in Step D11 of FIG. 34 by the processing circuit 113 will be described later in connection with FIG. 39 to FIG. 47.

Figure 36:
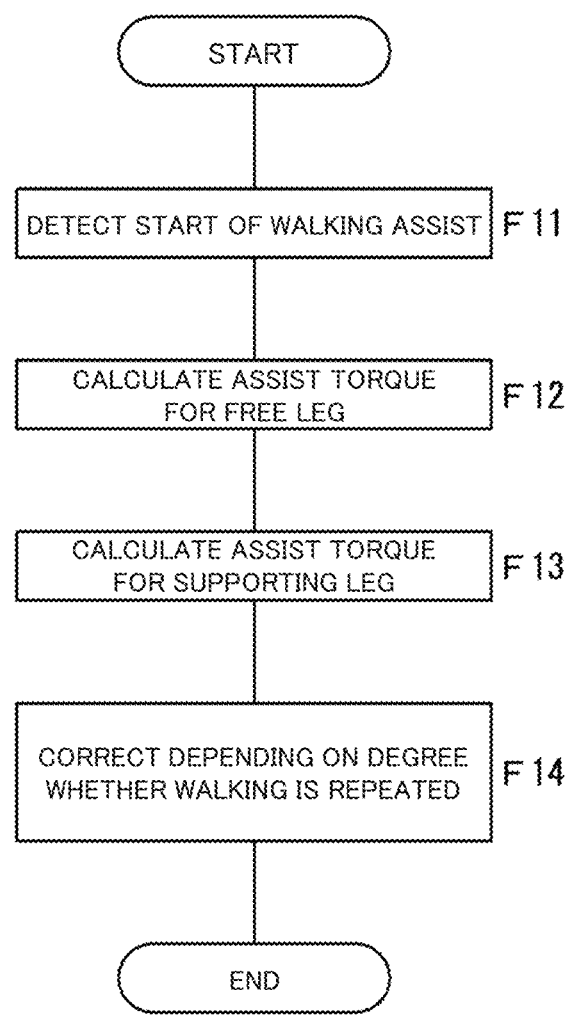
FIG. 36 is a flowchart showing a process procedure of the walking assist control process executed by the processing circuit 113.

FIG. 36 is a flowchart showing a process procedure of the walking assist control process executed by the processing circuit 113. In the waling control process, the free leg side torque and the supporting leg side torque required for walking are calculated based on the angles θ detected by the angle sensors 67 and the outputs from the acceleration/angular speed sensor 103 changing from second to second in the posture information of the wearer. When the step D12 shown in FIG. 34 is executed, the procedure of the processing circuit 113 goes to Step F11.

In Step F11, the processing circuit 113 detects the start of the walking assist. The processing circuit 113 detects that the leg on the free leg side is positioned at a walking determination point. In Step F12, the processing circuit 113 calculates the assist torque of the free leg side. In Step F13, the processing circuit 113 calculates the assist torque of the supporting leg side. In Step F14, the processing circuit 113 calculates the walking assist torque by performing correction based on a walking rate, which indicates the degree indicating whether the walking is repeated. A graph in FIG. 40(2) described later shows output results of the assisting force moment calculated by multiplying the left and right angles θ at the beginning of walk shown in the graph in FIG. 40(1) by the predetermined walking degree (that is, walking rate).

Figure 37:
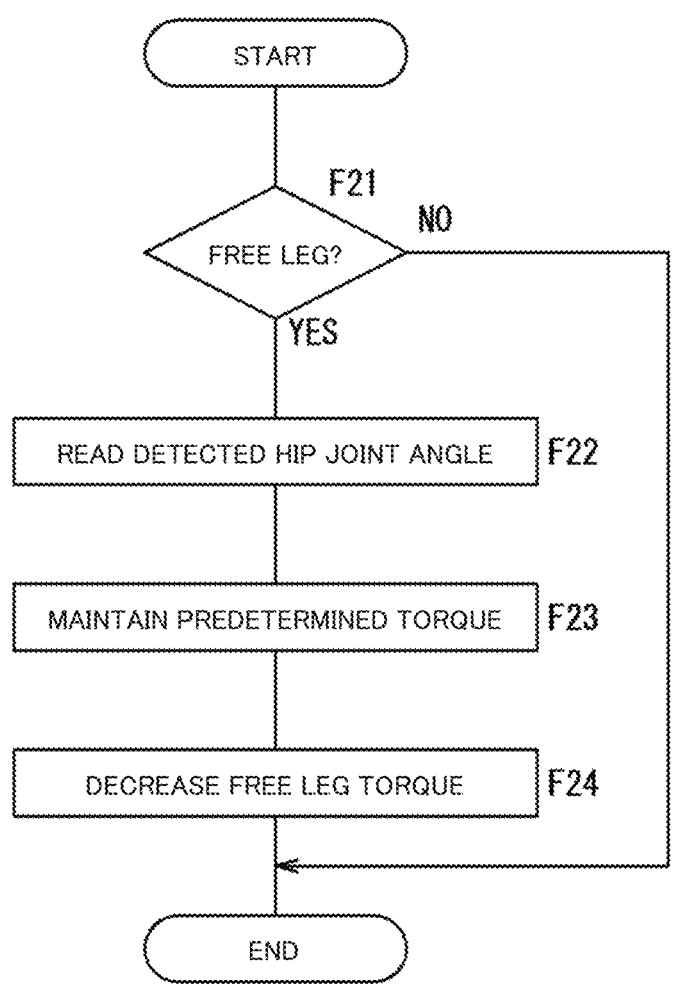
FIG. 37 is a flowchart showing a process procedure of the assist torque calculation process for the free leg side executed by the processing circuit 113.

FIG. 37 is a flowchart showing a process procedure of the assist torque calculation process for the free leg side executed by the processing circuit 113. When Step F12 shown in FIG. 36 is executed, the procedure of the processing circuit 113 goes to Step F21.

In Step F21, the processing circuit 113 determines whether the leg is the free leg or not, and when it is determined to be the free leg, the procedure goes to Step F22, and the processing circuit 113 reads the hip joint angles θ. When it is determined that the leg is not the free leg, the calculating process is terminated. When it is determined that the leg is the free leg, the free leg assist control is executed in sequence.

In another embodiment of the invention, when it is determined that the leg is the free leg, the walking sequence is executed in sequence from "start swing-up"→"during swing-up", →"start swing-down"→"during swing-down", and is terminated when the swinging down is completed.

In Step F22, the hip joints angle θ detected from the angle sensors 67 is read. In Step F23, a predetermined torque is maintained until an accelerating time has elapsed. In Step F24, when the acceleration time has elapsed, the assist torque for the free leg is reduced at a predetermined constant speed until the angle θ of the free leg reaches a predetermined angle (for example, 20°).

Figure 38:
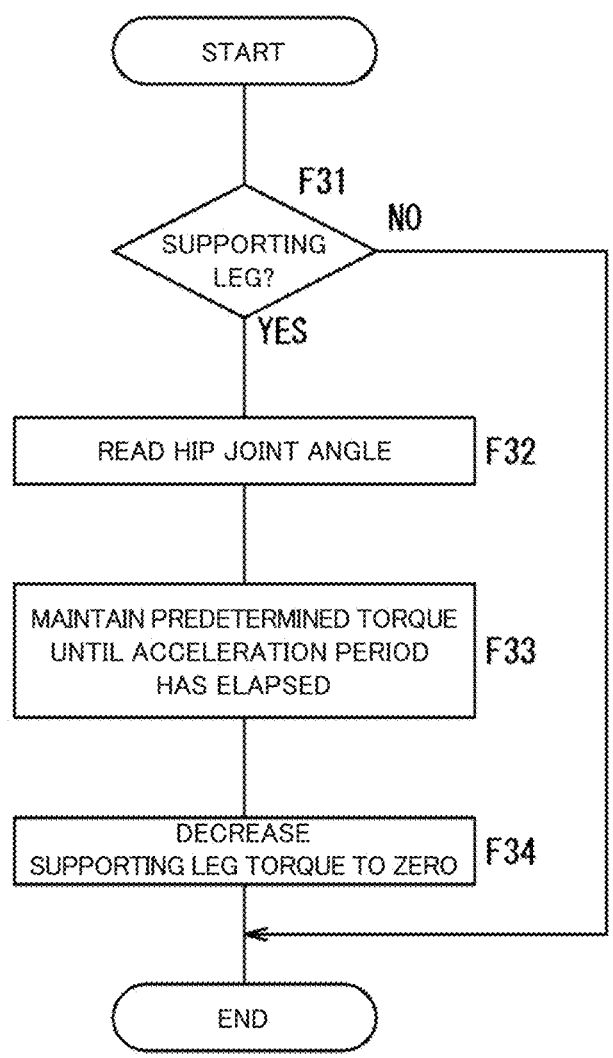
FIG. 38 is a flowchart showing a process procedure of the assist torque calculation process for the supporting leg side executed by the processing circuit 113.

FIG. 38 is a flowchart showing a process procedure of the assist torque calculation process for the supporting leg side executed by the processing circuit 113. When Step F13 shown in FIG. 36 is executed, the procedure of the processing circuit 113 goes to Step F31.

In Step F31, the processing circuit 113 determines whether the leg is the supporting leg or not, and when it is determined to be the supporting leg, the procedure goes to Step F32, and when it is determined not to be the supporting leg, the calculation process is terminated. When it is determined that the leg is the supporting leg, torque for maintaining the upright posture is outputted.

In Step F32, the processing circuit 113 reads the hip joint angles θ sensed by the angle sensors 67, and in Step F33, the processing circuit 113 maintains the predetermined torque until the acceleration time has elapsed. In Step F34, after the acceleration time has elapsed, the assist torque for the supporting leg is reduced to zero in proportion to the angle of the supporting leg until the angle θ of the supporting leg reaches a predetermined angle (for example, zero) or until the free leg as the other leg is grounded.

Figure 39:
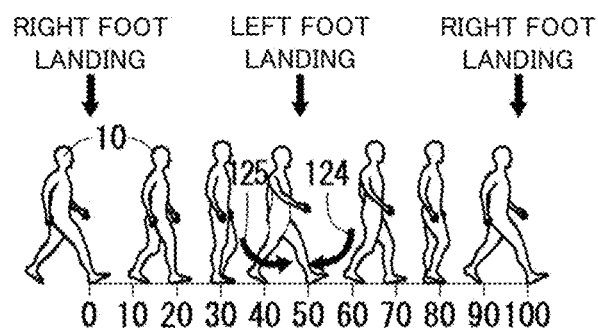
FIG. 39 is a time chart for explaining an action in the assist robot apparatus 1 while the walking assistance is continued.
Figure 39:
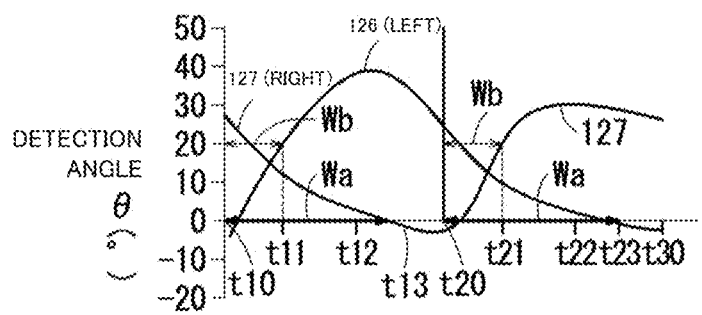
Figure 39:
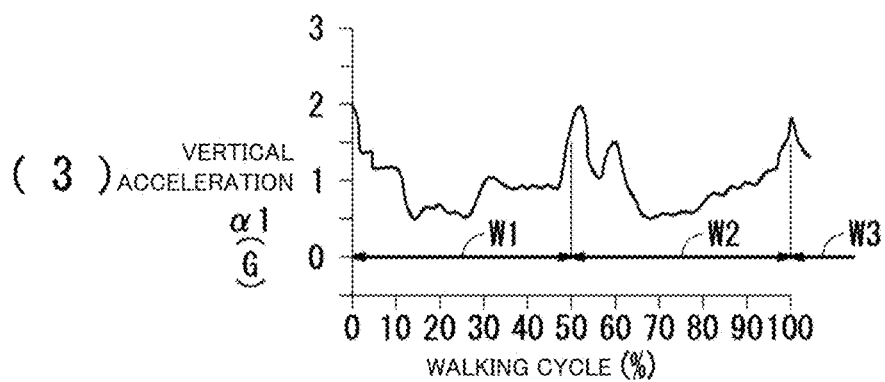
Figure 39:
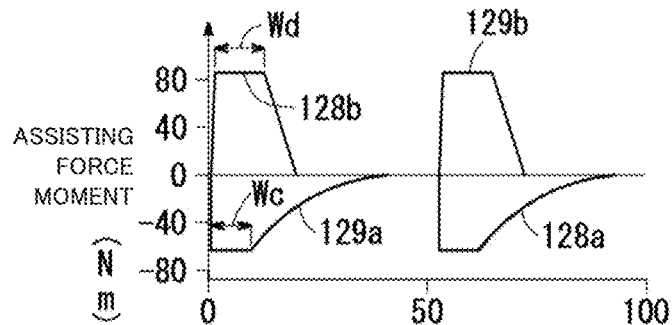

FIG. 39 is a time chart for explaining an action in the assist robot apparatus 1 while the walking assistance is continued. FIG. 39(1) illustrates a walking action of the wearer 10, FIG. 39(2) shows lines 126 and 127 of the waveforms of angles θL and θR detected by left and right angle sensors 67L and 67R, FIG. 39(3) indicates an waveform of the acceleration α1 in the vertical direction of the wearer 10 detected by the acceleration/angular speed sensor 103, and FIG. 39(4) shows the waveforms by the swinging-down supporting force moment with a suffix "a", which are the left and right assisting force moments 128 and 129 applied to the thighs 12L and 12R by the left and right drive sources 60L and 60R, and the swing-up force moment with a suffix "b". In the respective walking periods W1 to W3 from the first to the third steps illustrated in FIG. 39, when the total period of a pair of periods W1 and W2 is assumed to be 100%, the respective periods W1 and W2 are 50% each. After the period W3, the same actions as in the periods W1 and W2 are repeated.

First of all, the right foot lands and becomes a supporting leg at the time t10 in the period W1. The angle θ of the lower limb, that is, the thigh when landed during walking is not at or near 0°, but near 20° to 30°. When one of the left and right legs lands, an output of the acceleration α1 in the vertical direction of the acceleration/angular speed sensor 103 becomes the maximum value as shown in FIG. 39(3), which is detected by the processing circuit 113. The angle θR detected by the angular speed sensor 67R for the right foot is indicated on the line 127 in FIG. 39(2), and is a large value approximate to the maximum value, for example, 25° at the landing time t10. In contrast, the angle θL detected by the angle sensor 67L for the left leg is indicated on a line 126 in FIG. 39(2), and becomes a small value approximate to the smallest value, for example, 0° at the landing time t10. Therefore, the processing circuit 113 compares the values of these angles θR and θL at a landing time t10, and determine the leg which shows a larger angle θR (θL<θR) to be the landed supporting leg and the leg which shows a smaller angle θL is determined to be the free leg.

The drive source 60R applies swing-down supporting force moment 129a (FIG. 39(4)) in the direction 124 of swinging down and supporting to the supporting leg for a supporting period Wa from the landing time t10 to a time t13. The drive source 60R applies the supporting force moment 129a so as to maintain a predetermined constant value (For example, 60 to 10 Nm) for a predetermined period Wc, and then decrease over time as the supporting force moment is weakened, or so as to decrease in proportion to the angle θR detected by the angle sensor 67R. The angle θR of the angular speed sensor 67R for the right leg is indicated on the line 127 in FIG. 39(2), and decreases from the time t10 over time, and terminates the predetermined swing-down assistance at the time t13 when the predetermined swing-down assist termination setting angle θ0 (for example, 0° is reached. In other words, in the assist of the supporting leg, a predetermined swing-down assisting force, that is, the swing-down force moment (for example, 60 Nm as described above) is outputted for a predetermined period Wc. When this time period is elapsed, the supporting assisting force, that is, the supporting force moment 129a is outputted in proportion to the angle θR detected by the angle sensor 67R until the angle θR of the supporting leg detected by the angle sensor 67R reaches a predetermined angle, for example, 0° and until the other leg lands at the latest. In this manner, when the right leg lands, the angle of the right hip joint is an angle of about 25° and then decreases. At this time, the angle of the left hip joint which has already landed shows the smallest value near right below. Immediately after, since the left leg as the free leg is swung up, the angle of the left hip joint increases.

In this period W1, the drive source 60L applies the swing-up force moment 128b (FIG. 39(4)) in the swing-up direction 125 to the left leg as the free leg at a predetermined constant value (for example, a value within a range from 80 to 20 Nm) for a predetermined period Wd (Wd<Wb), which is a period in which the acceleration of the swing-up force moment is accelerated by exerting the swing-up force in a swing-up period Wb from the landing time t10 to a time t11. The detection angle θL of the angle sensor 67L for the left leg as the free leg in the period W1 is indicated on the line 126 in FIG. 39(2) and is the minimum value, for example, 0° at the time t10 and increases over time from the time t10 and, at the time t11 after the period Wd has been elapsed, becomes the predetermined swing-up assist termination setting angle θ20 (for example, 20°), so that the swing-up assist is terminated. Subsequently, the angle θL of the free leg becomes the maximum value at the time t12. In other words, the assist of the free leg outputs the predetermined swing-up assist force 128b for the predetermined period Wd. When the period Wd has been elapsed, the swing-up assist force 128b is outputted while deducting at a predetermined speed until the angle θL of the free leg detected by the angle sensor 67L reaches a predetermined angle, for example to 20° as described above. When the right leg lands in this manner, the left leg is swung up to be the free leg, and is bent with an increased and large angle of hip joint. The right leg becomes the supporting leg, kicks rearward, and is stretched with a decreased and small angle of hip joints. As to the terms "bent" and "stretched", the bent corresponds to a plus side clockwise from 0° in the direction right below in FIG. 31 and "stretched" corresponds to a minus side counterclockwise therefrom.

Subsequently, in the period W2, after the time t20, control actions for the left and right drive sources 60 by the processing circuit 113 are performed reversely from the period W1. The left leg lands to be the supporting leg, and the drive source 60L applies supporting force moment 128a in the direction 124 of swinging down and supporting to the supporting leg for a supporting period Wa from the landing time t20 to a time t23. The detection angle θL of the angle sensor 67L for the left leg, as indicated on the line 126 in FIG. 39(2) is, for example, 25° at the time t20 and decreases over time from the time t20 and, at the time t23, becomes the predetermined swing-down assist termination setting angle θ0, so that the swing-down assistance is terminated.

At this period W2, the drive source 60R applies the swing-up force moment 129b in the swing-up direction 125 for the swing-up period Wb from the landing time t20 to the time t21 is applied to the right leg as the free leg. The detection angle θR of the angle sensor 67R for the right leg as the free leg in the period W2 as indicated on the line 127 in FIG. 39(2), is the minimum value at the time t20 and increases over time from the time t20 and, at the time t21, becomes the predetermined swing-up assist termination setting angle θ20, so that the swing-up assist is terminated. The angle θR of the free leg becomes the maximum value at the time t22.

The walking assistance repeats and continues the same action as in the periods W1 and W2 after the period W3 starting at the time t30 when the right leg lands.

In another embodiment of the invention, in the period W1, the supporting period Wa for outputting the swing-down supporting force moment 129a may be a predetermined time, and if this time Wa has elapsed, the supporting force moment 129a is outputted in proportion to the angle θ detected by the angle sensors 67 until the angle θ of the supporting leg detected by the angle sensors 67 reaches a predetermined angle, for example, 0° and until the time t20 when the other leg, that is, the free leg lands at the latest.

In another embodiment of the invention, the processing circuit 113 may realize determination between the supporting leg and the free leg by discriminating the angles θR and θL at the landing time t10 based on the predetermined level. Termination of the swing-down assistance may be determined to the time t20 at which the free leg lands in the period W1.

The processing circuit 113 may determine that, when the swing angles θR and θL of the left and right angle sensors 67 mounted on the electric motor 64 reach the minimum value near the immediately below, for example, zero, the leg corresponding to the angle θR or θL lands. The supporting leg detected to have been landed by the angle sensors 67 is assisted in the supporting direction.

The supporting leg which is the landing one of the left and right legs may be detected by the angle sensors 67 as described above. However, in another embodiment, the processing circuit 113 may detect the supporting leg by three-dimensional accelerations α1, α2 and α3 detected by the acceleration/angular speed sensor 103.

Figure 40:
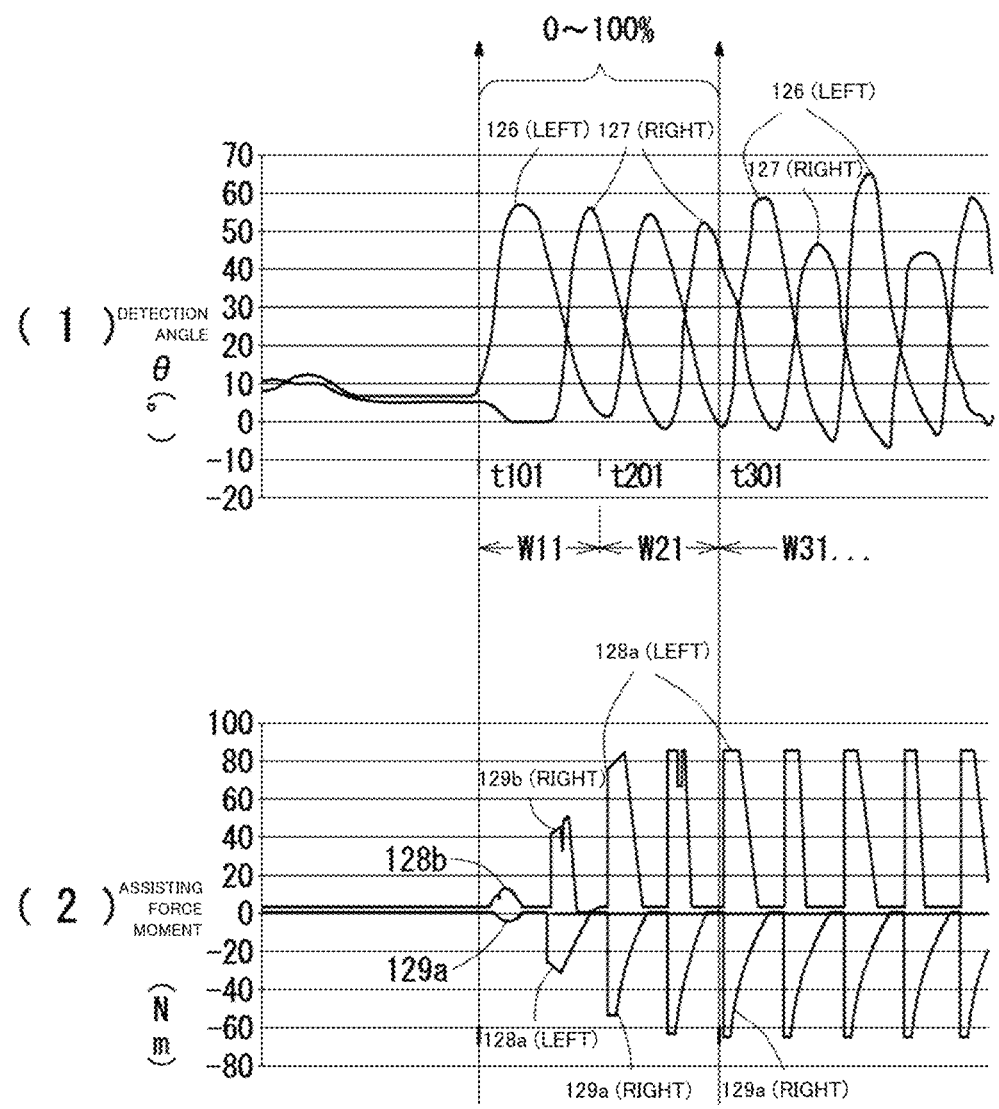
FIG. 40 is a time chart for explaining an action when the assist robot apparatus 1 starts the walking assistance.

FIG. 40 is a time chart for explaining an action of the processing circuit 113 when the assist robot apparatus 1 starts the walking assistance. FIG. 40(1) shows the respective waveforms 126, 127 of detection angles θL and θR detected by the left and right angle sensors 67L and 67R, FIG. 40(2) shows the swinging-down supporting force moment with a suffix "a", which is the left and right assisting force moments 128 and 129 applied to the thighs 12L, 12R by the left and right drive sources 60L and 60R, and the swing-up force moment with a suffix "b". The periods W11 to W31 correspond respectively to the periods W1 to W3 in FIG. 39, and the times t101 to t301 correspond respectively to the times t10 to t30 in FIG. 39, a suffix "a" indicates the supporting force moment, and a suffix "b" indicates the swing-up force moment.

The processing circuit 113 detects that the leg lands when the output of the acceleration α1 in the vertical direction of the acceleration/angular speed sensor 103 becomes the maximum value at the time t101 to t301 in the respective periods W11 to W31. In addition, by detecting that the angles θL and θR detected by the left and right respective angle sensors 67 are deviated in the opposite direction on the left and right by a predetermined first number of times (for example, two times) as shown by the lines 126 and 127 in FIG. 40(1), the start of walking is detected. Subsequently, by raising in accordance with the degree of whether walking is repeated by a predetermined second number of times (for example, three times) (that is, the number of times of repetition), and increasing the left and right assisting force moments 128, 129 in accordance with the degree as illustrated in FIG. 40(2), the walking assistance by the drive sources 60 disposed at or near the left and right hip joints without delay for every timing of the start of walking. In other words, the processing circuit 113 includes a counter, and by counting and detecting that the angles θ detected by the left and right angle sensors 67 for the walking assist are deviated in the opposite direction on the left and right by two or three times by the counter, the processing circuit 113 detects the start of walking, and increases the walking assisting force during the subsequent two or three times. As such, the processing circuit 113 first for the walking assist detects the start of walking when the angles θL and θR detected by the left and right angle sensors 67 are deviated in the opposite direction on the left and right by two or three times, and then increases the walking assisting force during the subsequent two or three times.

Figure 41:
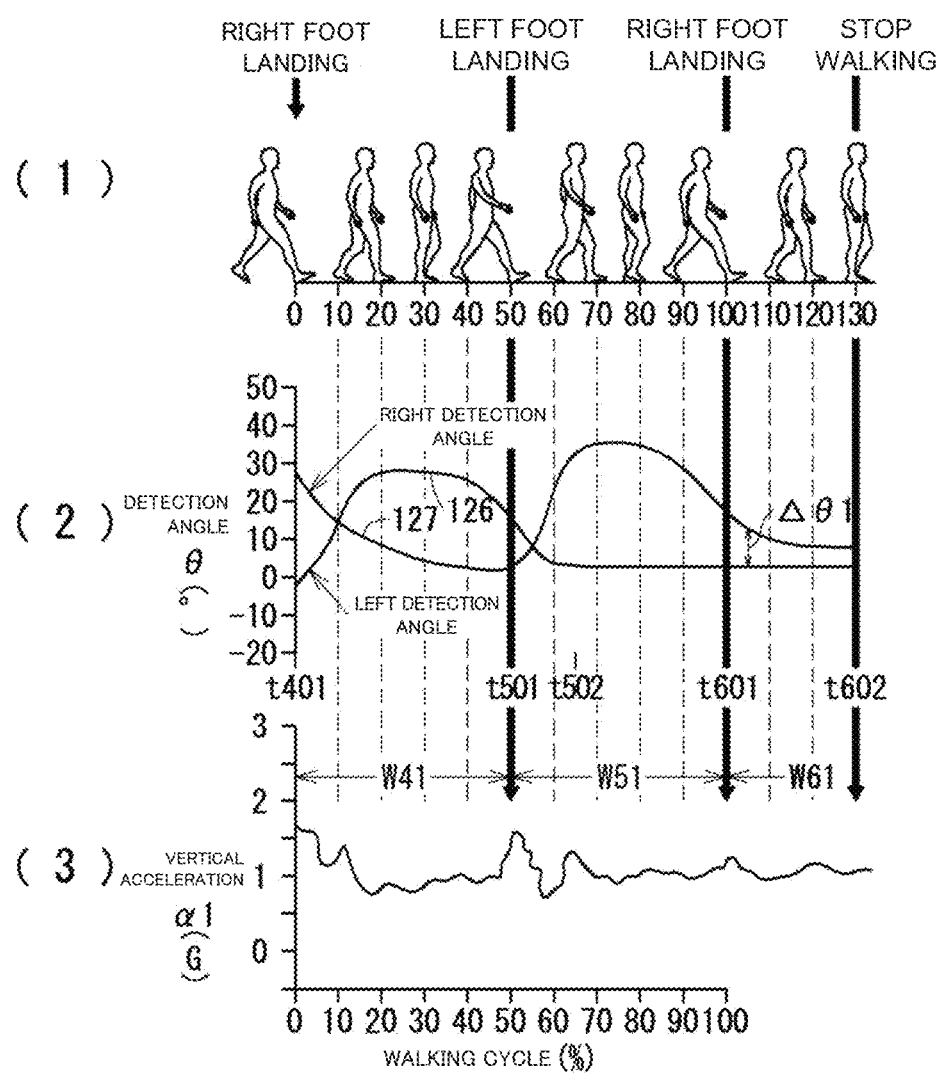
FIG. 41 is a time chart for explaining an action in the assist robot apparatus 1 while the walking assistance is continued.

FIG. 41 is a time chart for explaining an action in the assist robot apparatus 1 when the walking assistance is terminated. FIG. 41(1) indicates an action of the wearer 10 while walking, FIG. 41(2) indicates the respective waveforms 126, 127 of the detection angles θL and θR detected by the left and right angle sensors 67L and 67R, and FIG. 41(3) indicates the waveform of the acceleration α1 of the wearer 10 in the vertical direction detected by the acceleration/angular speed sensor 103. FIGS. 41(1) to (3) correspond respectively to FIGS. 39(1) to (3). In the respective walking periods W41 to W61 from the first to the third steps in which the walking assistance indicated in FIG. 41 is terminated, when the total period of a pair of periods W41 and W51 is assumed to be 100%, the respective periods W41 and W51 are 50% each. In the period W41, the left and right angles θL and θR after a time t401 when the right leg lands until the left leg lands are obtained as indicated by the lines 126 and 127. In the next period W51, during a period from a time t501 when the left leg lands to a time t601 when the both legs land by landing of the right leg, when the processing circuit 113 detects that a period W502 in which an angle difference Δθ1 of the left and right angles θL and θR is shorter than a predetermined value Δθ10 is longer than a predetermined period W70 or longer (W41<W70 W502) after the time t502, it is determined that walking is not repeated.

Figure 42:
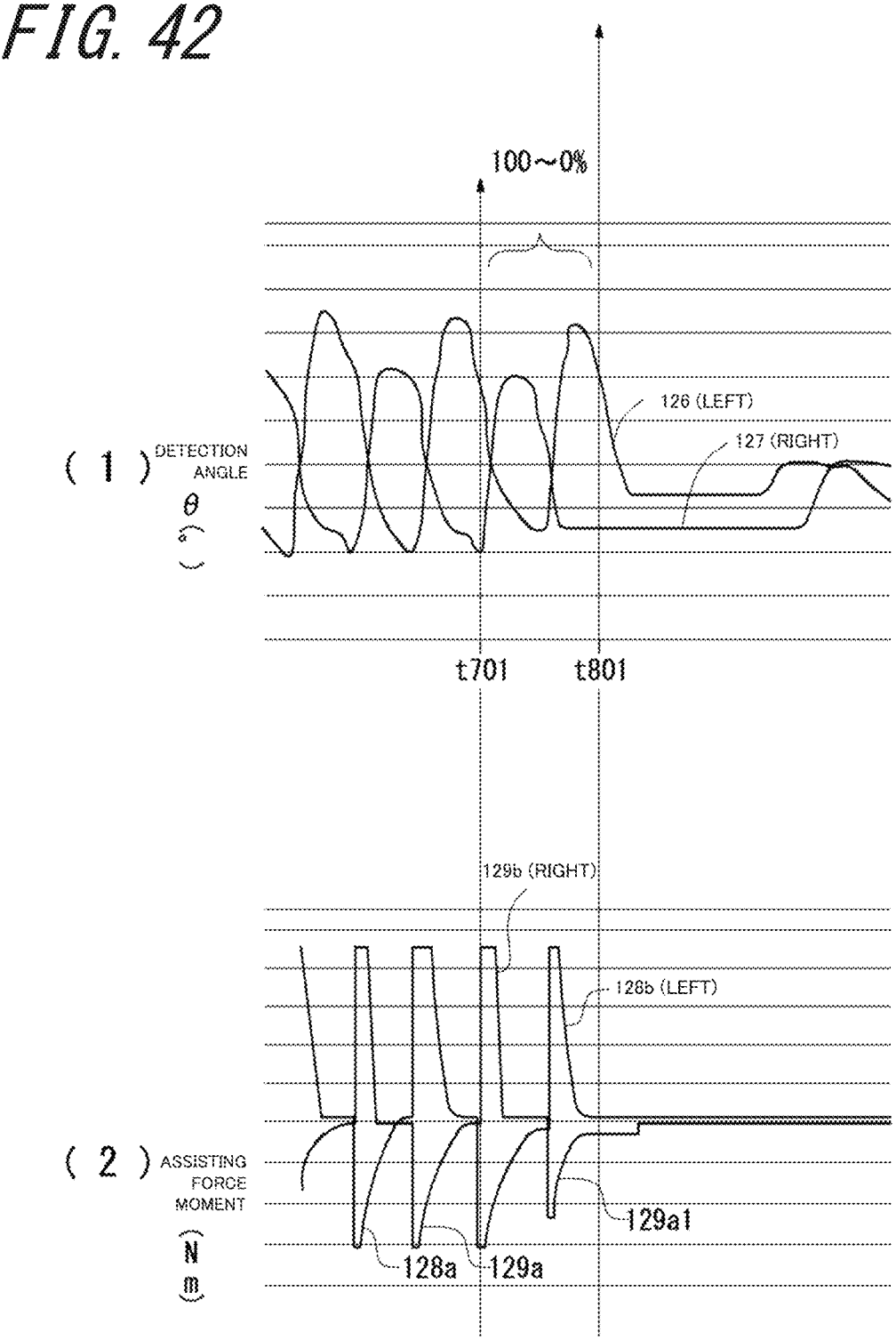
FIG. 42 is a time chart for explaining an action of the processing circuit 113 when the assist robot apparatus 1 terminates the walking assistance.

FIG. 42 is a time chart for explaining an action of the processing circuit 113 when the assist robot apparatus 1 is terminated the walking assistance. FIG. 42(1) shows the respective waveforms 126 and 127 of detection angles θL and θR detected by the left and right angle sensors 67L and 67R, FIG. 42(2) shows the swinging-down supporting force moment with a suffix "a", which is the left and right assisting force moments 128 and 129 applied to the thighs 12L and 12R by the left and right drive sources 60L and 60R, and the swing-up force moment with a suffix "b" which indicates the waveforms. The detection angles θL and θR detected by the left and right angle sensors 67L and 67R decrease at the time t701, and correspondingly, the processing circuit 113 decreases in the same manner as, for example, the swing-down supporting force moment 129a1. After the time t801, the detection angles θL and θR are kept to be the minimum value, and the assisting force moment is zero. As such, when the processing circuit 113 detects the termination of the walking from the small detected swing angles θL and θR detected by the left and right angle sensors 67L and 67R, the walking assistance is terminated immediately. When an object is detected with the object sensors 191 to 194 of the glove devices 190 for lifting assist being pressed and the lifting assist is continued in a state in which the lifting termination angle is not reached, it is determined that the lifting assist is selected in a state of walking with an object lifted for carrying until the object sensors 191 to 194 are turned off even when walking is detected, and thus the action of walking assistance is not started.

Figure 43:
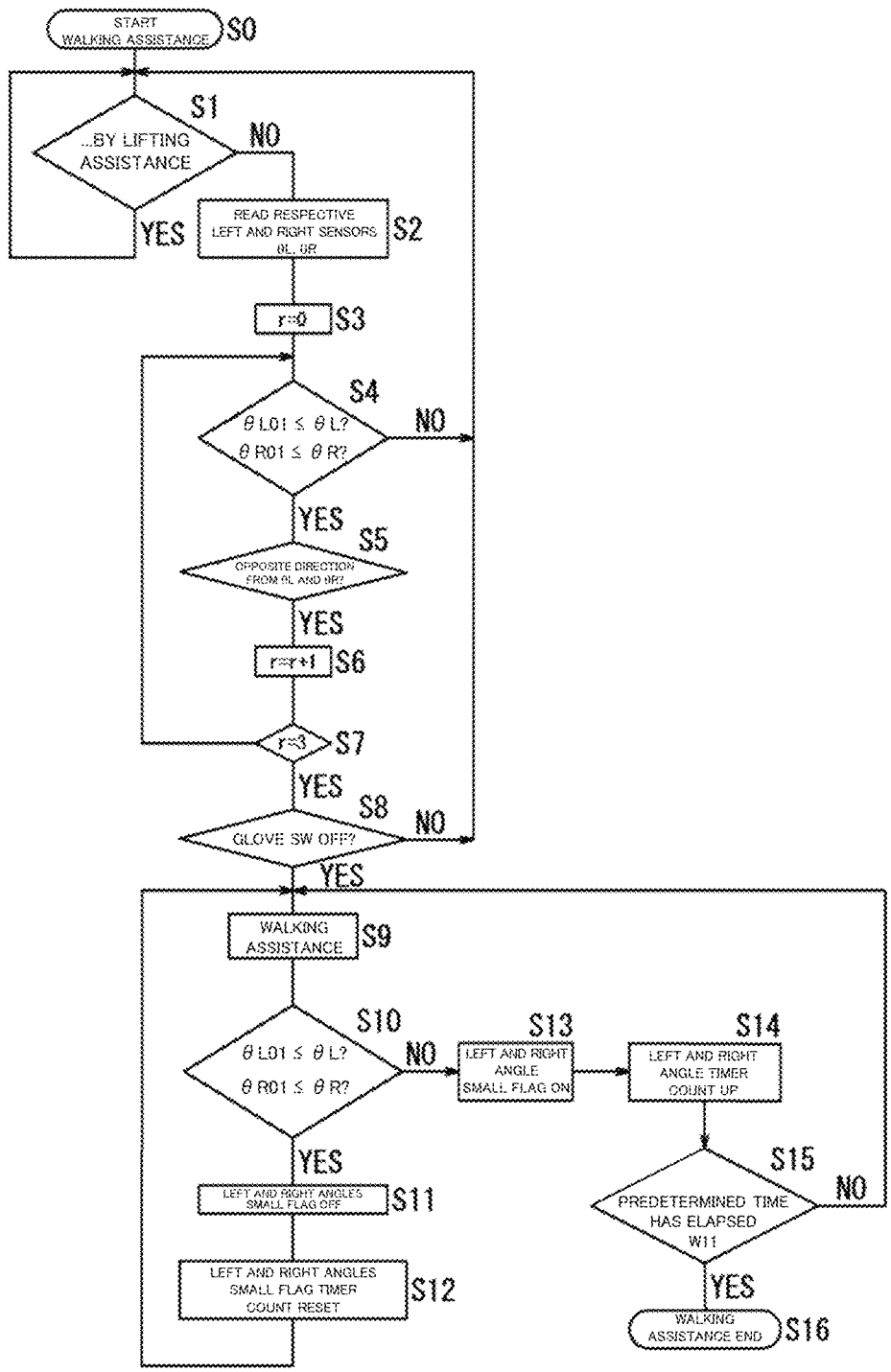
FIG. 43 is a flowchart for explaining the determination action of the walking assistance executed by processing circuit 113.
Figure 45:
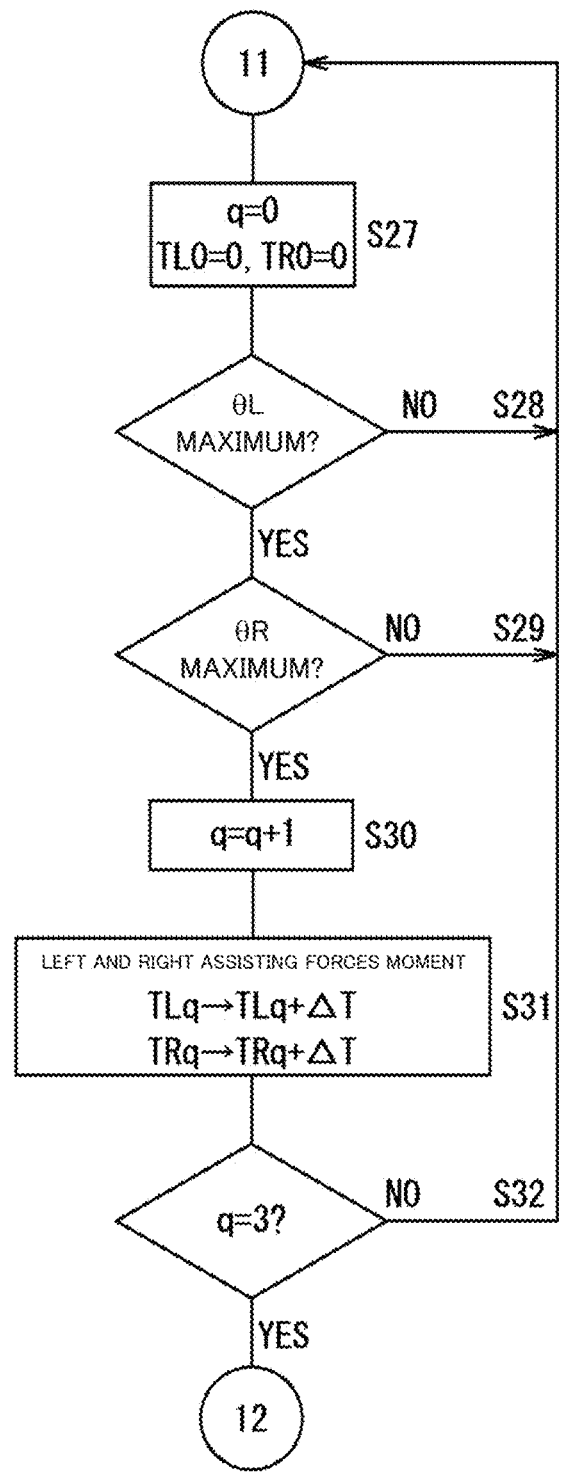
FIG. 45 is a flowchart for explaining the action of walking assistance executed by the processing circuit 113 subsequent to FIG. 44.

FIG. 43 is a flowchart for explaining the determination action of the walking assistance executed by processing circuit 113. Determination of walking is as follows. The procedure has moved from Step s0 to Step s1, and when the lifting assist is continued, the walking angles θL and θR are detected in Step S2. When the angles are the predetermined minimum values θL01 and θR01 or larger (θL01≤θL, and θR01≤θR) in Step s4 and the angles θL and θR are alternately reversed in Step s5, that is, are repeatedly in the reverse phases on the left and right in Step s5, even though it is determined that Step s4 and Step s5 are repeated by a predetermined number of times (for example, r is 3 which indicates plural times), and thus walking is repeated in Steps s3, s6 and s7, until the glove switch is turned off in Step s8, that is, if the object sensors 191 to 194 of the glove devices 190 detect an object, it is determined that the lifting assist for the carrying walk is selected, and thus the action of walking assistance does not start, and if not, the action of walking assistance is performed in Step s9. In addition, walking is determined by repetition of the waveforms for the left and right thighs 12 from the angle sensors 67 during walking in the reverse phase described above and, for example, by the angle θ of the swung-up leg having reached the maximum angle and having been changed from increasing to decreasing compared with the previous value. In this manner, repetition of walking is determined by accumulating the number of times of reaching the maximum angle by the counter and determining, from the accumulated value of the counter, that reaching the maximum angle is repeated two or three times, which are a predetermined number of times. Subsequently, as illustrated in FIG. 45, the assisting force for walking may be increased.

If the swing angles θL and θR detected by the left and right angle sensors 67 in Step s10 is small (θL<θL01, and θR<θR01), a flag indicating that the left and right angles are small is turned on and the timer for counting the time during which the left and right angles are small counts up in Step s14. If the counted time is longer than the predetermined time W11a, the walking is determined to have been terminated in Step s16, and thus the walking assist is terminated in Step s16. In other words, the walking assistance is terminated immediately upon detection of the fact that the difference Δθ1 (FIG. 41(2)) between the swing angles θ detected by the left and right angle sensors 67 are small and hence the walking has been terminated. If the swing angles θL and θR detected by the left and right angle sensors 67 in Step s10 is large (θL01≤θL, and θR01≤θR) in Step s10, a flag indicating that the left and right angles are small in Step s14 is turned off in Step s11, and the timer for counting the time during which the left and right angles are small is reset to zero in Step s12, and the procedure goes back to Step s9.

FIG. 44 to FIG. 47 are flowcharts for explaining the action of walking assistance executed by the processing circuit 113. The procedure goes from Step s20 to Step s21 of FIG. 44, and when it is determined that the acceleration α1 in the vertical direction detected by the acceleration/angular speed sensor 103 reached the maximum value, the procedure goes to Step s22. When a leg lands, the acceleration α1 in the vertical direction reaches the maximum value due to an impact of landing. The angle of the free leg which is about to land is swung back from the maximum angle to an angle of about 20°, for example. The supporting leg which has already landed is swung down at an angle θ which is near 0 in the right below direction, which corresponds to the minimum value. For example, in the case where the angle θL of the left leg is substantially zero, when the left leg lands in Step s23, the left leg becomes the supporting leg, and the right leg is swung up and becomes the free leg. When the right leg lands in Step s24, in the case where the angle θR of the right leg is substantially zero, the right leg becomes the supporting leg by landing in Step s25.

In the case where both of the angles θL and θR are large values in Steps s22 and s24, in Step s26, it is determined that the wearer 10 is not walking and is running with both legs floated, and the action of walking assistance is terminated for safety.

Figure 44:
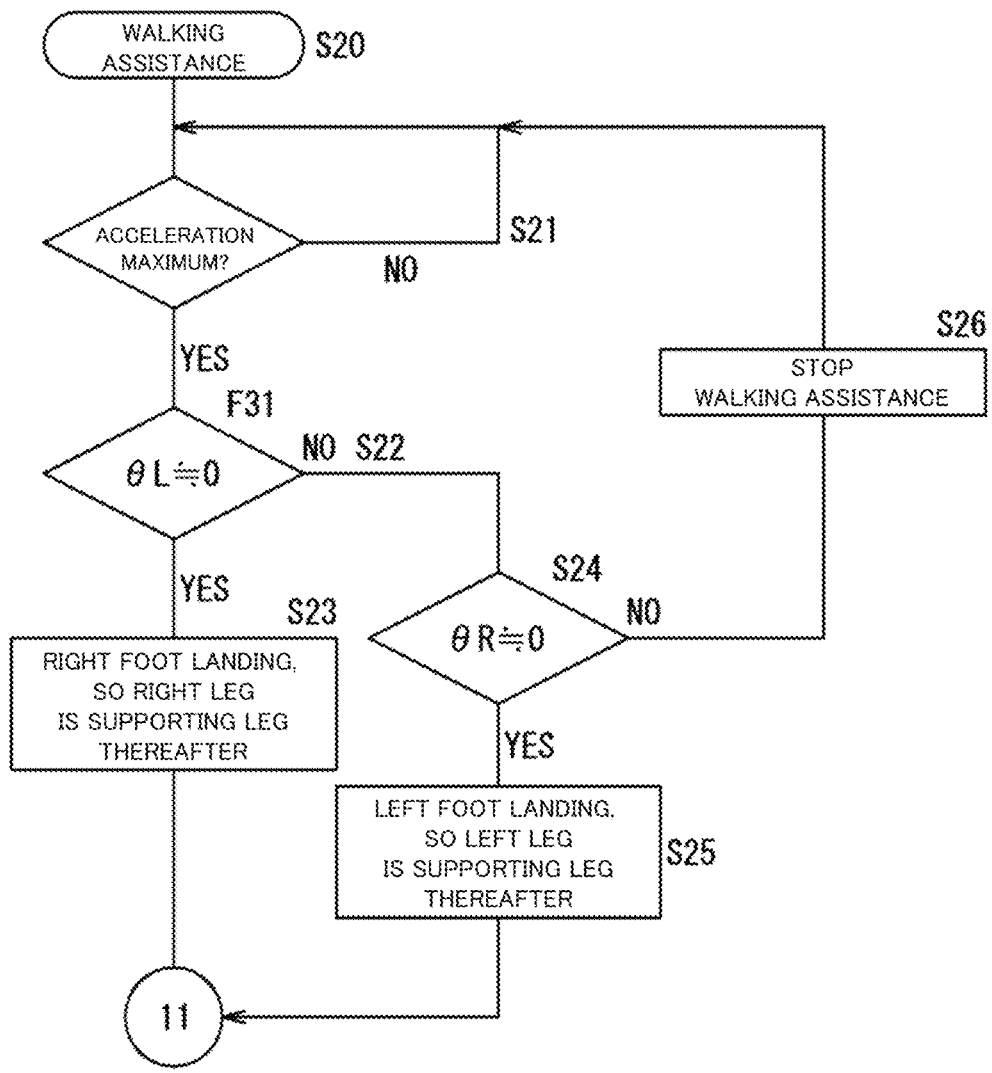
FIG. 44 is a flowchart for explaining an action of walking assistance executed by the processing circuit 113.

After the detection of landing in Steps s23 and s25 of FIG. 44, the procedure goes to Step s27 and the subsequent steps of FIG. 45. When the maximum values of the angles θL and θR are detected alternately in Steps s2 and s29, the count value q of the counter, which has been reset to zero in Step s27, is incremented by one in Step s30, and the left and right assisting force moments TLq and TRq are gradually increased by an amount of increase ΔT in Step s31. Such action is repeated by a predetermined number of times (for example, q is 3 which indicates plural times) in Step s32.

Figure 46:
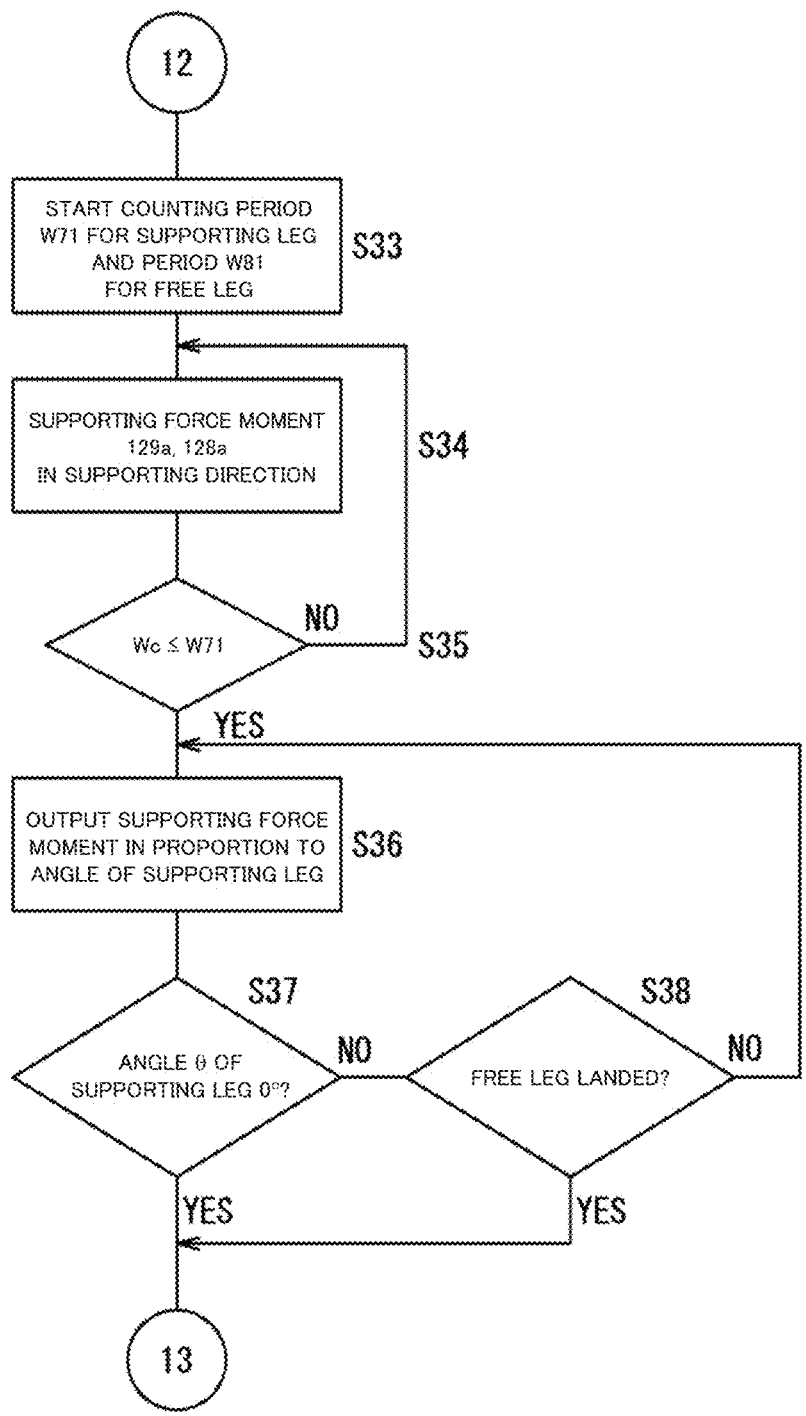
FIG. 46 is a flowchart for explaining the action of walking assistance executed by the processing circuit 113 subsequent to FIG. 45.

From the Step s23 of FIG. 45, the procedure goes to Step s33 and the subsequent steps of FIG. 46, where a supporting force moment is applied to the supporting leg. After the landing is detected at the time t10 or time t20 in FIG. 39 in Step s33, counting of an elapsed time W71 for the supporting leg and an elapsed time W81 for the free leg is started. In Step s34, a supporting force moment at a predetermined constant value (the lines 129a and 128a in FIG. 39(4)) is applied to the supporting leg. In Step s35, it is determined whether or not the elapsed time W71 for the supporting leg has reached or exceed the predetermined period Wc, which is a period of supporting by the supporting force moment, and if so, the supporting force moment is continuously outputted at a value proportional to the angle θ of the supporting leg in next Step s36, until the angle θ of the supporting leg becomes 0° in Step s37, or until the free leg lands in Step s38 after the elapse of the predetermined period Wc.

Figure 47:
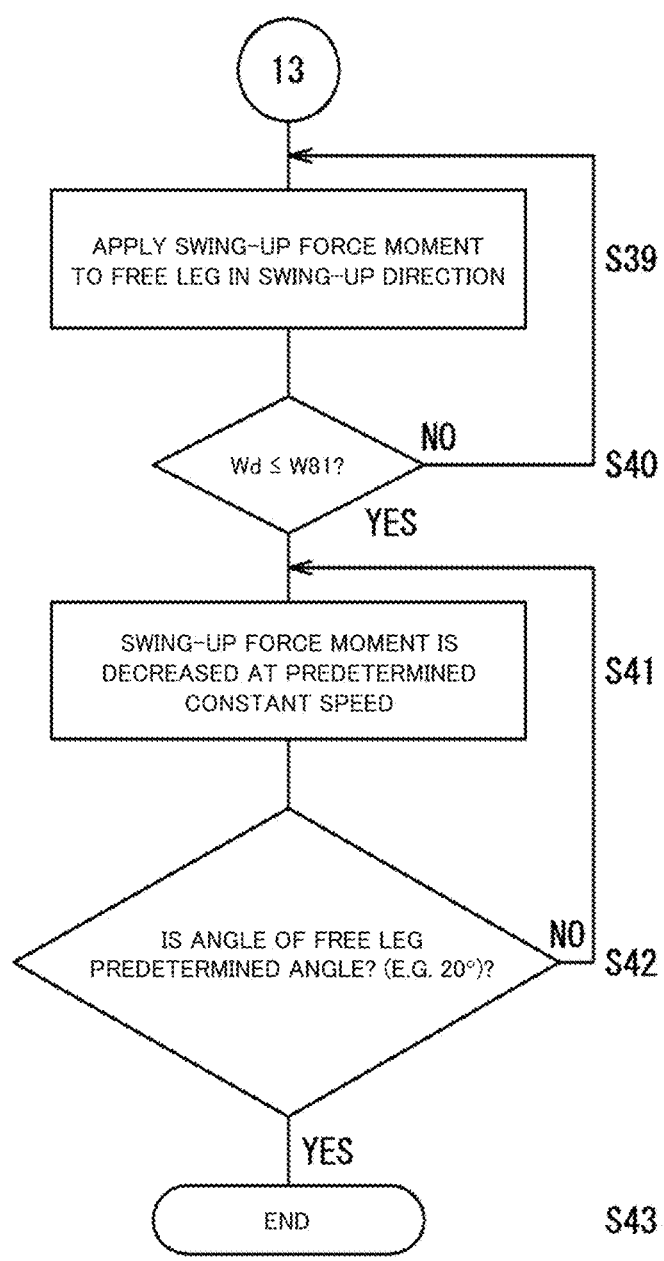
FIG. 47 is a flowchart for explaining the action of walking assistance executed by the processing circuit 113 subsequent to FIG. 46.

The procedure goes from Step s37 or Step s38 of FIG. 46 to Step s39 of FIG. 47, where the swing-up force moment (lines 128b and 129b in FIG. 39(4)) having a predetermined constant value is applied to the free leg. In Step s40, it is determined whether or not the elapsed time W81 for the free leg has elapsed by the predetermined period Wd, and if so, after the elapse of the predetermined period Wd, the swing-up force moment is decreased at a predetermined constant speed in next Step s41. The swing-up force moment is continuously outputted until the angle θ of the free leg reaches the predetermined angle (for example, 20°) in Step s42.

Figure 48:
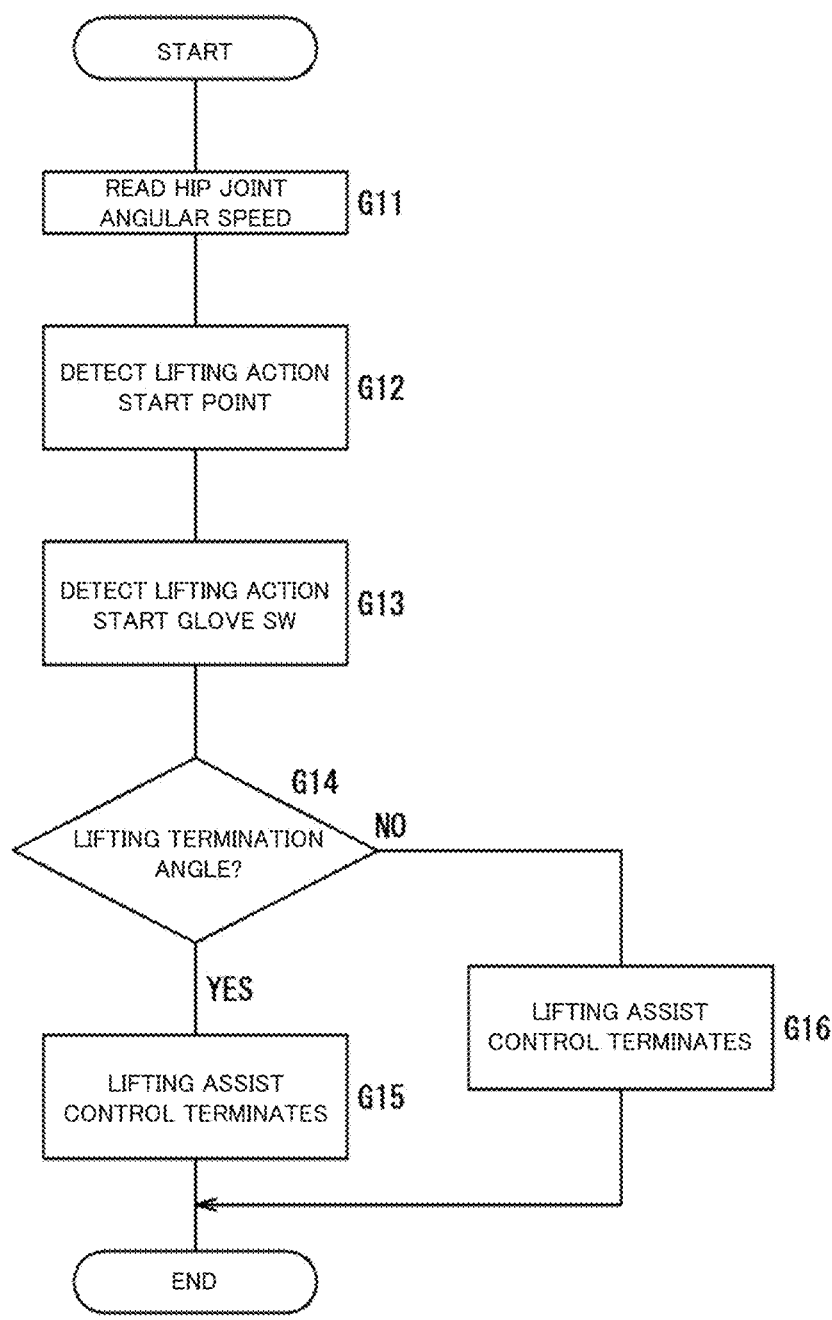
FIG. 48 is a flowchart showing a process procedure of an upper body determination process for the lifting action executed by the processing circuit 113.

FIG. 48 is a flowchart showing a process procedure of an upper body determination process for the lifting action executed by the processing circuit 113. In the upper body determination process, whether or not an attempt is made to bent the hip joints and then heave the upper body upright is determined by using the posture information of the wearer 10. In the processing circuit 113, the procedure moves to Step G11 when the Step D13 shown in FIG. 34 has been executed.

In Step G11, the processing circuit 113 computes the detection angles θ of the hip joints, and reads the hip joints angular speed ω. In Step G12, the processing circuit 113 detects a lifting assist action start point. A position where the hip joints angular speed ω calculated in Step G11 exceeds the "bent side" of the parameter No. "41" is detected, and the detected position is determined as an upper body bending action start point. In Step G13, the processing circuit 113 waits for the detection for the start of the lifting action by outputs from the object sensors 191 to 194 working as a start switch for starting the lifting action, and upon detection of turning on of the start switch, the processing circuit 113 starts the upper body control output, and then terminates the upper body control for the lifting assist in a stage where the angles are decreased to predetermined lifting termination angle (Steps G14 to G16).

The lifting timing is created based on the acceleration and the detection signal of an angular acceleration. The lifting timing is created based on the acceleration and the detection signal of an angular acceleration illustrated in FIG. 50 described later.

Figure 49:
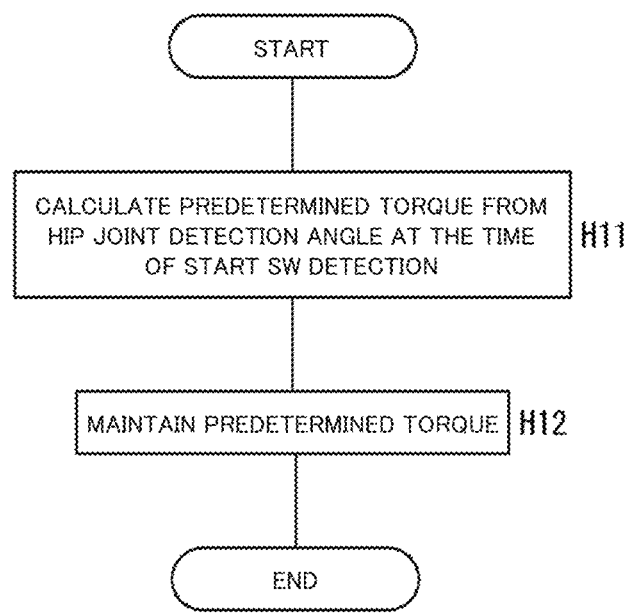
FIG. 49 is a flowchart showing a process procedure of the upper body control process executed by the processing circuit 113.

FIG. 49 is a flowchart showing a process procedure of the upper body control process executed by the processing circuit 113. In the processing circuit 113, the procedure moves to Step H11 when the Step D14 shown in FIG. 35 has been executed. In Step H11, the processing circuit 113 calculates assist torque in proportion to the hip joints angles θ detected by the angle sensors 67 and required for the both legs. In Step H12, the calculated assist torque is maintained. When the angles θ reach 0, that is, if a large lifting assist acts when the body is heaved upright, since the wearer 10 tends to break down the balance, this state needs to be avoided. Therefore, as described above, according to the invention, the assist torque in proportion to the hip joints angles θ is calculated, however, a linear function or a quadratic function may also be applicable in other embodiments.

Figure 50:
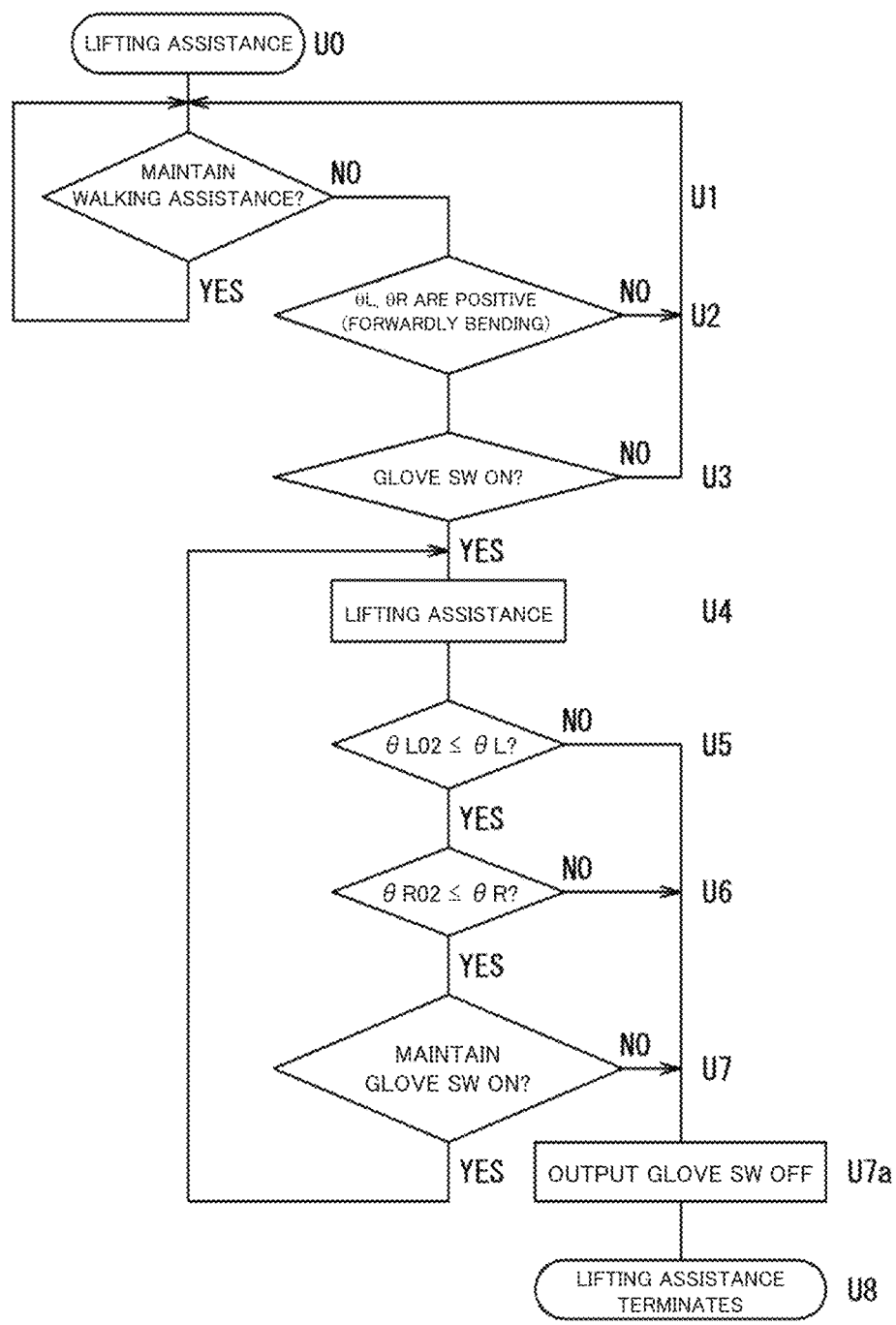
FIG. 50 is a flowchart for explaining the action of lifting assistance executed by the processing circuit 113.

FIG. 50 is a flowchart for explaining the action of lifting assistance executed by the processing circuit 113. In the case where the action of lifting assistance is continued in a state in which lifting termination angle is not reached with the object sensors 191 to 194 of the glove devices 190 for lifting assist being pressed in Step u3 by the wearer 10 gripping an object to be lifted, even though the walking is detected in Step u1, it is determined that the lifting assist is selected in a state of walking with an object lifted for carrying until the object sensors 191 to 194 are turned off, walking assist in Step u4 is not started. As to the lifting determination, even when the angles θL and θR detected by the left and right angle sensors 67 are substantially the same on the left and right (θL=θR), or even when lifting with the legs spread apart, the lifting assist is started in Step u4 when the angles are directed in the direction in which the waist is bent as in Step u2 (bent-forward posture, θL02≤θL, and θR02≤θR, where θL02 and θR02 are predetermined values), the walking assist are not provided, and the object sensors 191 to 194 in which the glove switch SW is on in step u3 are pressed. When the angles θL and θR are smaller than the predetermined lifting termination angle θL02, θR02 in Step u5 and Step u6 (θL<θL02, and θR<θR02), or when the object sensors 191 to 194 are off in Step u5 and Step u6, the lifting assist is terminated in Step u8. When the detection angle θL and θR are larger than the lifting termination angle θL02 and θR02 in Step u7 (θL02≤θL, and θR02≤θR), a trigger of starting lifting, which corresponds to the object sensors 191 to 194 being on, is maintained and latched.

In other words, as to the lifting assist, the lifting assist is started when the object sensors 191 to 194 of the glove devices 190 are pressed in the case where the angles θL and θR detected by the left and right angle sensors 67 are directed in the direction in which the waist is bent and the walking assist is ineffective. In the lifting assist, a predetermined lifting force moment is outputted. When the predetermined lifting termination angle is reached or when the object sensors 191 to 194 are turned off, the lifting assist is terminated. The detection angle θL and θR being, for example, zero, are angles in the standing upright position. When lifting, the movement gains momentum. However, when the angles θL and θR are set to 0°, enough momentum cannot be obtained. Therefore, the lifting termination angle θL02 and θR02 are set to predetermined values which correspond to the posture slightly bending backward from 0°, for example, −20°. The angle θ is positive clockwise in FIG. 31, and −20° is assumed when the value exceeds 180°, which is an angle bending backward beyond the right above.

In the embodiment of the invention described above, the start of lifting is detected when the glove switch is turned on in Step u3 of FIG. 50, that is, by an ON signal which indicates that the object sensors 191 to 194 of the glove devices 190 detect the object, and the termination of lifting is detected by an OFF signal which indicates that the object is not detected in Step u7.

In contrast, in another embodiment, the lifting assist control is realized in a system as simple as possible without providing the object sensors 191 to 194 of the glove devices 190 to solve the problems such as the burden of usage of the glove devices 190 or breakdown of the object sensors 191 to 194. In a first embodiment in which the glove devices 190 is not used, the processing circuit 113 executes the flowchart in FIG. 60 instead of Step u3 of FIG. 50. In Step u75 to next Step u76, it is determined that the vertical movement has been started for lifting when the acceleration α1 in the vertical direction exceeds a predetermined first threshold value (for example, 1.15 G) in response to an output from the same acceleration/angular speed sensor 103 as those detecting the landing during walking, or when the acceleration α1 falls below a predetermined second threshold value (for example, 0.85 G). In Step u77, since the acceleration α1 in the vertical direction is acquired from the acceleration/angular speed sensor 103 by the landing during walking, it is determined that the detection is for the lifting assist after having detected that the wearer is not walking. Since the acceleration α1 in the vertical direction is acquired also when hitting against an object, the detection is performed for the lifting assist within the range (for example, −0.15 G to 0.15 G) under the condition at or below a third threshold value (for example, 0.15 G) in which the acceleration α2 in the anteroposterior direction and the acceleration α3 in the lateral direction are not detected.

In the embodiment in which the glove devices 190 is not used, in Steps u76 and u77, and under AND condition, in Step u78, it is determined that rotational movement of the waist at the time of lifting is generated when the detected angular speed ω3 about the axial line in the lateral direction detected by the acceleration/angular speed sensor 103 exceeds a predetermined first angular speed threshold value (for example, 300°/s), or falls below a second angular speed threshold value (for example, −300°/s), that is, when a negative absolute value is increased. In this manner, as the motion may occur reversely and counterclockwise instead of clockwise in FIG. 31 when lifting, detection is performed even when the counterclockwise negative absolute value is large, and a vision with the negative second angular speed threshold value is also realized.

In Step u79, the angular speed ω is also obtained at the time of walking, detection is performed in a state in which the wearer is not walking. Since the angular speed ω is acquired also when hitting against an object, the detection is performed under the condition that the angular speed ω2 about the vertical axial line and the angular speed ω3 about the anteroposterior axial line do not exceed a predetermined third angular speed threshold value (for example, 300°/s) or do not fall below a predetermined fourth angular speed threshold value (for example, −300°/s).

Following Steps u76 to u79, and under AND condition, in Step u80, when the angles detected by the left and right angle sensors 67 are within an angle range showing that the body trunk 11 is in the bent-forward posture (for example, 10 to 90 degrees) which is a predetermined threshold value, the object sensors 191 to 194 of the glove devices 190 output trigger signals to start lifting, which is equivalent to the ON signal indicating that the object is detected in Step u82, and then the procedure goes to step u4 of FIG. 50. When the determination performed in Steps u76 to u80 described above is negative, the trigger signal of the ON signal described above is turned off in Step u81, and the procedure returns to Step u76.

In Step u7a of FIG. 50, the object sensors 191 to 194 of the glove devices 190 output an OFF signal, and in the embodiment having no glove devices 190, the trigger signal equivalent to the OFF signal and indicating the termination of lifting is obtained when the angles θ of the left and right electric motor 64 exceed a predetermined lifting termination angle (for example, −20°, and then lifting is terminated.

In still another embodiment of the invention, a configuration is applicable in which the lifting timing is created by a detection signal obtained by detecting a current (torque) of the electric motor 64 by a current detector instead of the acceleration detection signal. Specifically, in a configuration in which the capacitance of the electric motor 64 is small, and the output torque is small, variations in load current is advantageously large enough to ensure detection.

Figure 51:
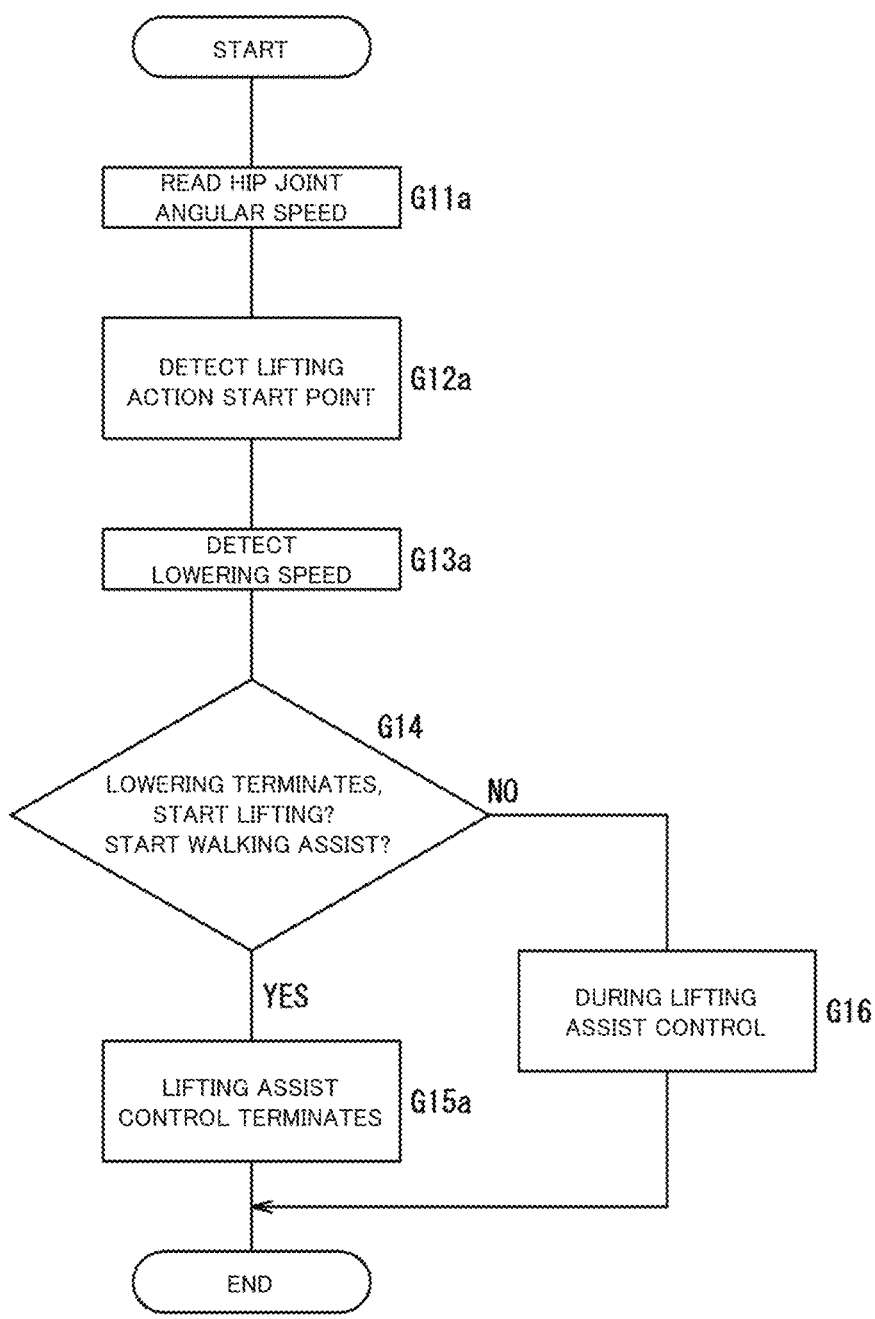
FIG. 51 is a flowchart showing a process procedure of the upper body determination process for the lowering breke action executed by the processing circuit 113.

FIG. 51 is a flowchart showing a process procedure of the upper body determination process for the lowering brake action executed by the processing circuit 113. In the upper body determination process, it is determined whether or not an attempt is made to bent the hip joints and then bend the upper body forward by using the posture information of the wearer 10. In the processing circuit 113, the procedure moves to Step G11a when the Step D13 shown in FIG. 34 has been executed.

In Step G11a, the processing circuit 113 computes the detection angles θ of the hip joints, and reads the hip joints angular speed ω. In Step G12a, the processing circuit 113 detects a lowering assist action start point. In step G13a, the processing circuit 113 detects that the lowering speed is the predetermined value or more. In Step G14a, it is determined whether the determination applies to the termination of the lowering time, the start of the lifting assist, or the start of the walking assist. When it is determined in Step G14a that the determination applies to the termination of the lowering time, the brake force is set to zero in Step G15a, and the upper body control for the lowering assist is terminated.

When it is determined in Step G14a that the determination does not applies to the termination of the lowering time, a predetermined brake force is imposed for the lowering assist in Step G16a.

Figure 52:
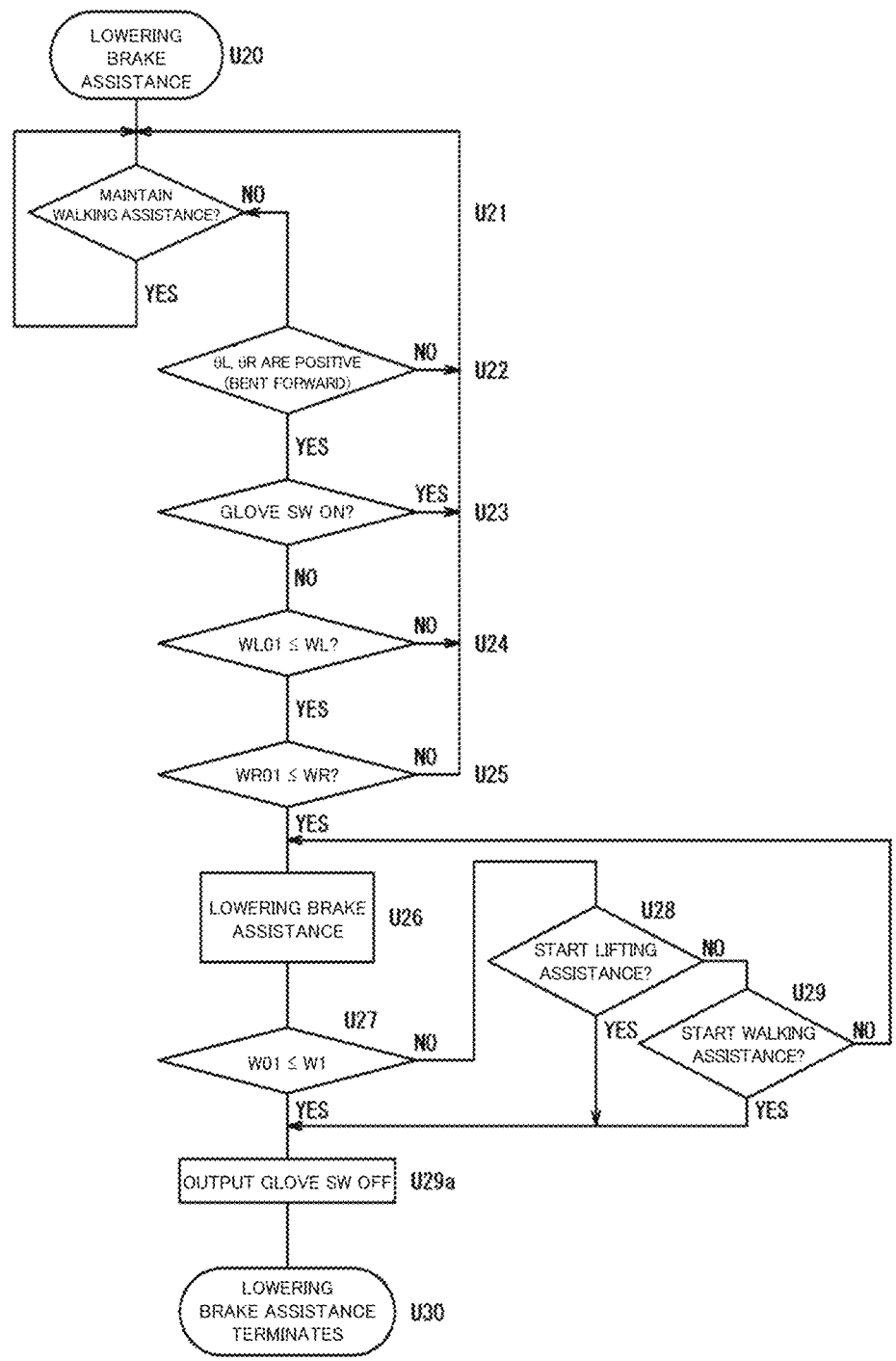
FIG. 52 is a flowchart showing a process procedure of the lowering brake assistance control process executed by the processing circuit 113.

FIG. 52 is a flowchart showing a process procedure of the lowering brake assistance control process executed by the processing circuit 113. In the processing circuit 113, the procedure moves to Step u20 when the Step D14 shown in FIG. 34 has been executed. The lowering brake assist is started when the angles detected by the left and right angle sensors 67 in Step u22 are directed in the direction in which the waist is bent, the walking assist is ineffective in Step u21, the object sensors 191 to 194 of the glove devices 190 are not pressed in Step u23, and the angular speeds $\omega L$ and $\omega R$ calculated from angles detected by the left and right angle sensors 67 in Step u24, Step u25 reach or exceed the predetermined angular speeds $\omega L01$ and $\omega R01$ ($\omega L01 \leq \omega L$, and $\omega R01 \leq \omega R$) in the lowering direction.

At the beginning, a predetermined brake force is imparted, and then after the counted period W1 reaches a predetermined lowering period W01 (W01≤W1), the brake force is set to zero and the assist is terminated. When the lifting assist and the walking assist in Steps u28 and u29 are started, the lowering brake assist is terminated immediately.

In another embodiment, the acceleration and the angular speed of the body trunk of the wearer are detected by outputs from the acceleration/angular speed sensor 103 without using the glove devices 190, and the processing circuit 113 applies the lowering brake force moment to limit the moment reducing the relative angle between the body trunk 11 and the respective thighs 12 by the left and right drive sources 60 and acting in the lowering direction when the detected acceleration or angular speed corresponds to the start of an object lowering brake assistances, in response to the outputs from the acceleration/angular speed sensor 103. Therefore, the acceleration or the angular speed of the body trunk 11 of the wearer is detected without using the glove devices 190 and the object sensors 191 to 194, and for example, the acceleration $\alpha 1$ of the body trunk 11 of the wearer 10 in the vertical direction is detected, or for example, the angular speed $\omega 3$ of the body trunk 11 about an axial line in the lateral direction is detected, or for example, the speed of the body trunk 11 about the axial line in the lateral direction is detected. The range of value of an acceleration $\alpha 1$, the value range of the angular speed $\omega 3$ or the angle allows determination of, for example, the start of movement in the vertical direction at the time of lowering, and further determination of termination of these movements. A configuration in which the angle of the body trunk 11 is detected by the angle sensors to apply the lowering brake force moment is also applicable. In this manner, in the lowering brake assistance as well, the lowering brake assistance may be achieved without using the glove devices 190 by having a predetermined lowering speed.

Figure 60:
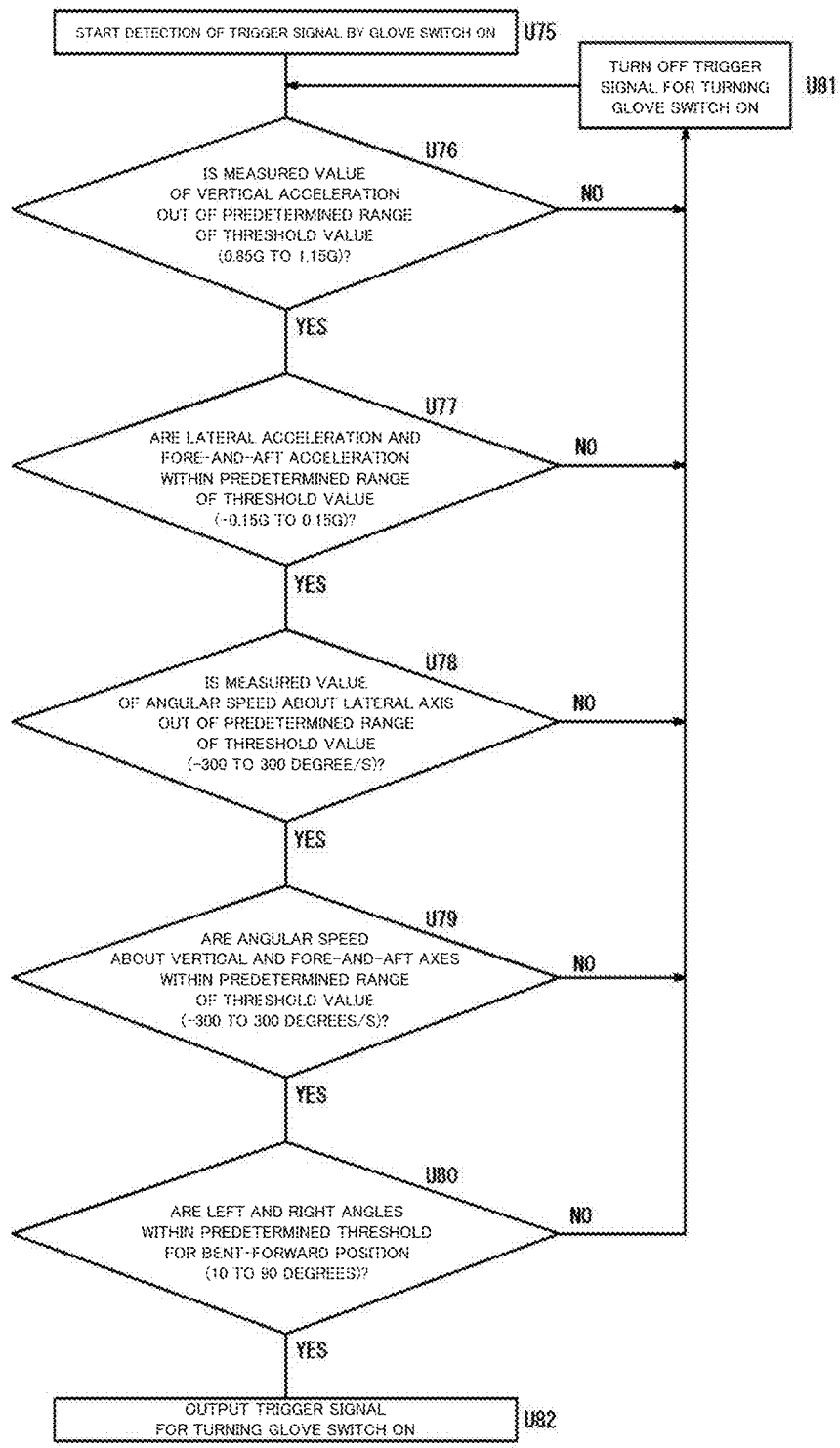
FIG. 60 is a flowchart for explaining an action for realizing lifting assist control and lowering brake control executed by the processing circuit 113 without using object sensors 191 to 194 of the glove devices 190.

In this embodiment in which the lowering brake force moment is provided without using the glove devices 190, the processing circuit 113 executes the actions in the flowchart in FIG. 60 descried above in Step u23 of FIG. 52 in the same manner. In the step u29a of FIG. 52, the actions described above in the same manner as in the step u7a in FIG. 50 are executed.

Figure 53:
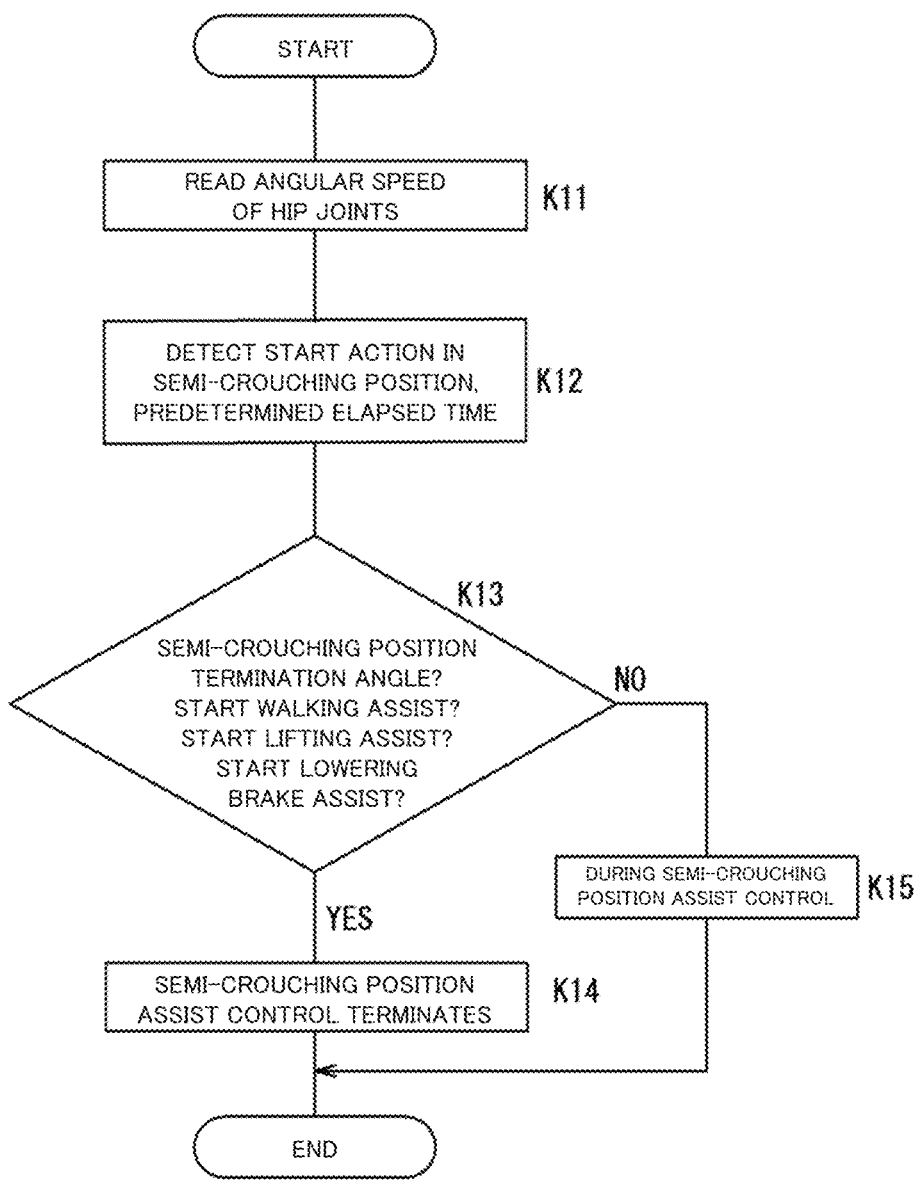
FIG. 53 is a flowchart showing a process procedure of the semi-crouching position determination process executed by the processing circuit 113.

FIG. 53 is a flowchart showing a process procedure of the semi-crouching position determination process executed by the processing circuit 113. In the semi-crouching position determination process, the semi-crouching position is determined by using the posture information of the wearer 10. In the processing circuit 113, the procedure moves to Step K11 when the Step D15 shown in FIG. 34 has been executed.

In Step K11, the processing circuit 113 computes the detection angles θ of the hip joints, and reads the hip joints angular speed ω. In Step K12, the processing circuit 113 detects that the predetermined elapsed time has elapsed after the predetermined semi-crouching position angle has reached. In Step K13, it is determined whether the determination applies to the termination of the semi-crouching position angle, the start of the walking assist, the start of the lifting assist, or the start of the lowering brake assist. In Step K13, when the determination applies to none of the termination of the semi-crouching position angle, the start of the walking assist, the start of the lifting assist, and the start of the lowering brake assist, the semi-crouching position assist control is maintained. In Step K13, when the determination applies to one of the termination of the semi-crouching position angle, the start of the walking assist, the start of the lifting assist, and the start of the lowering brake assist, the semi-crouching position assist control is terminated.

Figure 54:
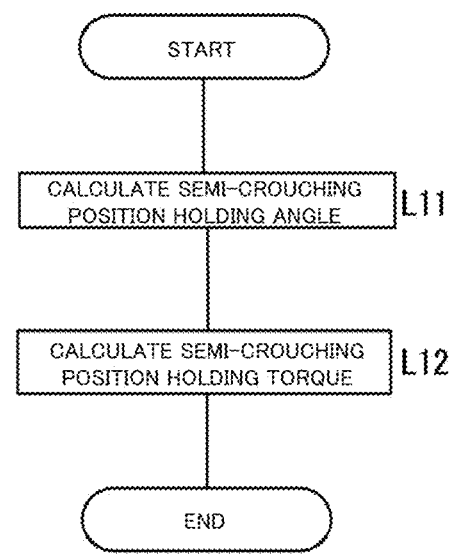
FIG. 54 is a flowchart showing a process procedure of the semi-crouching position control process executed by the processing circuit 113.

FIG. 54 is a flowchart showing a process procedure of the semi-crouching position control process executed by the processing circuit 113. In the processing circuit 113, the procedure moves to Step L11 when Step D16 shown in FIG. 34 has been executed. In Step L11, a semi-crouching position holding angle is obtained by calculating the average value of the angles detected by the angle sensors 67 so far.

In Step L11 executed by the processing circuit 113, after the start of the semi-crouching position, a semi-crouching position holding torque is outputted by a predetermined spring force in proportion to an angle deeper than the semi-crouching position holding angle. When a variation range of the semi-crouching position angle is larger than a predetermined angle variation range within a predetermined elapsed time, the spring constant of the spring force is reduced from the predetermined value to zero in proportion thereto, and the semi-crouching position assist can be ineffective.

Figure 55:
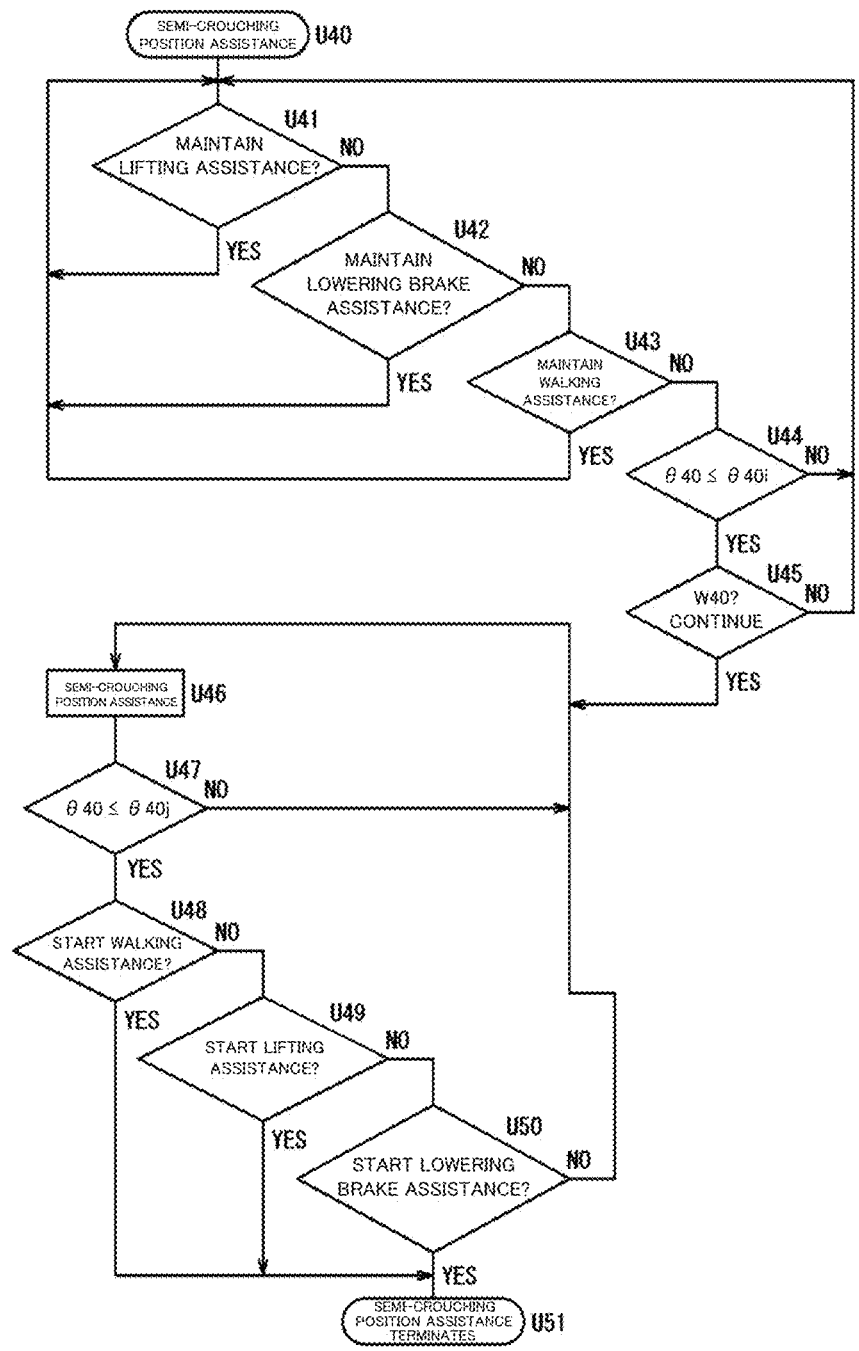
FIG. 55 is a flowchart showing the semi-crouching position assistance action executed by the processing circuit 113.

FIG. 55 is a flowchart showing the semi-crouching position assistance action executed by the processing circuit 113. In the case where the lifting assistance, the lowering brake assistance, and the walking assistance are not performed from Step u40 to Steps u41 to u43, when angles $\theta 40i$ detected by the left and right angle sensors 67 are directed in the direction to allow the waist to bend ($\theta 40i \leq 0$) in a state in which the lower limbs, and thus the thighs 12 are standing upright and are a predetermined semi-crouching position angle $\theta 40$ or more ($\theta 40 \leq \theta 40i$) in Step u44, and this state continues beyond a predetermined elapsed time W40 (for example, 3 seconds) in Step u45, the processing circuit 113 starts the predetermined semi-crouching position assistance in Step u46. In this manner, the predetermined semi-crouching position assist action is started when the angles detected by the left and right angle sensors 67 are directed in the direction to allow the waist to bend, none of the lifting assist, the lowering brake assist, and the walking assist are effected, the predetermined semi-crouching position angle is reached, and the predetermined elapsed time has passed.

Figure 56:
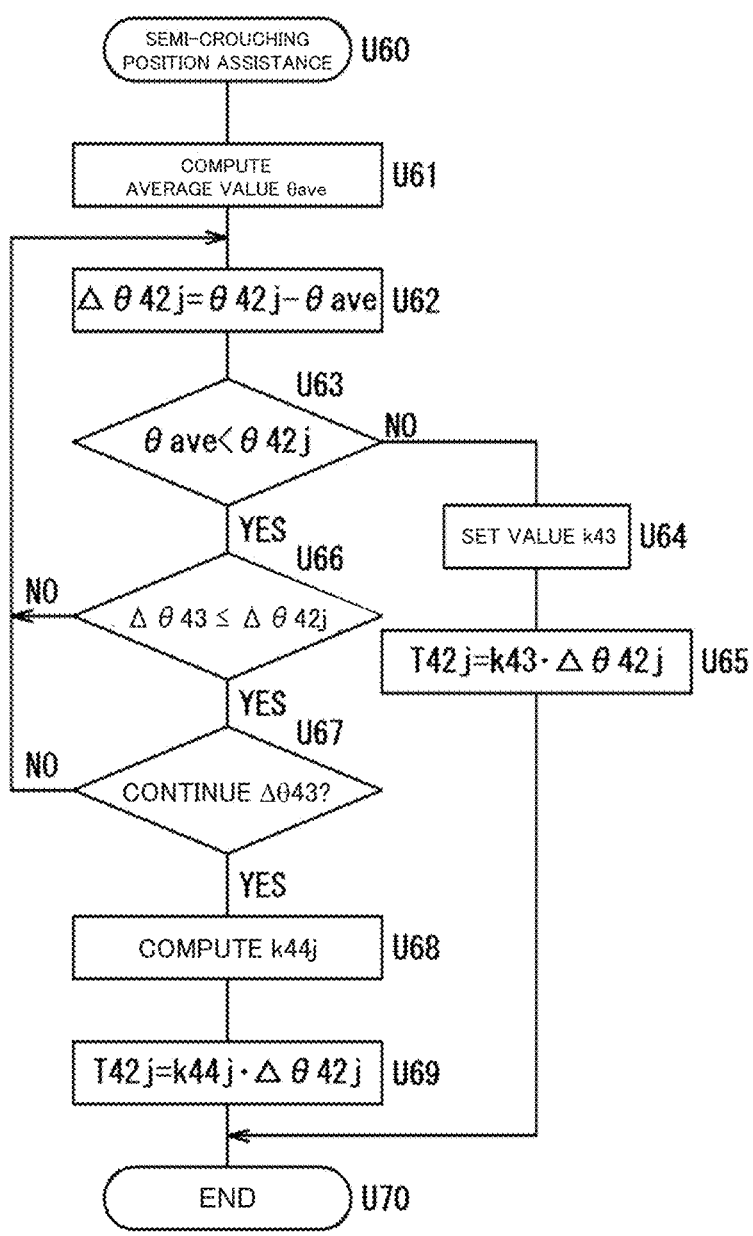
FIG. 56 is a flowchart showing the semi-crouching position assistance action executed by the processing circuit 113 executed in Step u46 of FIG. 55.
Figure 57:
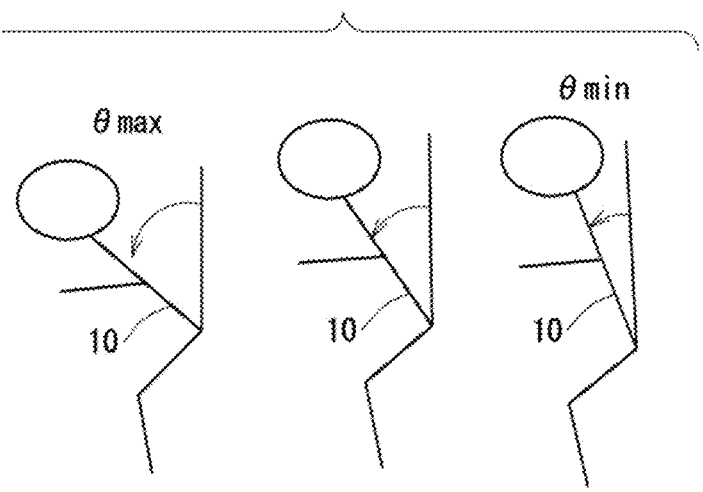
FIG. 57 is a skeleton diagram illustrating a posture of the wearer 10 corresponding to the respective detection angles within a predetermined elapsed time W42 (for example, 3 seconds)
Figure 58:
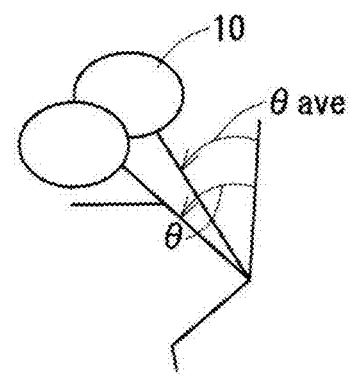
FIG. 58 is a partial skeleton diagram illustrating an average value θave.

FIG. 56 is a flowchart showing the semi-crouching position assistance action executed by the processing circuit 113 executed in Step u46 in FIG. 55, FIG. 57 is a skeleton diagram illustrating a posture of the wearer 10 corresponding to the respective detection angles within a predetermined elapsed time W42 (for example, 3 seconds), in which θmax indicates the maximum value, and θmin indicates the minimum value in the period W42, and FIG. 58 is a partial skeleton diagram illustrating an average value θave. During the semi-crouching position assistance action, in Step u61, the semi-crouching position holding angle is set to the average value θave of an angle θ42j measured by the angle sensors 67 within the elapsed time W42. The number of times of sampling angle detection in the period W42 is represented by i, which is natural numbers 1 to p.

$$\theta ave = \left\{ \sum_{i=1}^{P} (\theta 42j) \right\} / p \qquad (3)$$

For example, if the wearer is assumed to bend by equal to or more than 10°, which is the predetermined angle θ42j, for equal to or longer than 3 seconds, which is the predetermined period W42, the semi-crouching position holding angle employs the semi-crouching position angle θave, which is an average of the time W42. The semi-crouching position assistance action computes an angle variation range Δ42j in Step u62.

$$\Delta\theta 42j = \theta 42j - \theta ave \qquad (4)$$

When in Step u63 the detection angle θ42j reaches an angle (θave<θ40j), which is equal to or smaller than the average angle θave, a predetermined spring constant k43 is set in Step u64, so that a semi-crouching position assisting force moment T42j is computed as shown below in Step d25.

$$T42j = k43 \cdot \Delta\theta 42j \qquad (5)$$

When in Step u63 the detection angle θ42j reaches an angle (θave≤θ40j), which is deeper than the average angle θave, the procedure goes to Step u66, where it is determined that the angle variation range Δ42j is equal to or larger than a predetermined angle variation range Δ43 (Δ43≤Δ42j). When in Step u67 the state in which the angle variation range Δ42j is equal to or larger than the angle variation range Δ43 continues for a predetermined elapsed time W43, a spring constant k44j for the assisting force moment for semi-crouching position is computed in Step u68.

Figure 59:
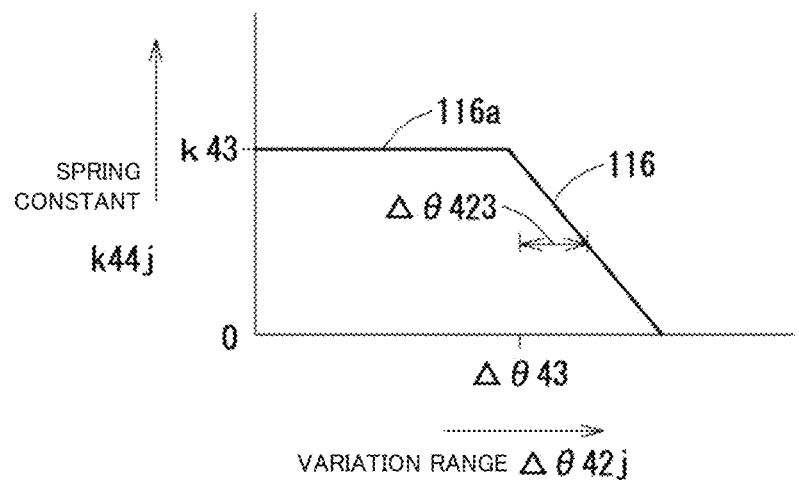
FIG. 59 is a graph showing the characteristics of the spring constant k44j in the semi-crouching position assistance action by the processing circuit 113.

FIG. 59 is a graph showing the characteristics of the spring constant k44j in the semi-crouching position assistance action by the processing circuit 113. When the variation range Δ42j of the semi-crouching position angle θ42j within the predetermined elapsed time W43 is equal to or larger than the predetermined angle variation range Δ43 (Δθ42j≤Δ43), the spring constant k44j of this spring force depends on the difference Δ423 (=Δ42j−Δ43), the spring constant k44j is decreased by a linear function 116 (see FIG. 59) to zero, so that the semi-crouching position assistance action is ineffective.

$$k44j = k43(1 - \Delta\theta 42j/\Delta 43) \qquad (6)$$

The semi-crouching position assisting force moment T42j is computed as shown below.

$$T42j = k44j \cdot \Delta\theta 42j \qquad (7)$$

In this manner, the semi-crouching position assisting force moment T42j generates a force of heaving the body upright in proportional to the variation range Δθ42j as shown by the expression (7). The force for lifting an object having a weight of 10 kg is configured to be generated by the semi-crouching position assisting force moment T42j assuming that the proportional constant of force is defined as the spring constant k44j and, for example, the full assist is provided when the variation range Δθ42j is 90°.

Assist is configured in such a manner that when the spring constant k44j is assumed to be the variation range Δθ42j of the semi-crouching position angle for a predetermined three seconds, that is, (θmax−θmin) in FIG. 57, the spring constant k44j is increased as this value Δθ42j becomes smaller and thus the posture changes only a little, and rigid feeling is provided. In contrast, when the value k44j is large and the posture change is large, soft feeling is provided for assist.

As in Steps u64 and u65 described above, with the detection angle θ42j being the same or smaller than the average angle θave, the spring constant k44j has a constant value indicated by a line 116a as in FIG. 59.

Referring to FIG. 55, when the angles θ40i detected by the left and right angle sensors 67 are both smaller than the predetermined semi-crouching position angle θ40 and reach a predetermined semi-crouching position termination angle in Step u47, or when the walking assist is started in Steps u48 to u50, when the lifting assist is started, or when the lowering brake assist is started, the semi-crouching position assist is terminated. The predetermined respective semi-crouching position values are set by key entry via the handy terminal device 150.

Figure 61:
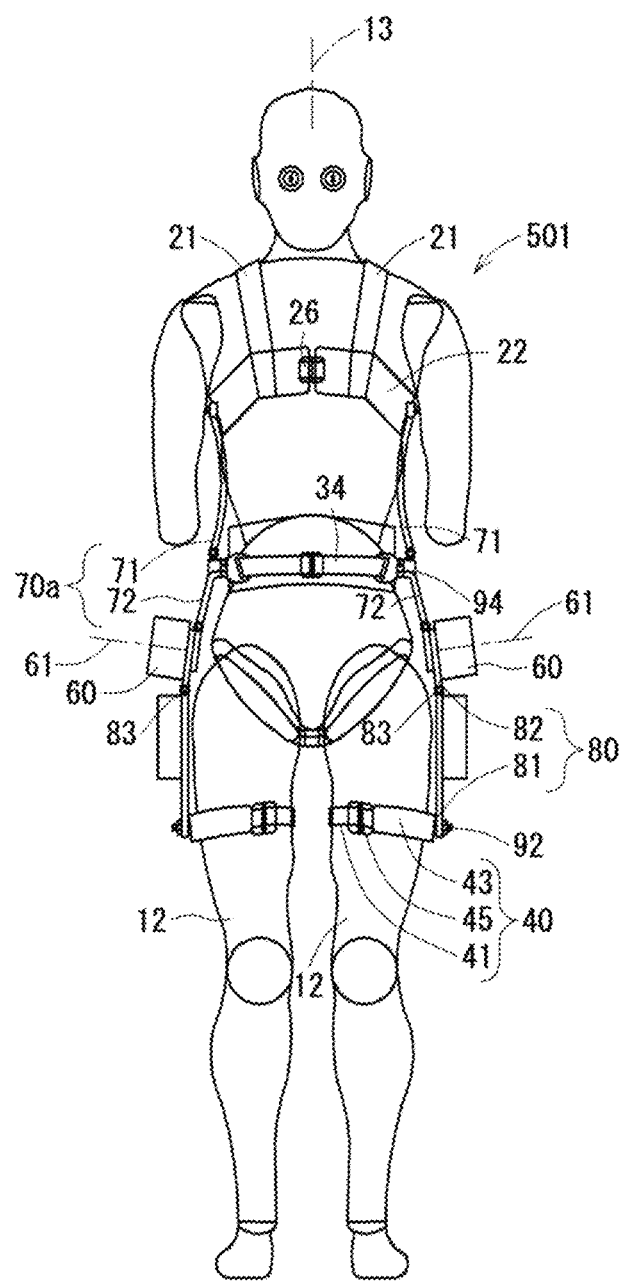
FIG. 61 is a front view illustrating a state in which a wearable assist robot apparatus 501 according to another embodiment of the invention is worn by the wearer 10.
Figure 62:
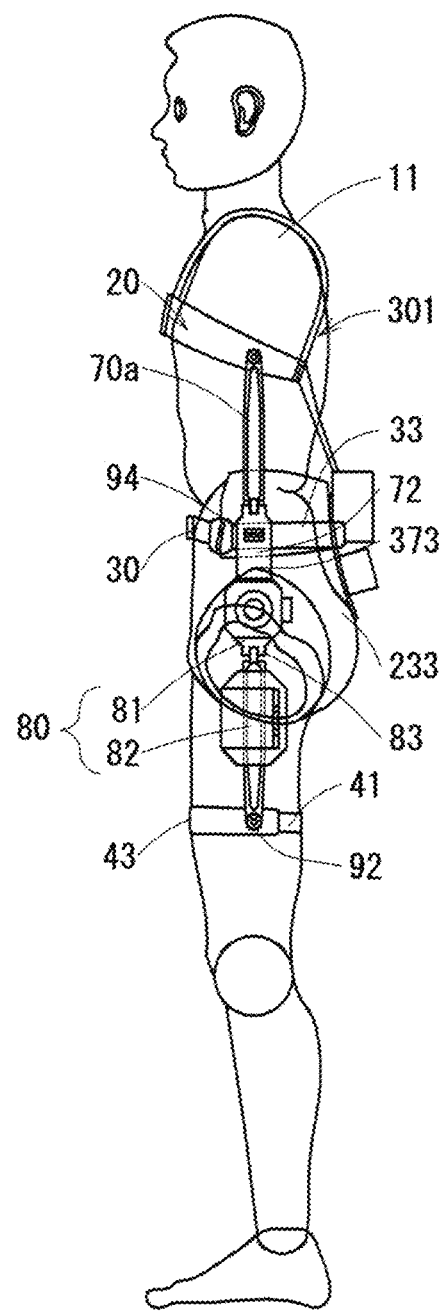
FIG. 62 is a side view illustrating a state of wearing the wearable assist robot apparatus 501.
Figure 63:
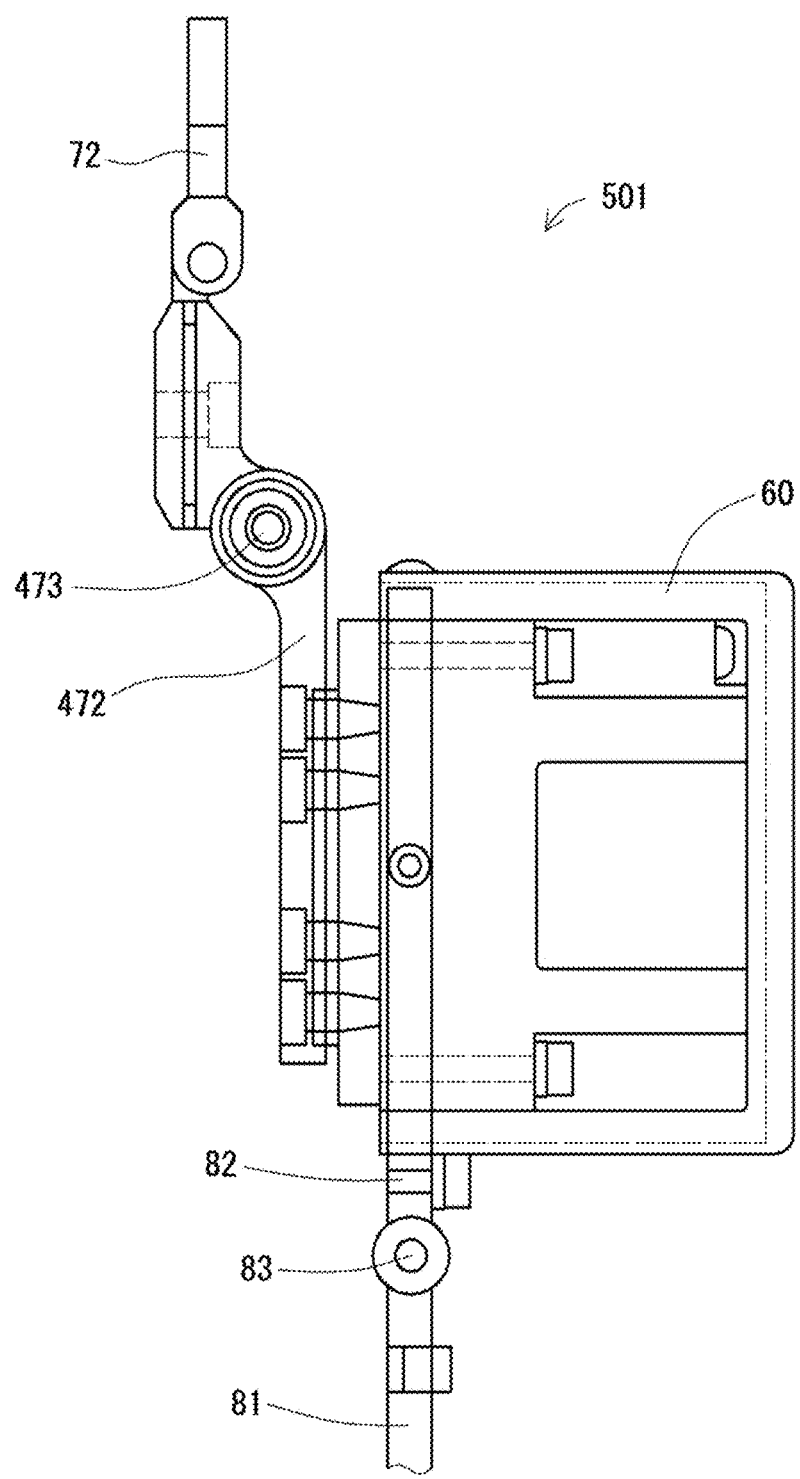
FIG. 63 is a front view illustrating the drive source 60 of the wearable assist robot apparatus 501 and the periphery thereof.
Figure 64:
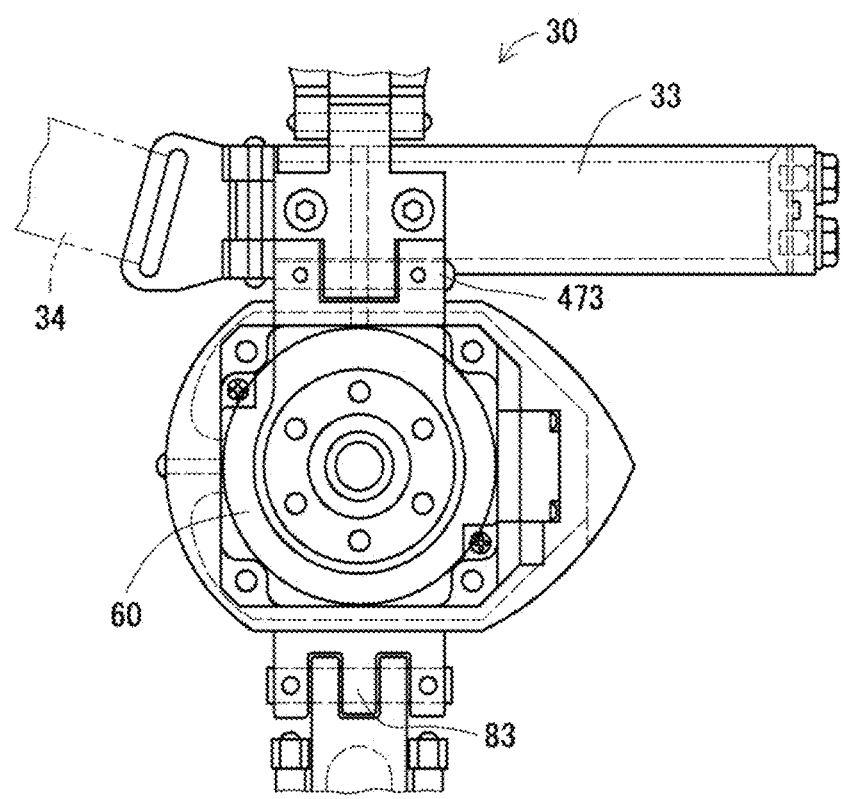
FIG. 64 is a side view illustrating the drive sources 60 of the wearable assist robot apparatus 501 and the periphery thereof.
Figure 65:
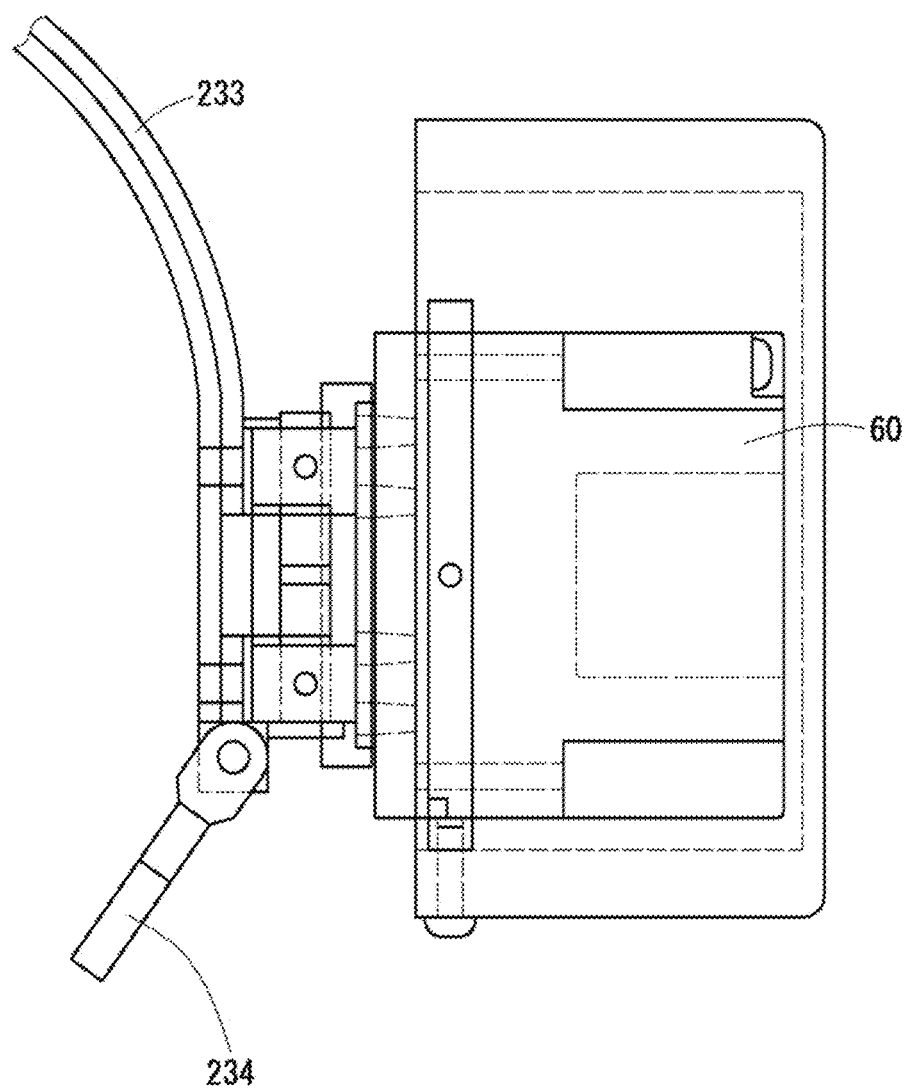
FIG. 65 is a plan view illustrating the drive sources 60 of the wearable assist robot apparatus 501 and the periphery thereof.

FIG. 61 is a front view illustrating a state in which a wearable assist robot apparatus 501 according to another embodiment of the invention is worn by the wearer 10, and FIG. 62 is a side view illustrating a state of wearing the wearable assist robot apparatus 501. FIG. 63 is a front view illustrating the drive source 60 of the wearable assist robot apparatus 501 and the periphery thereof, FIG. 64 is a side view illustrating the drive sources 60 of the wearable assist robot apparatus 501 and the periphery thereof, and FIG. 65 is a plan view illustrating the drive sources 60 of the wearable assist robot apparatus 501 and the periphery thereof. The wearable assist robot apparatus 501 illustrated in FIGS. 61 to 65 is similar to the embodiment in FIG. 1 and FIG. 2 described above, which specifically has a configuration in which the passive rotary shafts 73 (FIG. 1 and FIG. 2) angularly displaceable about the axial line in the anteroposterior direction as upper arms 70a are eliminated and having rigidity. Since the upper limbs may be bent sideward in the lateral direction by the passive rotary shafts 83 about the axial line in the anteroposterior direction on the lower arms 80, a rigid configuration like the upper arms 70a of the wearable assist robot apparatus 501 illustrated in FIG. 61 and FIG. 62 may also be employed while omitting the passive rotary shafts 73 (FIG. 1, FIG. 2) which is angularly displaceable about the axial line in the anteroposterior direction.

The upper arms 70a may have a shape which is convexly curved toward the wearer 10 so as to follow the body shape of the wearer 10, not a linear shape.

Back waist frames, which are side portions 32 of the lower body trunk harness 30 may have a plate shape formed of a metal such as aluminum, and may be realized by a synthetic resin-made pipe structure. By employing the pipe structure, improvements in reduction of weight and in strength can be achieved.

Figure 66:
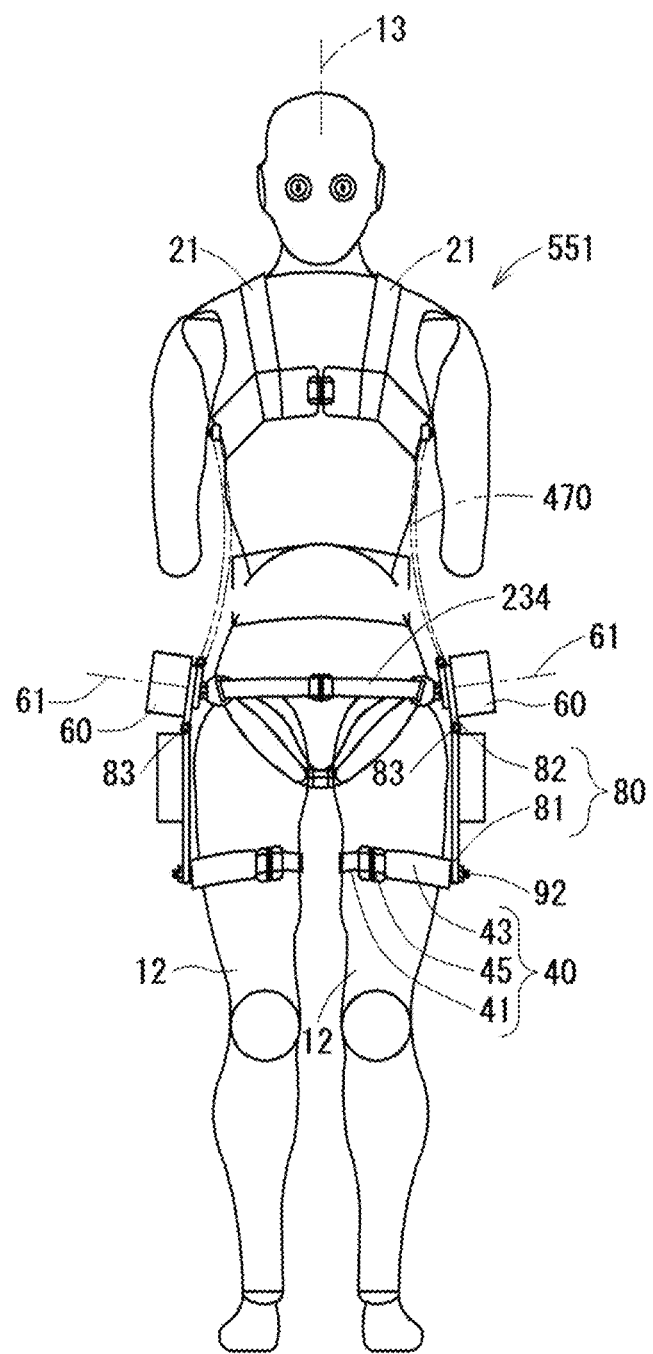
FIG. 66 is a front view illustrating a state in which a wearable assist robot apparatus 551 as another embodiment of the invention is worn by the wearer 10.
Figure 67:
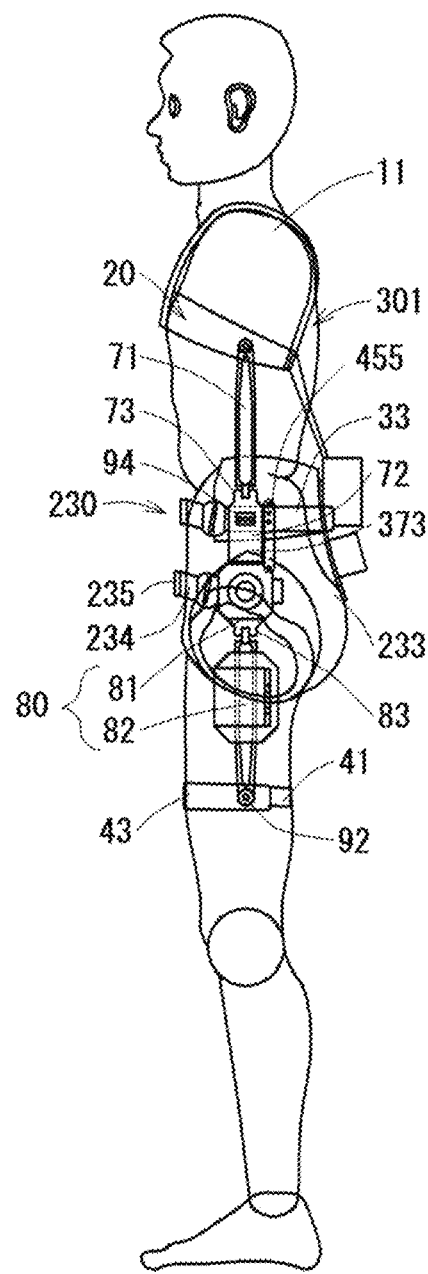
FIG. 67 is a side view illustrating a worn state of the wearable assist robot apparatus 551.

FIG. 66 is a front view illustrating a state in which a wearable assist robot apparatus 551 as another embodiment of the invention is worn by the wearer 10, and FIG. 67 is a side view illustrating a worn state of the wearable assist robot apparatus 551. The wearable assist robot apparatus 551 illustrated in FIG. 66 and FIG. 67 are similar to the embodiment in FIG. 30D descried above, and is configured to be similar to the embodiment in FIG. 61 to FIG. 65 described above. The above-described passive rotary shafts 73 are omitted from upper arms 470.

Figure 68:
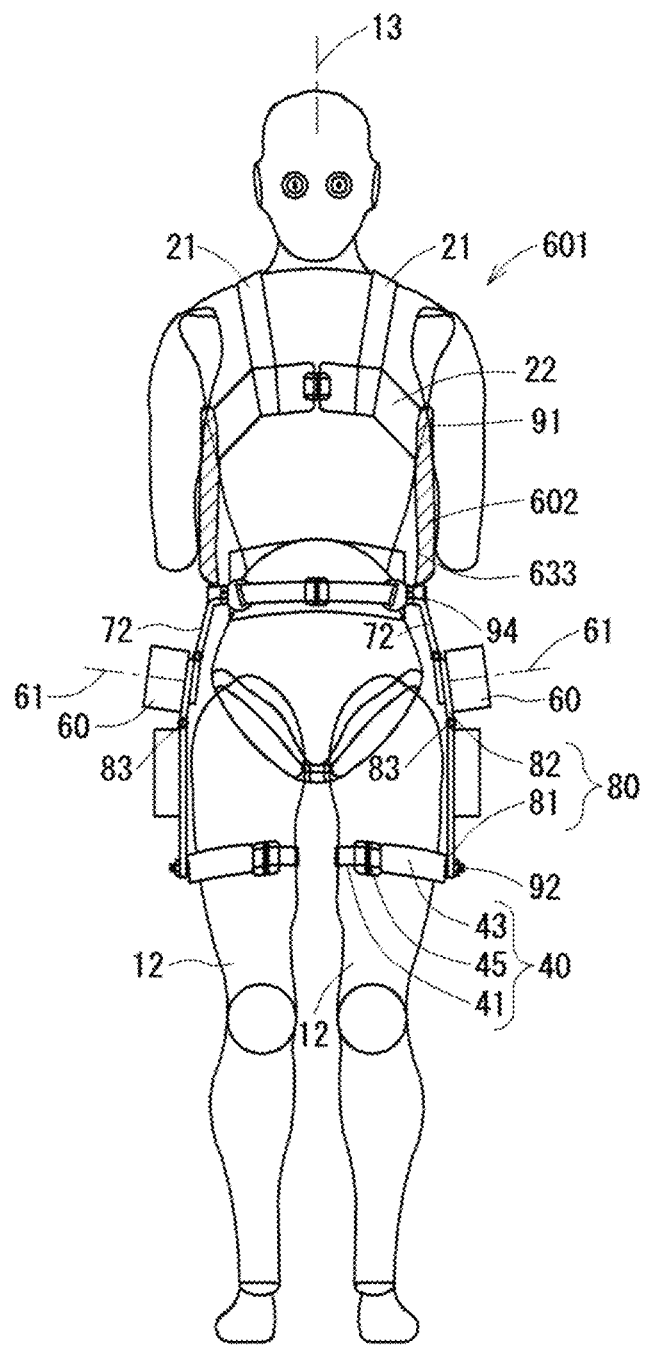
FIG. 68 is a front view illustrating a state in which the wearer 10 wears a wearable assist robot apparatus 601 according to another embodiment of the invention.
Figure 69:
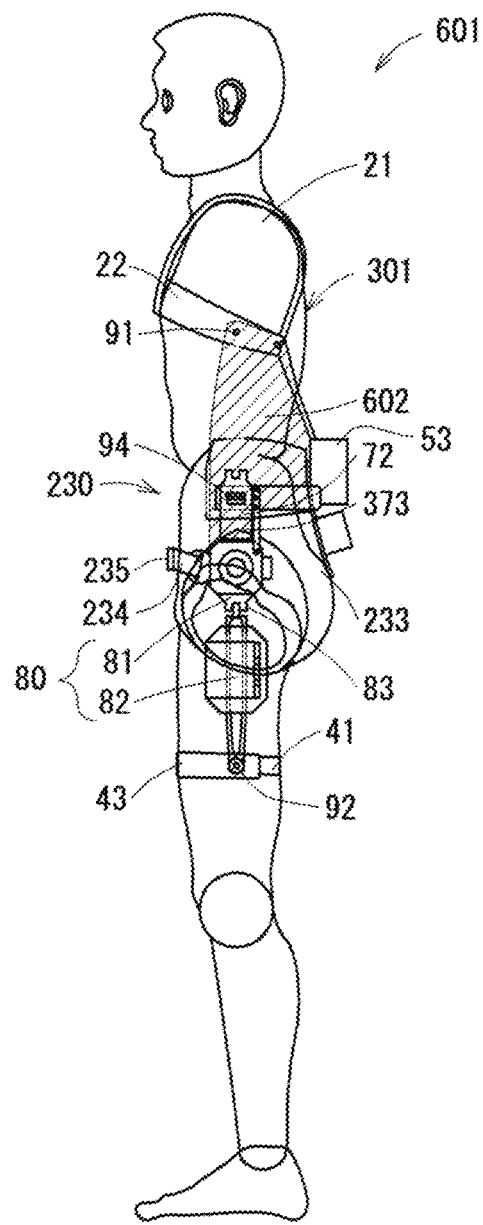
FIG. 69 is a side view illustrating a worn state of the wearable assist robot apparatus 601.
Figure 70:
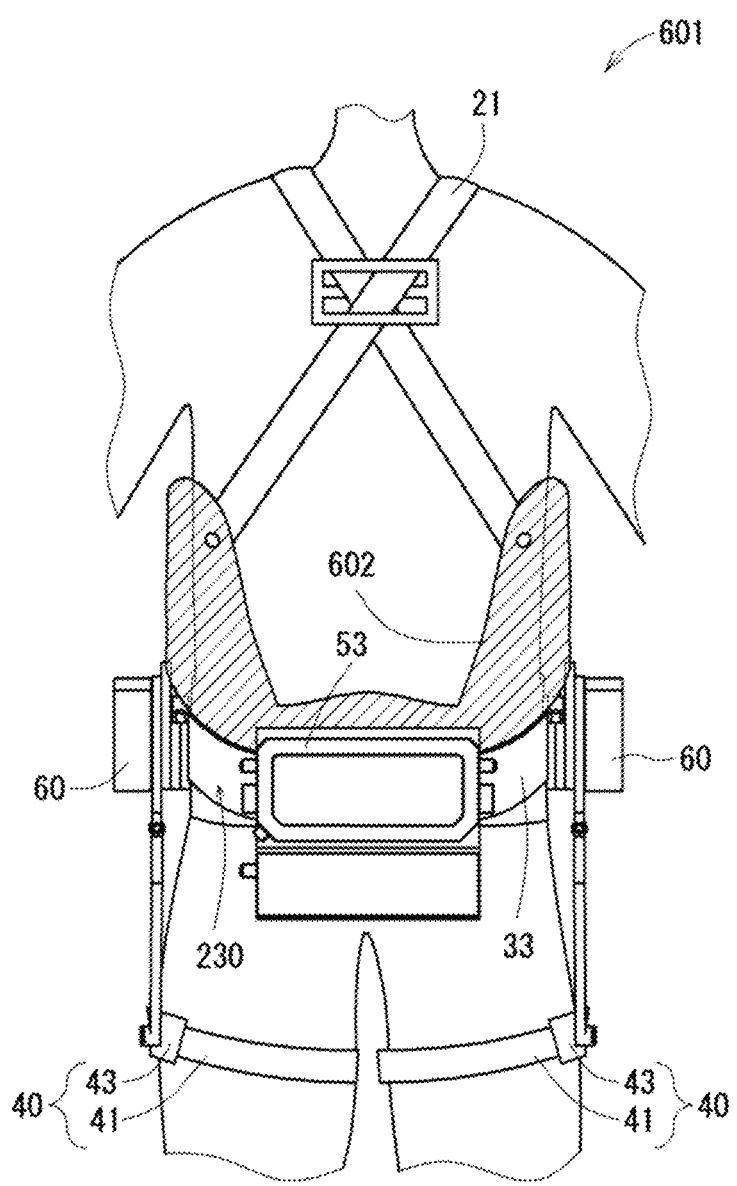
FIG. 70 is a back view illustrating a worn state of the wearable assist robot apparatus 601.

FIG. 68 is a front view illustrating a state in which the wearer 10 wears a wearable assist robot apparatus 601 according to another embodiment of the invention, FIG. 69 is a side view illustrating a worn state of the wearable assist robot apparatus 601, and FIG. 70 is a back view illustrating a worn state of the wearable assist robot apparatus 601. This embodiment is similar to the embodiment illustrated in FIG. 61 and FIG. 62 and other embodiments described above. However, it is to be noted that a planar frame 602 indicated with hatching is used instead of the upper arms 70. The planar frame 602 is a member formed into a curved shape configured to cover the upper body trunk at least partly, for example, cover the upper body trunk from side portions below the left and right axillary cavities to the dorsal portion. The planar frame 602 is provided with first passive rotary shafts 91, and the configuration to be coupled to the lower body trunk harness 230 is the same as the embodiment in FIG. 61 and FIG. 62 and other embodiments. The planar frame 602 is coupled to the shoulder belts 21 and the breast belt 22 as illustrated in FIG. 70, serves as the back belts 23 and the protector 36 described above, is coupled to the waist belt 33, and is coupled to the drive sources 60 in the same manner as the configuration relating to the upper arms 70 described above. The planar frame 602 may be formed of a synthetic resin such as a fiber reinforced plastic, and is rigid.

Figure 71:
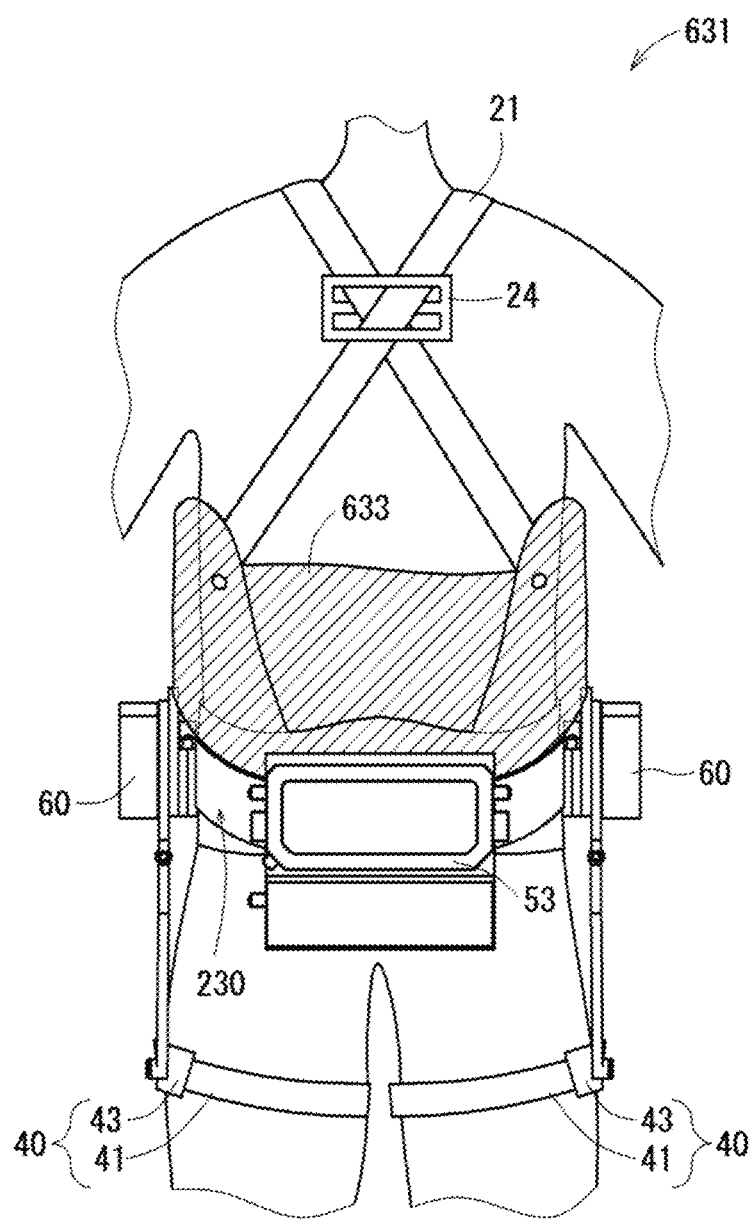
FIG. 71 is a back view illustrating a worn state of a wearable assist robot apparatus 631 as another embodiment of the invention.

FIG. 71 is a back view illustrating a state in which a wearable assist robot apparatus 631 according to another embodiment of the invention is worn by the wearer 10. This embodiment is similar to the embodiment illustrated in FIG. 68 to FIG. 70 described above. However, it is to be noted that a planar frame 633 indicated with hatching covers to the dorsal portion corresponding to the belly portion of the body trunk 11 of the wearer over an area larger than the embodiment illustrated in FIG. 70. Accordingly, force moments of the drive sources 60 may be transmitted reliably to portions of the wearer between the body trunk 11 and the thighs 12, and further smooth action of the wearer 10 to be supported can be achieved.

Figure 72:
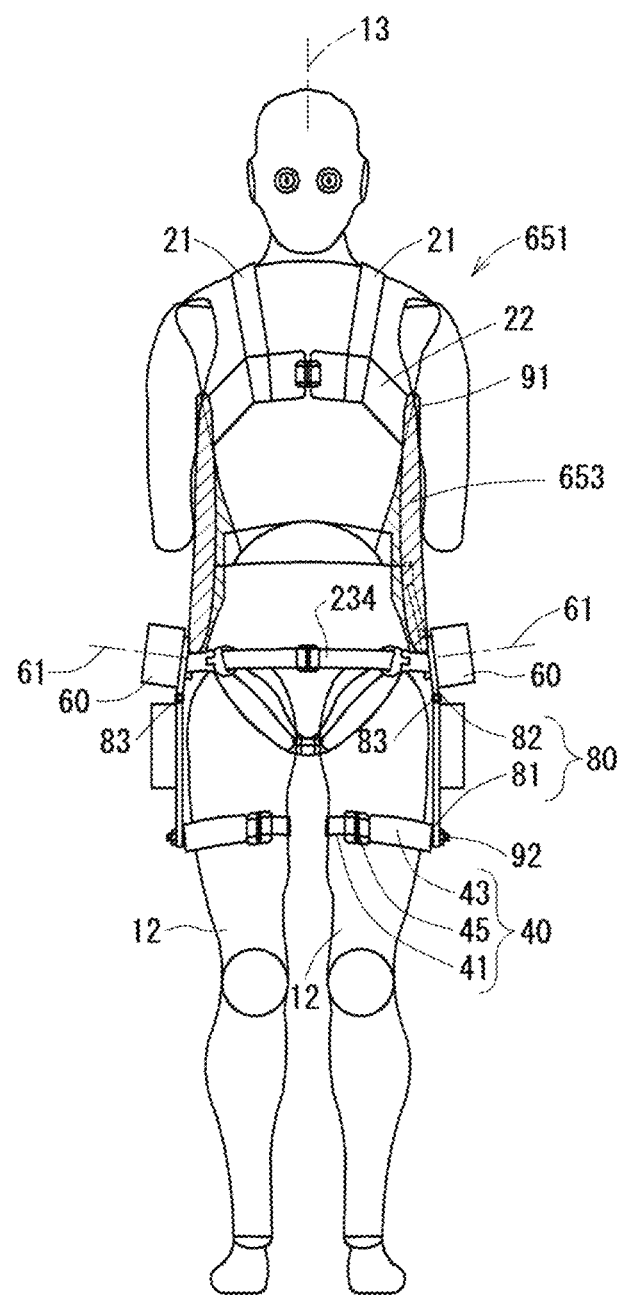
FIG. 72 is a front view illustrating a state in which a wearable assist robot apparatus 651 as another embodiment of the invention is worn by the wearer 10.
Figure 73:
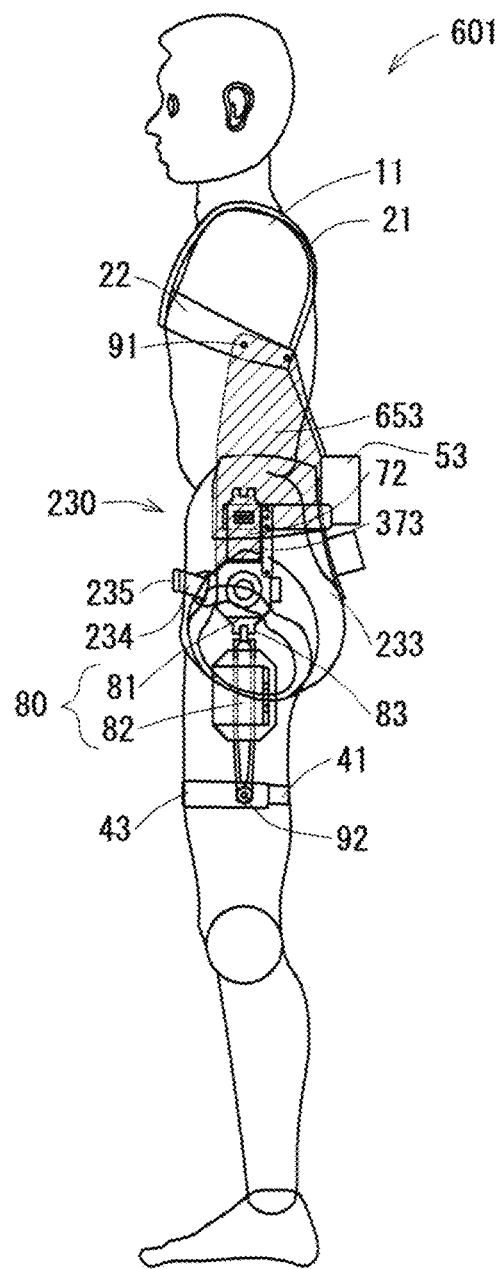
FIG. 73 is a side view illustrating a worn state of the wearable assist robot apparatus 651.
Figure 74:
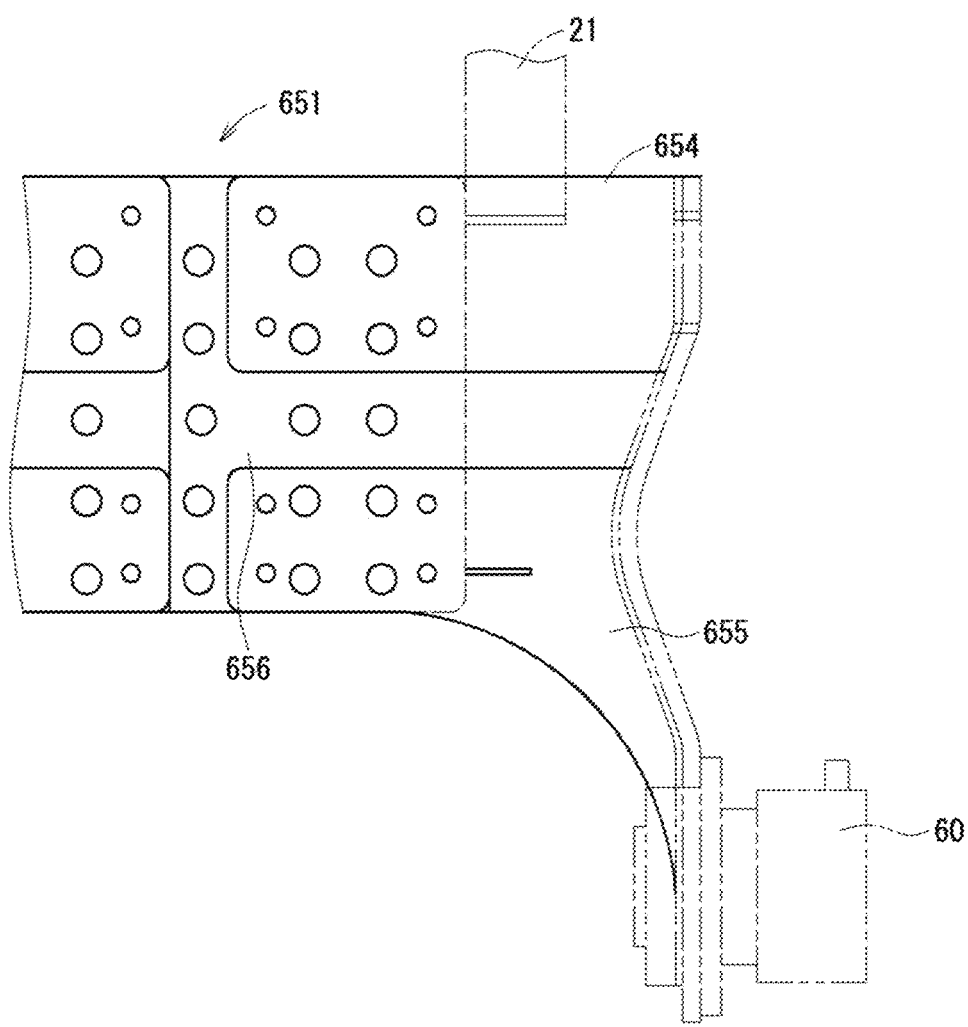
FIG. 74 is a front view of a planar frame 653 of the wearable assist robot apparatus 651.
Figure 75:
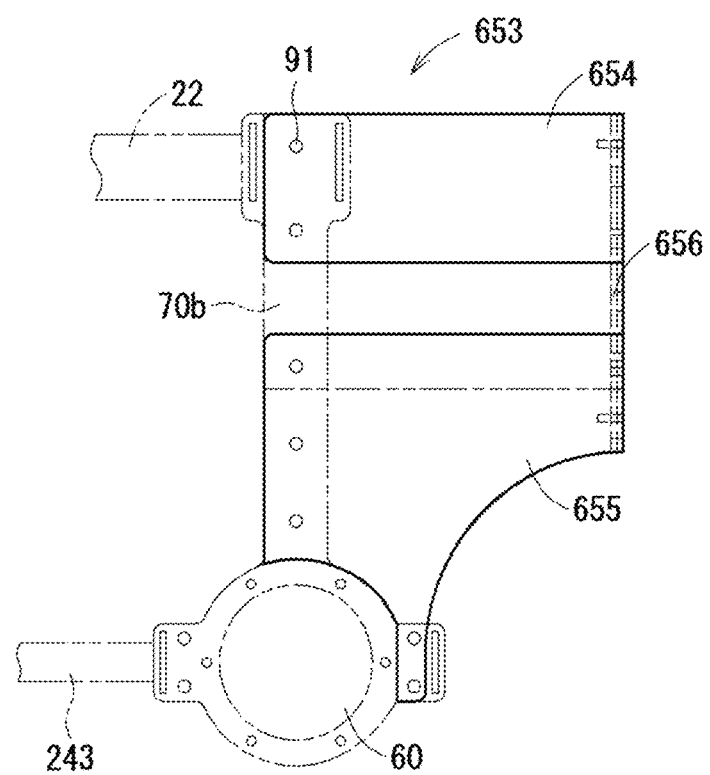
FIG. 75 is a left side view of the planar frame 653 of the wearable assist robot apparatus 651.
Figure 76:
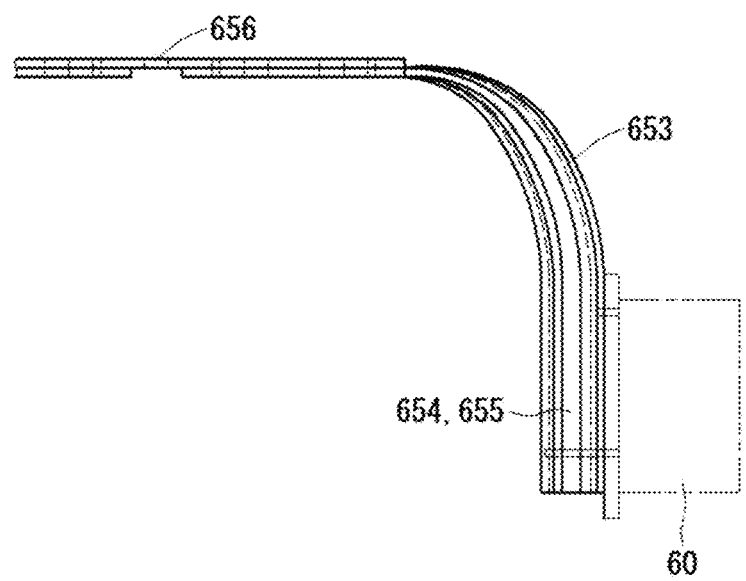
FIG. 76 is a plan view of the planar frame 653 of the wearable assist robot apparatus 651.

FIG. 72 is a front view illustrating a state in which a wearable assist robot apparatus 651 as another embodiment of the invention is worn by the wearer 10, and FIG. 73 is a side view illustrating a worn state of the wearable assist robot apparatus 651. FIG. 74 is a front view illustrating a left side portion of a planar frame 653 of the wearable assist robot apparatus 651, FIG. 75 is a left side view of the planar frame 653 of the wearable assist robot apparatus 651, and FIG. 76 is a plan view of the planar frame 653 of the wearable assist robot apparatus 651. FIG. 74 and FIG. 76 illustrate almost left half of the planar frame 653 which is configured to be lateral symmetry. The wearable assist robot apparatus 651 illustrated in FIG. 72 to FIG. 76 are similar to the embodiment illustrated in FIG. 30, FIG. 30D, FIG. 66 and FIG. 67 descried above, and is configured to be similar to the embodiment in FIG. 68 to FIG. 71 described above. The planar frame 653 includes an upper frame 654 and a lower frame 655 coupled on the back side by a coupling member 656, which may be referred to, for example, as a back plate. The upper frame 654 and the lower frame 655 may be coupled by upper arms 70*b* disposed on the side portions of the wearer. However, the upper arms 70*b* may be omitted. The upper frame 654 is coupled to the shoulder belts 21 (FIG. 74), and in the same manner as the above-described upper arms 70, is coupled to the breast belt 22 (FIG. 75) by the first passive rotary shafts 91. The lower frame 655 is coupled to one of the drive shafts of the drive sources 60 and the drive source bodies, and the other one is coupled to the lower belly belt 234 (FIG. 75). The supporting arm 455 may be fixed to the lower frame 655, and may be omitted. The coupling member 656 may be configured in the same manner as the adjusting mechanism 58 described in connection with FIG. 10 described above. Other configurations in FIG. 72 to FIG. 76 are similar to those in the above-described embodiments.

FIG. 77 is a front view illustrating a state in which the wearer 10 wears a wearable assist robot apparatus 701 according to another embodiment of the invention, FIG. 78 is a side view illustrating a worn state of the wearable assist robot apparatus 701, and FIG. 79 is a back view illustrating a worn state of the wearable assist robot apparatus 701. This embodiment is similar to the embodiments such as the one illustrated in FIG. 61 and FIG. 62 described above. However, it is to be noted that a meshed no-sleeve open-front vest 703 is provided on an inner surface or on an outer surface of the upper body trunk harness 20 as shown by hatching to secure proper air-ventilation and make clear where to insert the arms for the wearer 10, and to make the harness easily to wear, and hence the meshed vest is used together with the upper frames 70 and the planar frame 633. In other words, the meshed vest 703 is provided with the shoulder belts 21, the breast belt 22, the back belts 23, and a back coupling belt 704 configured to couple these belts 21, 22 and 23 on the back side attached thereto by, for example, stitching.

In order to achieve an open-front configuration, the vest 703 is configured to couple front bodies (703L, 703R in FIG. 71) on the left and right with respect to a front center line in the front of the wearer by couplers 705, 706 (fasteners, zippers, mechanical fasteners, hook and loop fasteners (for example, magic tape (trademark), Velcro (trademark)).

The vest 703 is provided with inner pockets at both sides and the back side to allow a cold insulator, a cooling material, or an air-ventilation fan for air conditioning, or a hand warmer to put therein.

Figure 80:
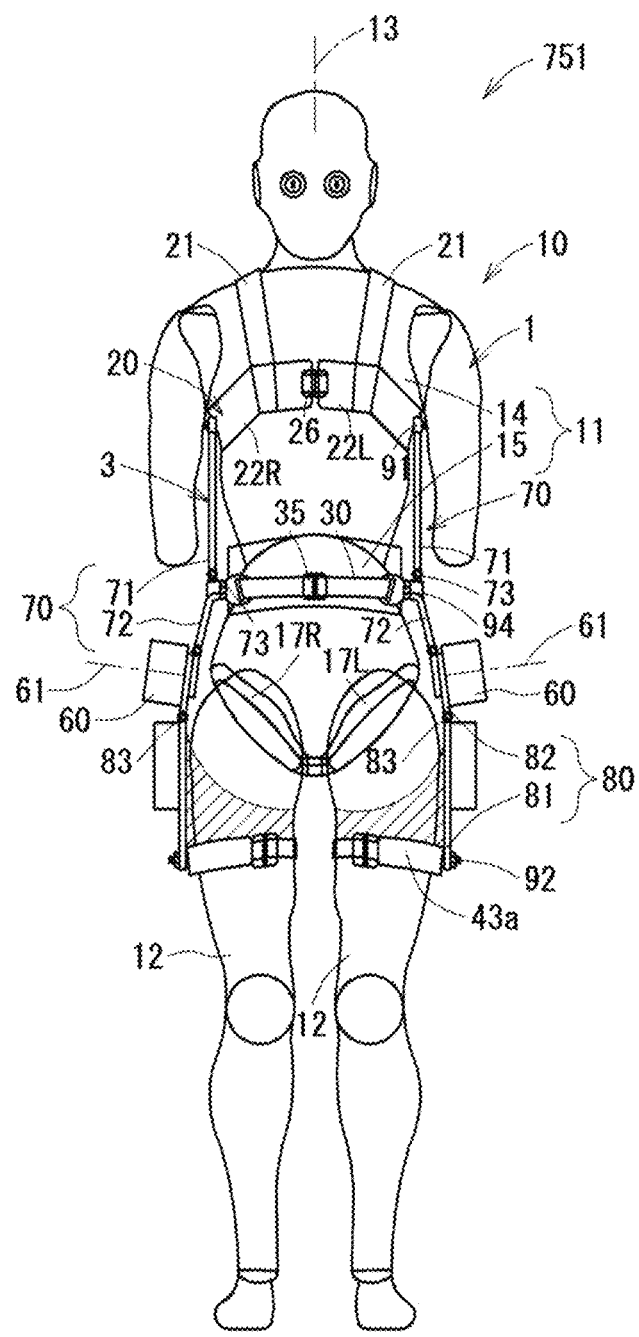
FIG. 80 is a front view illustrating a state in which a wearable assist robot apparatus 751 as another embodiment of the invention is worn by the wearer 10.
Figure 81:
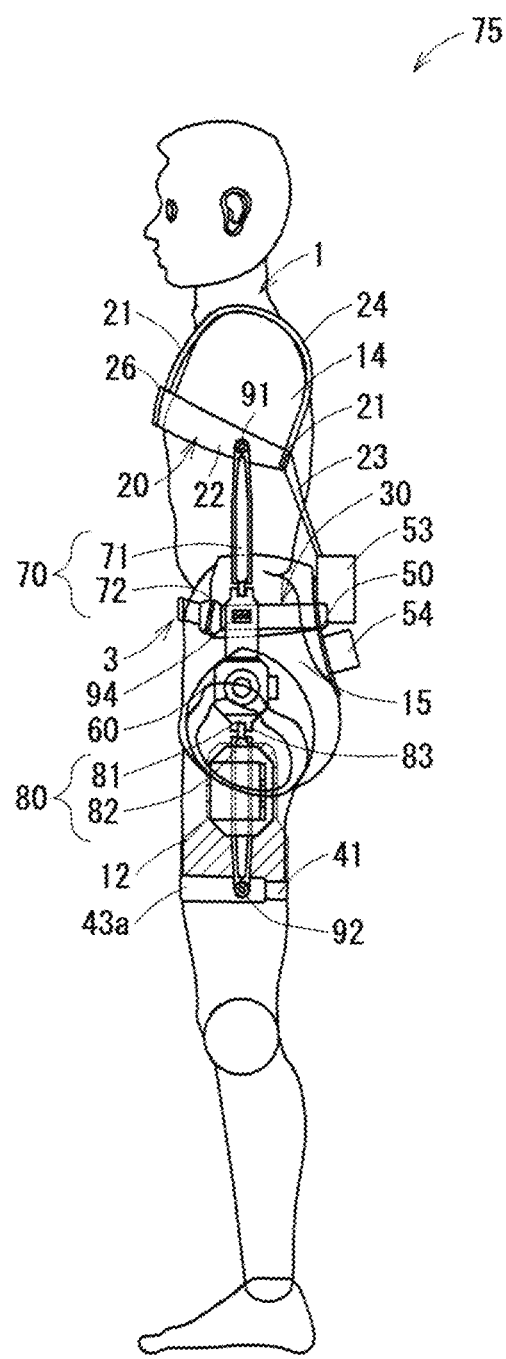
FIG. 81 is a side view illustrating a worn state of the wearable assist robot apparatus 751.

FIG. 80 is a front view illustrating a state in which a wearable assist robot apparatus 751 as another embodiment of the invention is worn by the wearer 10, and FIG. 81 is a side view illustrating a worn state of the wearable assist robot apparatus 751. This embodiment is similar to the embodiment illustrated in FIG. 1 and FIG. 2 described above. Preferably, retaining pieces 43*a* each include a substantially tubular shape extending from a band-shaped belt portion upward as hatched in FIG. 80 and FIG. 81 and raised and widened on the outer side of the thigh 12, covers around the thigh 12 over approximately ¼ to ¾ and, for example, is formed of a synthetic resin having a width of 30 to 100 mm in the vertical direction and a thickness of 5 mm. The retaining pieces 43*a* covering the thighs 12 over ¼ to ¾ the circumference allow the assisting force moment to be transferred from the lower arms 80 to the thighs 12.

Figure 82:
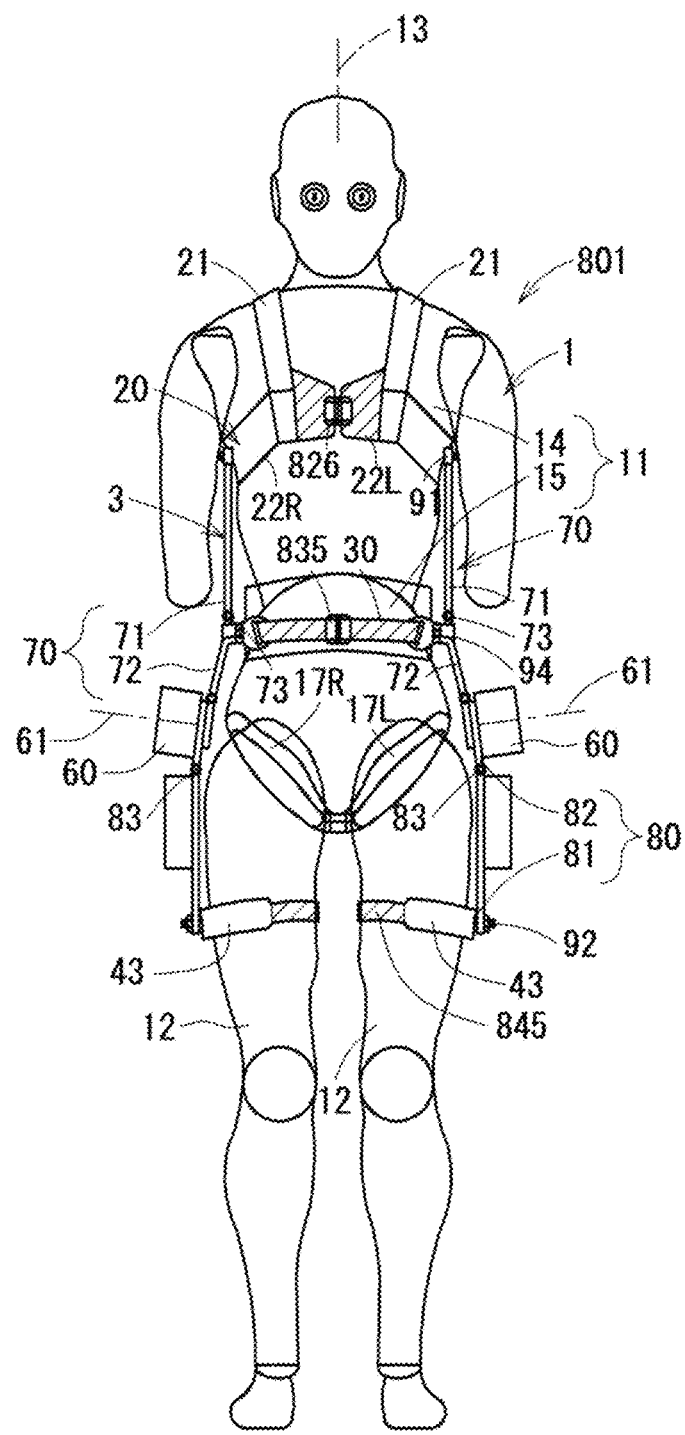
FIG. 82 is a front view illustrating a state in which a wearable assist robot apparatus 801 as another embodiment of the invention is worn by the wearer 10.
Figure 83:
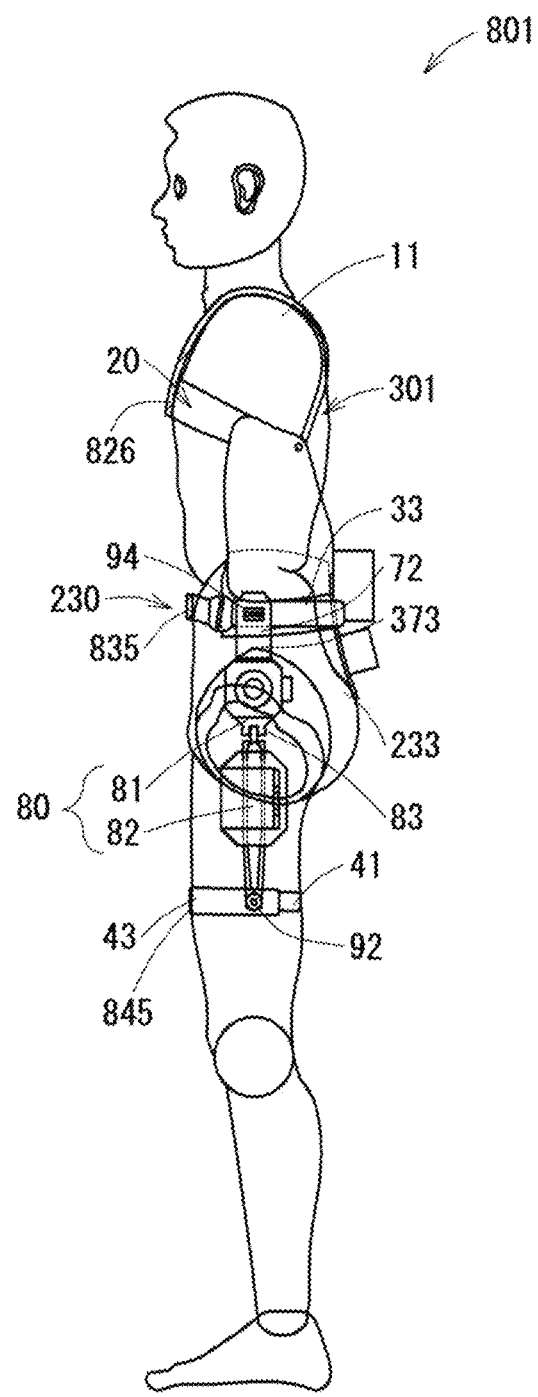
FIG. 83 is a side view illustrating a worn state of the wearable assist robot apparatus 801.

FIG. 82 is a front view illustrating a state in which a wearable assist robot apparatus 801 as another embodiment of the invention is worn by the wearer 10, and FIG. 83 is a side view illustrating a worn state of the wearable assist robot apparatus 801. This embodiment is similar to the embodiment illustrated in FIG. 1, FIG. 2 described above. It is to be noted that the couplers 26, 35 and 45 illustrated in FIG. 1 and FIG. 2 are realized by a configuration commercially available as fasteners, hook and loop fasteners (for example, magic tape (trademark), Velcro (trademark) descried above) illustrated with hatching by reference signs 826, 835 and 845 in FIG. 82 and FIG. 82 instead of the above-described plastic buckles or one-touch connectors having an easy-to-handle configuration for connection and separation.

Figure 84:
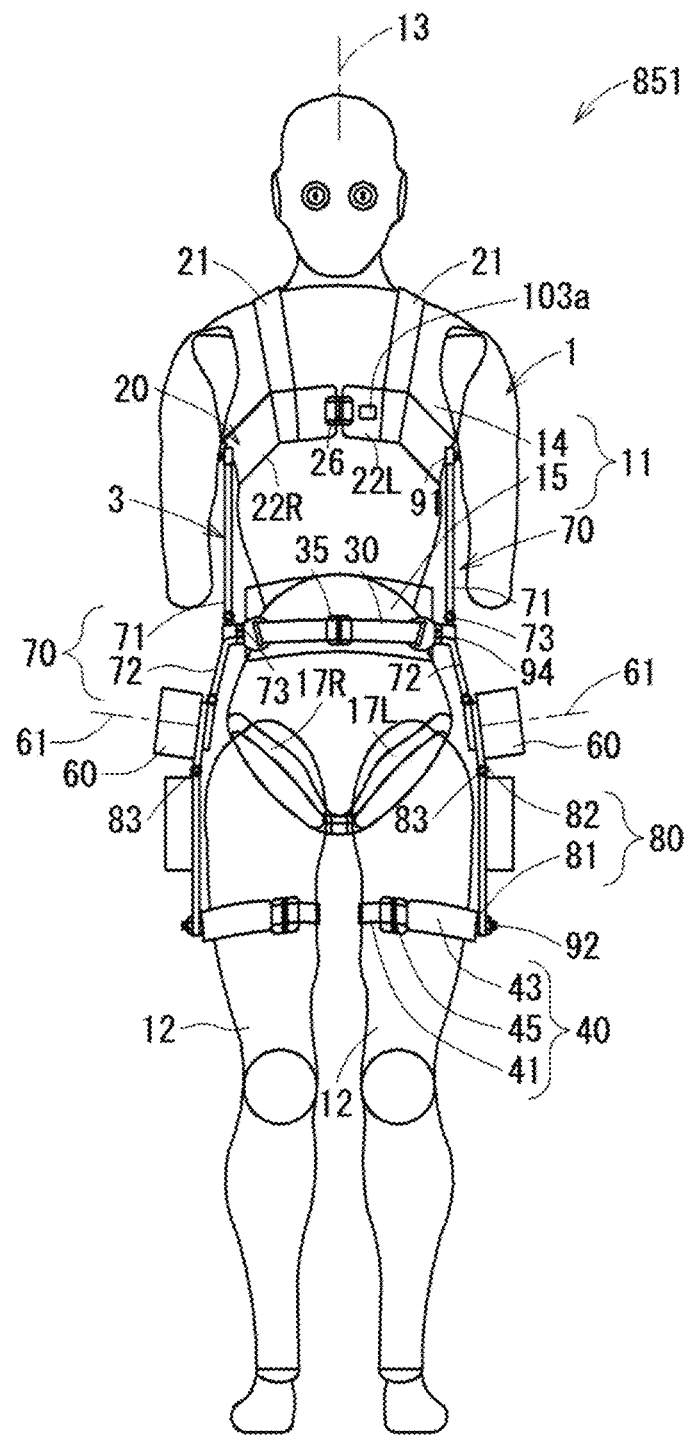
FIG. 84 is a front view illustrating a state in which a wearable assist robot apparatus 851 as another embodiment of the invention is worn by the wearer 10.
Figure 85:
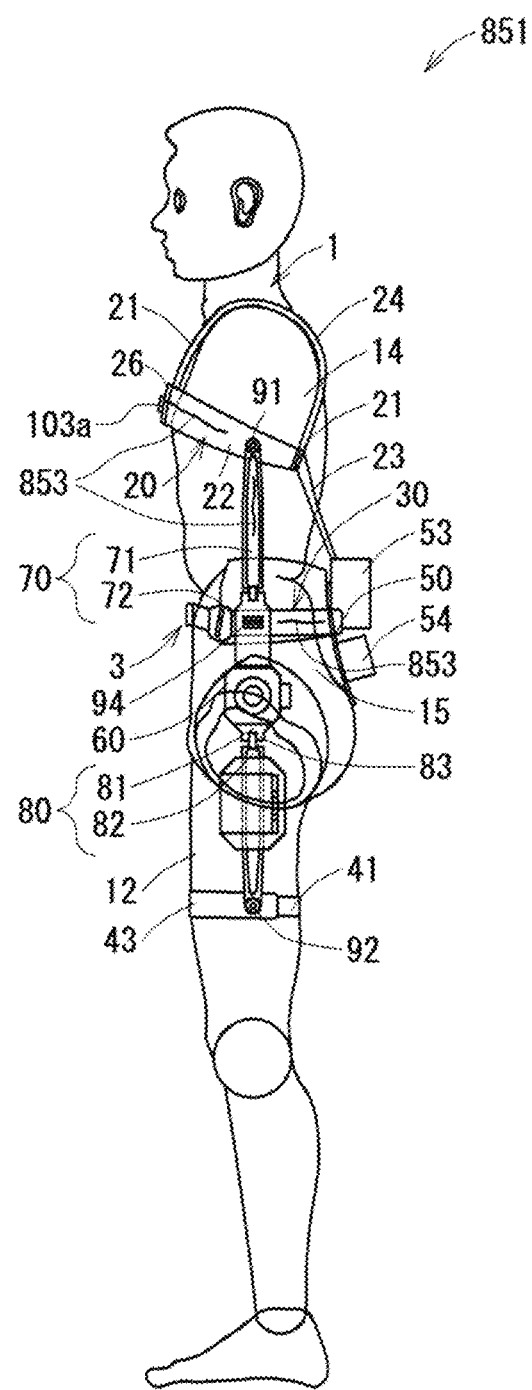
FIG. 85 is a side view illustrating a worn state of the wearable assist robot apparatus 851.

FIG. 84 is a front view illustrating a state in which a wearable assist robot apparatus 851 as another embodiment of the invention is worn by the wearer 10, and FIG. 85 is a side view illustrating a worn state of the wearable assist robot apparatus 851. This embodiment is similar to the embodiment illustrated in FIG. 1 and FIG. 2 described above. It is to be noted that an acceleration/angular speed sensor 103*a* may be provided on the waist portion of the body trunk 11 of the wearer 10 as illustrated in FIG. 14 described above. However, in the embodiment illustrated in FIG. 84 and FIG. 85, the acceleration/angular speed sensor 103*a* may be provided on the breast belts 22L or 22R at a front position of the wearer 10. The acceleration/angular speed sensor 103*a* detects the three-dimensional acceleration of the breast portion, that is, an acceleration α1 in the vertical direction and an acceleration α2 in the anteroposterior direction, and furthermore, an acceleration α3 in the lateral direction, respectively. When lifting the object, the action of the breast portion of the wearer 10 on which the acceleration/angular speed sensor 103*a* is provided is larger than the action of the waist portion in the embodiment illustrated in FIG. 14. Therefore, detection is easily achieved, and the acceleration/angular speed may be detected with high degree of accuracy. A detection signal from the acceleration/angular speed sensor 103*a* is fed to the processing circuit 113 in the interior of the control box 53 via a flexible line 853 provided along the breast belt 22, the upper arms 70, and the waist belt 33.

INDUSTRIAL APPLICABILITY

The wearable assist robot apparatus may be used for transferring and handling of substances such as objects and human bodies. For example, the wearable assist robot apparatus may be used for assisting agricultural works, and may be used for industrial, logistics, and construction purposes, for caregiving, and for assisting walking rehabilitation to recover the physical function, other than the agricultural field. In addition, as described above, the wearable assist robot apparatus may be used for snow shoveling in the snowiest areas. The wearable assist robot apparatus may be used also for emergency rescue and works for carrying out disaster refuse such as debris in times of disaster.

REFERENCE SIGNS LIST

1, 201, 301, 401, 501, 551, 601, 631, 651, 701, 751, 801, 851: Wearable assist robot apparatus
2: Harness device
3: Assist drive mechanism
10: Wearer
11: Body trunk
12: Thigh
17: Center of hip joint
20: Upper body trunk harness
21: Shoulder belt
22: Breast belt
23: Back belt
30: Lower body trunk harness
31: Rear portion
32: Side portion
33: Waist belt
34: Belly belt
36*a*: Protector
37: Cushion member
40: Thigh harness
41: Belt body
42: Fixing piece
43: Retaining piece
44: Cushion member
50: Mounting member
53: Control box
54: Battery box
60: Drive source
61: Axial line
62: Drive shaft
63: Drive source body
64: Electric motor
65: Output shaft
66: Speed reducer
67: Angle sensor
68: Motor body
70: Upper arm
71: First upper arm piece
72: Second upper arm piece
73: Third passive rotary shaft
80: Lower arm
81: First lower arm piece
82: Second lower arm piece
83: Fourth passive rotary shaft
91: First passive rotary shaft
92: Second passive rotary shaft
94: Mounting means
95: Belt attachment
96: Passive rotary shaft

The invention claimed is:

1. A wearable assist robot apparatus, comprising:
    a harness device to be worn and retained by a wearer;
    an assist drive mechanism provided on the harness device, including at least one drive source configured to be disposed on each of left and right sides of a lower body trunk of the wearer configured to generate drive torque about an axial line in a lateral direction of the wearer, the assist drive mechanism being configured to apply assisting force moments respectively to portions of the wearer between the body trunk and respective left and right thighs by drive torque from the respective drive sources;
    a pair of angle sensors configured to detect relative angles between the body trunk and the respective left and right thighs of the wearer about the axial line in the lateral direction;
    at least one processor configured to
    determine a foot landing state in response to an output from the angle sensors; and
    in response to outputs from the respective angle sensors and a determined foot landing state, apply an assisting force moment in a direction of support to a supporting leg in a landed state by a supporting-leg side drive source of the at least one drive source, and apply a swing-up force moment in a swing-up direction to a free leg not in contact with the land by a free-leg side drive source of the at least one drive source,
    wherein after the assisting force moments are maintained at a first predetermined value for a first predetermined time, the assisting force moments are reduced in proportion to respective angles detected by the pair of angle sensors, and
    after the swing-up force moment is maintained at a second predetermined value for a second predetermined time, the swing-up force moment is reduced at a predetermined speed.

2. The wearable assist robot apparatus according to claim 1, wherein the at least one processor is further configured to increase a supporting force moment and the swing-up force moment in sequence at every detection of left and right detection angles changing alternately in opposite directions.

3. The wearable assist robot apparatus according to claim 1, further comprising:
an acceleration and angular speed sensor configured to be mounted on the body trunk of the wearer, the acceleration and angular speed sensor being configured to detect an acceleration, an angular speed, or an angle of the body trunk,
wherein the at least one processor is configured to apply a lifting force moment in a lifting direction in which the relative angles between the body trunk and the respective thighs increase and applies a lowering brake force moment to limit the moment acting in a lowering direction by the left and right drive sources when the detected acceleration, angular speed, or the angle correspond to a start of an object lifting assistance or lowering brake assistance, in response to the outputs from the acceleration and angular speed sensor.

4. The wearable assist robot apparatus according to claim 1, further comprising:
at least one object sensor configured to be mounted on the hands of the wearer, the at least one object sensor being configured to detect an action of an object on the hands,
wherein the at least one processor is further configured to apply a lifting force moment in a lifting direction in which the relative angles between the body trunk and the respective thighs increase by the left and right drive sources when at least one object is detected, in response to outputs from the pair of angle sensors and the at least one object sensor.

5. The wearable assist robot apparatus according to claim 1, wherein the at least one processor is further configured to
compute angular speeds respectively in response to outputs from the left and right angle sensors; and
at least one object sensor configured to be mounted on each of the hands of the wearer, the at least one object sensor being configured to detect an action of an object on the hands,
wherein the at least one processor configured to apply a lowering brake force moment to limit a moment acting in the lowering direction by the left and right drive sources when the detected angular speed is in the lowering direction and at least one object is detected, in response to the outputs from the pair of angle sensors, the at least one processor, and the at least one object sensor.

6. The wearable assist robot apparatus according to claim 1, wherein at least one processor is further configured to,
in response to outputs from the pair of angle sensors, when the detected left and right angles are in a predetermined range of a semi-crouching position, count a duration of a semi-crouching position and, when the counted duration exceeds a predetermined duration, apply the assisting force moment for semi-crouching position to maintain detected left and right angles, by the respective left and right drive sources.

7. The wearable assist robot apparatus according to claim 1, wherein
(j) the harness device includes:
an upper body trunk harness to be worn and retained by the wearer on the upper body trunk;
a lower body trunk harness to be worn and retained by the wearer on the lower body trunk; and
thigh harnesses to be worn and retained by the wearer on the thigh, and (k) the assist drive mechanism includes:
(k1) the at least one drive source including
a drive shaft configured to rotate about an axial line in the lateral direction at or near a hip joint, and
a drive source body configured to generate torque on the drive shaft about the axial line in the lateral direction;
(k2) first and second upper arms extending in a vertical direction distal to the wearer, the first and second upper arms configured to be disposed respectively on left and right sides of the upper body trunk and attached at lower ends of the respective upper arms to one of the respective drive shaft or the respective drive source body so as to prohibit relative rotation about the axial line in the lateral direction;
(k3) first passive rotary shafts configured to couple respective upper ends of the upper arms and the upper body trunk harness so as to be angularly displaceable about the axial line in the lateral direction;
(k4) a pair of lower arms extending in the vertical direction, the pair of lower arms configured to be disposed distally from both left and right sides from the lower body trunk to the thighs respectively and attached at upper ends of the respective lower arms to the other one of the drive shaft or the drive source body so as to prohibit relative rotation about the axial line in the lateral direction;
(k5) second passive rotary shafts configured to couple lower ends of the respective lower arms and the thigh harnesses so as to be angularly displaceable about the axial line in the lateral direction; and
(k6) a mount configured to mount one on or more of the upper arms, the drive shaft, the drive source body, or the lower arms to the lower body trunk harness.

8. A wearable assist robot apparatus, comprising:
(a) an upper body trunk harness to be worn and retained on an upper body trunk of a wearer;
(b) a lower body trunk harness to be worn and retained on a lower body trunk of the wearer; and
(c) thigh harnesses to be worn and retained on thighs of the wearer,
(d) at least one drive source configured to be disposed distally to the lower body trunk on each of left and right sides in a lateral direction of the wearer,
the at least one drive source including a drive shaft configured to rotate about an axial line in the lateral direction at or near a hip joint, and
a drive source body provided on the drive shaft, the drive source body being configured to generate torque about the axial line in the lateral direction,
(e) a pair of upper arms extending in a vertical direction of the wearer, the pair of upper arms being configured to be disposed distally from both left and right sides of the upper body trunk, and attached at lower ends of the respective upper arms to one of the respective drive shaft or the respective drive source body so as to prohibit relative rotation about the axial line in the lateral direction;
(f) first passive rotary shafts configured to couple upper ends of the upper arms and the upper body trunk harness respectively so as to be angularly displaceable about the axial line in the lateral direction;
(g) a pair of lower arms extending in the vertical direction and configured to be disposed distally from both left and right sides from the lower body trunk to the thighs respectively and attached at upper ends of the respective lower arms to the other one of the drive shaft or the drive source body so as to prohibit relative rotation about the axial line in the lateral direction;

(h) second passive rotary shafts configured to couple lower ends of the respective lower arms and the thigh harnesses respectively so as to be angularly displaceable about the axial line in the lateral direction; and (i) a mount configured to mount one or more of the upper arms, the drive shaft, the drive source body, and the lower arms to the lower body trunk harness, wherein a vest is attached to the upper body trunk harness.

9. The wearable assist robot apparatus according to claim 8, wherein the lower body trunk harness is configured to be disposed at or near the pelvis of the wearer, midsections in a longitudinal direction of the upper arms are attached to the lower body trunk harness via the mount, and the axial lines of the drive shafts are provided at or near a straight line in the lateral direction passing through centers of cotyloid joints of the left and right hip joints of the wearer.

10. The wearable assist robot apparatus according to claim 9, wherein the upper arms are angularly displaceable about axial lines in an anteroposterior direction of the wearer between the first passive rotary shafts and the axial lines of the drive shafts.

11. The wearable assist robot apparatus according to claim 8, wherein the lower arms are angularly displaceable about axial lines in an anteroposterior direction of the wearer between the axial lines of the drive shafts and the second passive rotary shafts.

12. The wearable assist robot apparatus according to claim 8, wherein third and fourth passive rotary shafts angularly displaceable about axial lines in an anteroposterior direction of the wearer are interposed between first and second sections of each of the upper arms and the lower arms.

13. The wearable assist robot apparatus according to claim 8, wherein the lower arms are angularly displaceable about axial lines in an anteroposterior direction of the wearer between the axial lines of the drive shafts and the second passive rotary shafts.

14. The wearable assist robot apparatus according to claim 8, wherein third and fourth passive rotary shafts angularly displaceable about axial lines in an anteroposterior direction of the wearer are interposed between a first and a second section of each of the upper arms and the lower arms.

15. The wearable assist robot apparatus according to claim 8, wherein the upper arms are formed of planar frames configured to cover at least both right and left sides in a circumferential direction of the upper body trunk.

* * * * *